US011329716B2

United States Patent
Ouchi et al.

(10) Patent No.: US 11,329,716 B2
(45) Date of Patent: May 10, 2022

(54) SIGNAL PROCESSING DEVICE, SIGNAL PROCESSING METHOD, RECORDING MEDIUM, AND MOBILE BODY

(71) Applicant: Panasonic Intellectual Property Corporation of America, Torrance, CA (US)

(72) Inventors: Mikihiro Ouchi, Osaka (JP); Tomohiro Kimura, Osaka (JP); Takayuki Sotoyama, Kanagawa (JP); Naoki Adachi, Kanagawa (JP); Naoya Shibaike, Kanagawa (JP); Shutai Okamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/943,838

(22) Filed: Jul. 30, 2020

(65) Prior Publication Data
US 2020/0366365 A1    Nov. 19, 2020

Related U.S. Application Data

(63) Continuation of application No. PCT/JP2019/002856, filed on Jan. 29, 2019.
(Continued)

(51) Int. Cl.
  *H04B 7/185*    (2006.01)
  *H04W 56/00*    (2009.01)
  *H04B 7/10*     (2017.01)
  *H04W 36/24*    (2009.01)

(52) U.S. Cl.
  CPC ........... *H04B 7/18506* (2013.01); *H04B 7/10* (2013.01); *H04W 36/24* (2013.01); *H04W 56/0005* (2013.01)

(58) Field of Classification Search
  CPC ..... H04B 7/18506; H04B 7/10; H04W 36/24; H04W 56/0005
  See application file for complete search history.

(56) References Cited

U.S. PATENT DOCUMENTS 6,754,511 B1    6/2004  Halford et al.
7,167,531 B2 *  1/2007  Greenberg ............ H03M 13/00
                                                     375/262

(Continued)

FOREIGN PATENT DOCUMENTS

| JP | 2003-46422  | 2/2003 |
| JP | 2003-522465 | 7/2003 |

(Continued)

OTHER PUBLICATIONS

Extended European Search Report dated Mar. 16, 2021 in corresponding European Patent Application No. 19747821.7.
(Continued)

*Primary Examiner* — Kibrom T Hailu
*Assistant Examiner* — Bailor C. Hsu
(74) *Attorney, Agent, or Firm* — Wenderoth, Lind & Ponack, L.L.P.

(57) ABSTRACT

A signal processing device includes: a transmission path estimator that estimates a first transmission path characteristic of a transmission signal using a vertical signal out of vertical and horizontal signals resulting from being received by a vertical polarization antenna and a horizontal polarization antenna; a transmission path estimator that estimates a second transmission path characteristic of the transmission signal using the horizontal signal; a weight calculator that calculates a first weight for the vertical signal and a second weight for the horizontal signal, using the first transmission path characteristic and the second transmission path characteristic; and a weighting applier that applies weighted
(Continued)

summation to the vertical signal and the horizontal signal using the first weight and the second weight.

11 Claims, 59 Drawing Sheets

Related U.S. Application Data

(60) Provisional application No. 62/743,886, filed on Oct. 10, 2018, provisional application No. 62/694,160, filed on Jul. 5, 2018, provisional application No. 62/624,418, filed on Jan. 31, 2018.

(56) References Cited

U.S. PATENT DOCUMENTS

| | | | |
|---|---|---|---|
| 7,961,880 B2* | 6/2011 | Wang | H04L 25/03866 380/205 |
| 8,374,105 B1* | 2/2013 | Perahia | H04B 7/0413 370/260 |
| 8,422,540 B1* | 4/2013 | Negus | H01Q 21/062 375/219 |
| 8,644,430 B1 | 2/2014 | Perahia et al. | |
| 10,651,920 B1* | 5/2020 | Struhsaker | H01Q 9/0478 |
| 2006/0046648 A1 | 3/2006 | DiFonzo et al. | |
| 2011/0164110 A1* | 7/2011 | Fortin | H04N 13/161 348/43 |
| 2017/0338874 A1* | 11/2017 | Pratt | H04B 7/0617 |
| 2018/0167154 A1 | 6/2018 | Murakami et al. | |
| 2020/0007258 A1 | 1/2020 | Murakami et al. | |

FOREIGN PATENT DOCUMENTS

| | | |
|---|---|---|
| JP | 2012-94931 | 5/2012 |
| WO | 01/58049 | 8/2001 |
| WO | 2016/199627 | 12/2016 |

OTHER PUBLICATIONS

International Search Report dated May 7, 2019 in International (PCT) Application No. PCT/JP2019/002856.
Takashi Oki, "Global trends in satellite communications services", Workshop 2016 on the future view of the next engineering test satellite, Mar. 2016, http://www.mri.co.jp/news/seminar/uploadfiles/ssu20160330.pdf with English translation.
Tatsuro Ito, "Need of satellite communication in aviation field and expectation for next communication satellite", Workshop 2016 on the future view of the next engineering test satellite, Mar. 2016, http://www.mri.co.jp/news/seminar/uploadfiles/ssu20160330.pdf with English translation.
DVB blue book A171-2: Digital Video Broadcasting (DVB): Implementation guidelines for the second generation system for Broadcasting, Interactive Services, News Gathering and other broadband satellite applications, Part2-S2 Extensions (DVB-S2X), (https://www.dvb.org/resources/public/standards/A171-2_20S2X_20imp.pdf), Mar. 2015.
Draft ETSI EN 302 307-2 v1.1.1: Digital Video Broadcasting (DVB): Second generation framing structure, channel coding and modulation systems for Broadcasting, Interactive Services, News Gathering and other broadband satellite application, DVB-S2 Extensions (DVB-S2X), (http://www.etsi.org/deliver/etsi_en/302300_302399/30230702/01.01.01_20/en_30230702v010101a.pdf), Oct. 2014.
DVB blue book A171-1: Digital Video Broadcasting (DVB): Implementation guidelines for the second generation system for Broadcasting, Interactive Services, News Gathering and other broadband satellite applications: Part 1(DVB-S2), (https://www.dvb.org/resources/public/standards/a171-1_s2_guide.pdf), Mar. 2015.
ETSI EN 301 545-2 v1.2.1: Digital Video Broadcasting (DVB): Second Generation DVB Interactive Satellite System (DVB-RCS2), Part 2: Lower Layers for Satellite standard, (http://www.etsi.org/deliver/etsi_en/301500_301599/30154502/01.02.01_60/en_30154502v010201p.pdf), Apr. 2014.

* cited by examiner

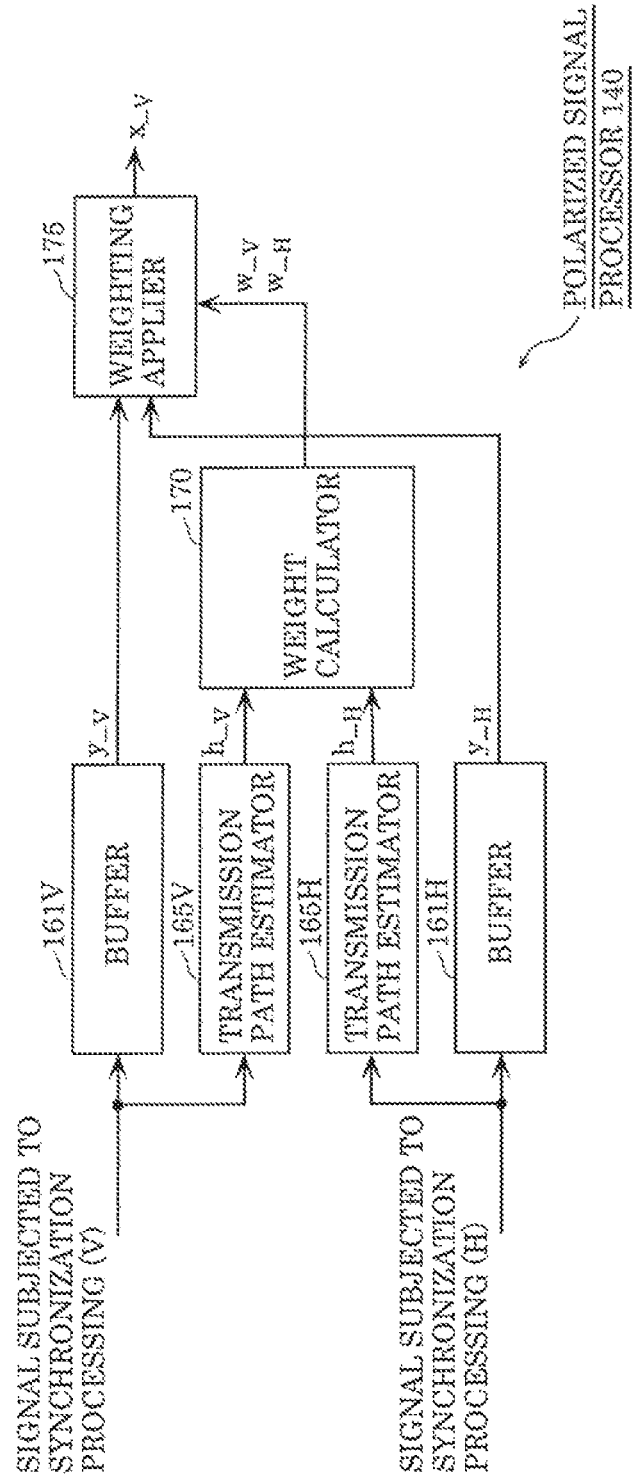

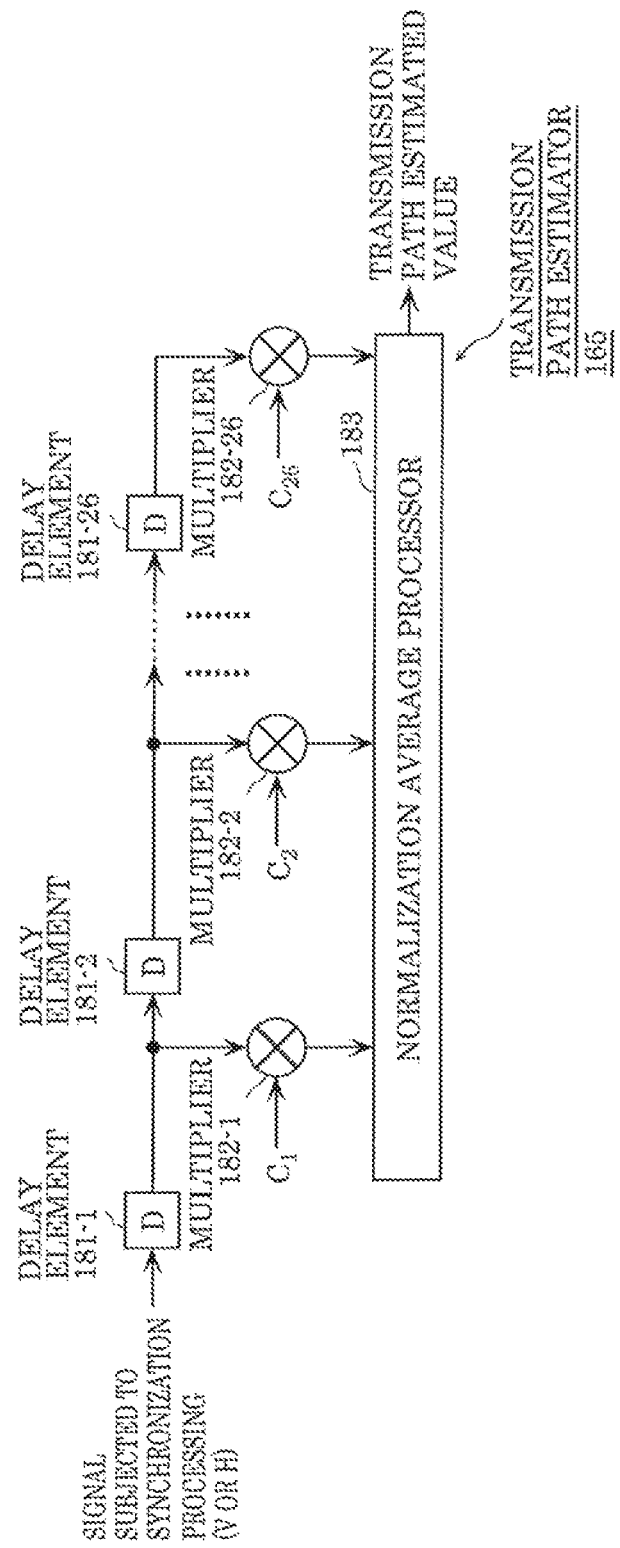

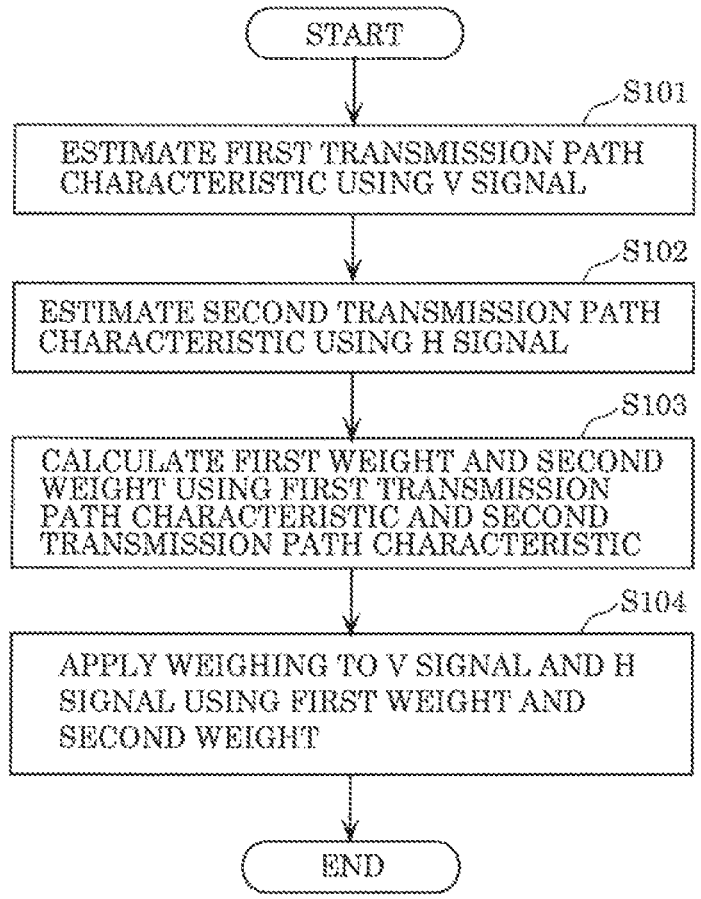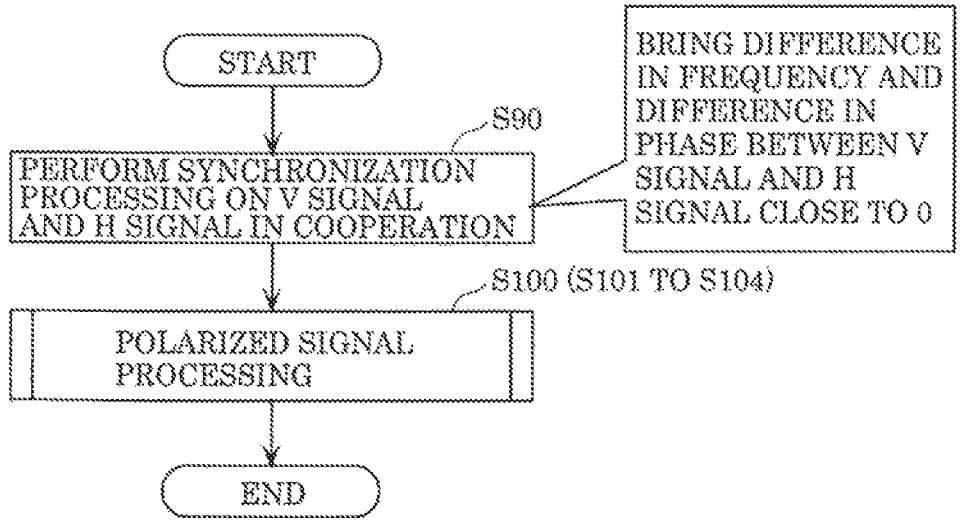

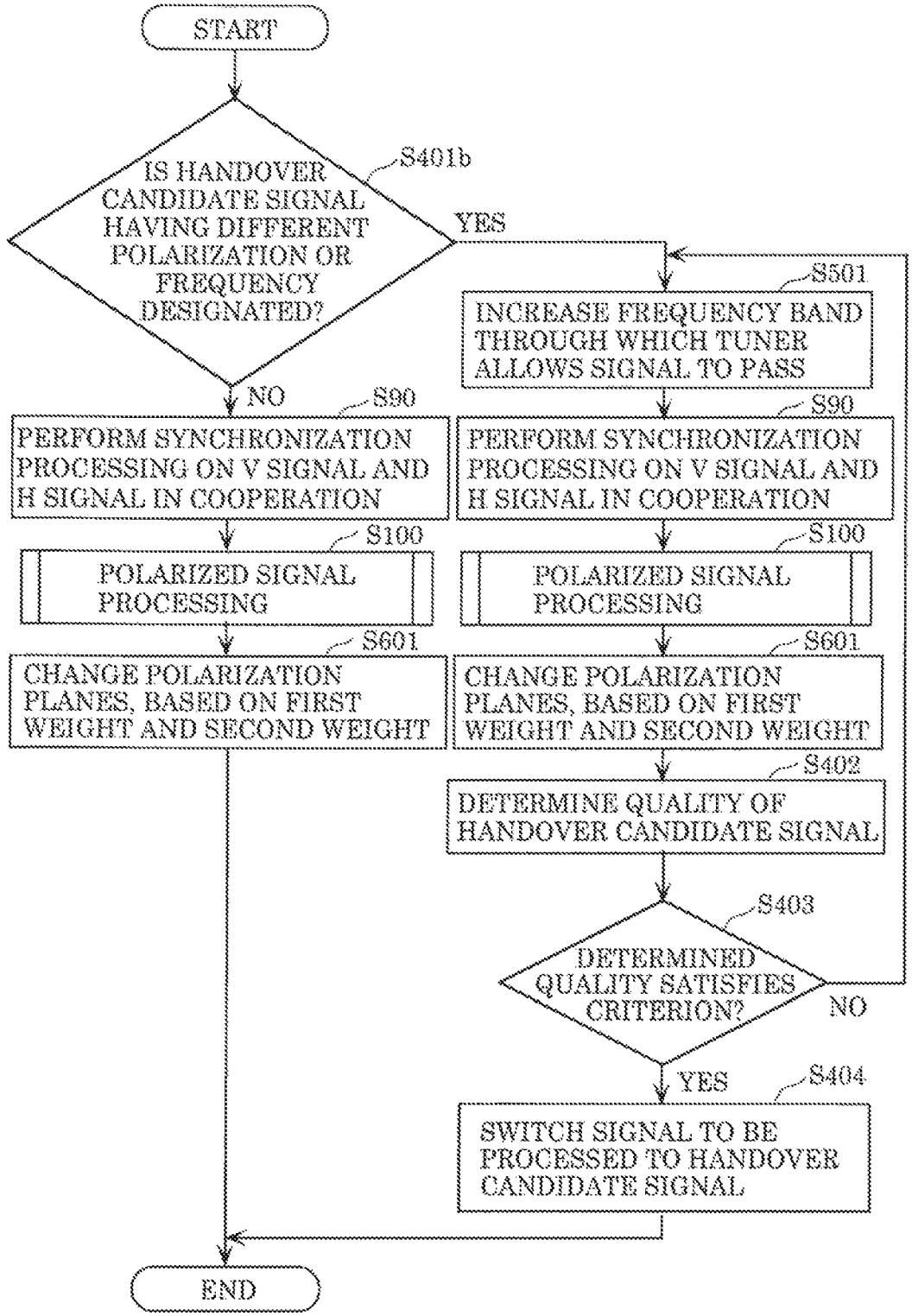

SIGNAL PROCESSING DEVICE, SIGNAL PROCESSING METHOD, RECORDING MEDIUM, AND MOBILE BODY

CROSS REFERENCE TO RELATED APPLICATIONS

This application is a U.S. continuation application of PCT International Patent Application Number PCT/JP2019/002856 filed on Jan. 29, 2019, claiming the benefit of priority of U.S. Provisional Patent Application No. 62/624,418 filed on Jan. 31, 2018, 62/694,160 filed on Jul. 5, 2018, and 62/743,886 filed on Oct. 10, 2018, the entire contents of which are hereby incorporated by reference.

BACKGROUND

1. Technical Field

The present disclosure relates to a signal processing device, a signal processing method, and a recording medium.

2. Description of the Related Art

Internet access service and live TV broadcasting service have been actively offered to passengers on an airplane during flight, which are provided by satellite ("Koku bunya ni okeru eisei tsushin no needs to jiki tsushin eisei heno kitai" [Need of satellite communication in aviation field and expectation for next communication satellite], Jiki gijyutsu shiken eisei no shorai tenbo ni kansuru workshop 2016 [Workshop 2016 on the future view of the next engineering test satellite], (March, 2016)). In recent years, High Throughput Satellites (HTS) have been sequentially introduced, and multi-spot beam technology and frequency reuse technology, for instance, improve the throughput as compared with a conventional technology when the frequency bandwidth is the same ("Eisei tsushin service no sekai doko" [World trend of satellite communication service], Jiki gijyutsu shiken eisei no shorai tenbo ni kansuru workshop 2016 [Workshop 2016 on the future view of the next engineering test satellite], (March, 2016)). An example of multi-spot beam technology is a repetition of four spot beams (4 colors) (Chapter 4.4.2 of DVB blue book A171-2 (March, 2015): Digital Video Broadcasting (DVB); Implementation guidelines for the second generation system for Broadcasting, Interactive Services, News Gathering and other broadband satellite applications; Part2-S2 Extensions (DVB-S2X)). In the repetition of four spot beams, two orthogonal polarizations (for example, vertical (V) polarization and horizontal (H) polarization) are applied to each of two bands.

SUMMARY

According to one aspect of the present disclosure, a signal processing device includes a first transmission path estimator, a second transmission path estimator, a weight calculator, a weighting applier, and a synchronization processor. The first transmission path estimator estimates a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from a vertical polarization antenna and a horizontal polarization antenna receiving the transmission signal. The second transmission path estimator estimates a second transmission path characteristic of the transmission signal using the horizontal signal. The weight calculator calculates a first weight for the vertical signal and a second weight for the horizontal signal, using the first transmission path characteristic and the second transmission path characteristic. The weighting applier applies weighted summation to the vertical signal and the horizontal signal using the first weight and the second weight. The synchronization processor performs synchronization processing on each of the vertical signal and the horizontal signal. The first transmission path characteristic is a characteristic of a transmission path through which the transmission signal is transmitted from the transmission device to the vertical polarization antenna. The second transmission path characteristic is a characteristic of a transmission path through which the transmission signal is transmitted from the transmission device to the horizontal polarization antenna. The first transmission path characteristic indicates a proportion of a signal included in the vertical signal within the transmission signal. The second transmission path characteristic indicates a proportion of a signal included in the horizontal signal within the transmission signal. The first transmission path estimator and the second transmission path estimator estimate the first transmission path characteristic and the second transmission path characteristic, using the vertical signal and the horizontal signal on each of which the synchronization processing has been performed. The weighting applier applies the weighted summation to the vertical signal and the horizontal signal on each of which the synchronization processing has been performed. The synchronization processor establishes frame synchronization by detecting that a correlation value of a known bit pattern with at least one of the vertical signal or the horizontal signal exceeds a threshold. The synchronization processor includes a first synchronization processor that performs the synchronization processing on the vertical signal and a second synchronization processor that performs the synchronization processing on the horizontal signal. The first synchronization processor and the second synchronization processor cooperate with each other in bringing each of a difference in frequency and a difference in phase between the vertical signal and the horizontal signal close to 0.

The specification and the drawings clarify further advantages and advantageous effects according to aspects of the present disclosure. Such advantages and/or advantageous effects are yielded by features of some embodiments and features described in the specification and illustrated in the drawings, yet not all are necessarily provided in order to obtain one or more features equivalent to the features described and illustrated.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 illustrates an example of a configuration of a polarized signal processor in Embodiment 1;

FIG. 8 illustrates an example of a configuration of a transmission path estimator in Embodiment 1;

FIG. 9 is a flowchart illustrating an example of processing operation of a signal processing device in Embodiment 1;

FIG. 10 is a flowchart illustrating another example of processing operation of the signal processing device in Embodiment 1;

FIG. 60 is a flowchart illustrating an example of processing operation of a signal processing device in Embodiment 15.

Figure 1:
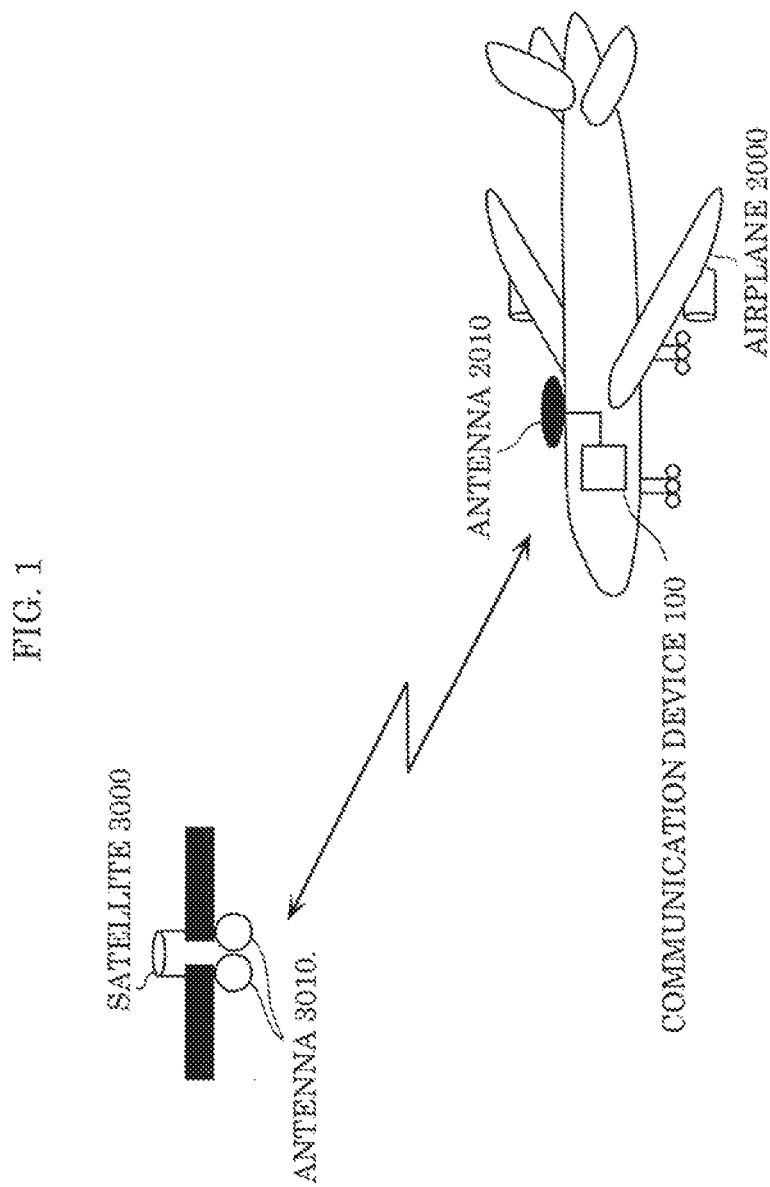
FIG. 1 illustrates an example of a configuration of a communication system in Embodiment 1.

DETAILED DESCRIPTION OF THE EMBODIMENTS (Underlying Knowledge Forming Basis of Present Disclosure)

The inventors of the present disclosure have found that conventional signal processing described in the "Description of the Related Art" section has problems as below.

When a satellite signal is received by a mobile body such as an aircraft, polarization changes every moment based on a positional relationship between the satellite and the mobile body and rotations of the mobile body and the satellite such as rolling and yawing, which results in deterioration in reception performance. This becomes more noticeable in the case of an aircraft that travels a long distance at high speed. To address this, an aircraft calculates a polarization angle from the positional relationship (latitude and longitude information) between a satellite and the body of the aircraft, and reduces deterioration of the reception performance thereof by mechanically or electronically changing the polarization plane.

However, the precise optimal point cannot be obtained. Further, there are problems that a situation where the attitudes of the body of the aircraft and the satellite cannot be tracked arises, and the phase and power of a circuit in a radio frequency (RF) front end portion that includes a V polarization antenna and an H polarization antenna need to be adjusted in advance.

To address this, it is unnecessary to consider changing a polarization plane if right-hand polarization or left-hand polarization is used. However, a circular polarization transponder for right-hand or left-hand polarization requires, for example, twice the number of transmission amplifiers, so that the cost increases consequently. Thus, it is difficult to use circular polarization transponders for all satellite beams.

In order to address such problems, a signal processing device according to an aspect of the present disclosure includes: a first transmission path estimator that estimates a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from a vertical polarization antenna and a horizontal polarization antenna receiving the transmission signal; a second transmission path estimator that estimates a second transmission path characteristic of the transmission signal using the horizontal signal; a weight calculator that calculates a first weight for the vertical signal and a second weight for the horizontal signal, using the first transmission path characteristic and the second transmission path characteristic; and a weighting applier that applies weighted summation to the vertical signal and the horizontal signal using the first weight and the second weight. The first transmission path characteristic is a characteristic of a transmission path through which the transmission signal is transmitted from the transmission device to the vertical polarization antenna, and the second transmission path characteristic is a characteristic of a transmission path through which the transmission signal is transmitted from the transmission device to the horizontal polarization antenna. For example, the first transmission path characteristic may indicate a proportion of a signal included in the vertical signal within the transmission signal, and the second transmission path characteristic may indicate a proportion of a signal included in the horizontal signal within the transmission signal.

Accordingly, in order to receive a signal transmitted from the transmission device such as a satellite, not only a signal obtained from an antenna for polarization of the transmitted signal, but also a signal obtained from an antenna for polarization orthogonal to the polarization of the transmitted signal are used. Specifically, a vertical signal and a horizontal signal are used. Furthermore, weighted summation is applied to such vertical and horizontal signals using weights according to the transmission path characteristics thereof. Accordingly, performance of signal processing can be improved. Thus, when a minimum mean square error (MMSE) weight is used for the weights, even if the polarization of a transmission signal changes every moment, a received signal-to-noise power ratio (SNR) that deteriorates when the polarization plane deviates from the optimal point can be improved. Furthermore, a received signal-to-interference-plus-noise power ratio (SINR) can also be improved.

The signal processing device may further include: a synchronization processor that performs synchronization processing on each of the vertical signal and the horizontal signal. The first transmission path estimator and the second transmission path estimator may estimate the first transmission path characteristic and the second transmission path characteristic, using the vertical signal and the horizontal signal on each of which the synchronization processing has been performed. The weighting applier may apply the weighted summation to the vertical signal and the horizontal signal on each of which the synchronization processing has been performed. The synchronization processor may include: a first synchronization processor that performs the synchronization processing on the vertical signal; and a second synchronization processor that performs the synchronization processing on the horizontal signal. The first synchronization processor and the second synchronization processor may cooperate with each other in bringing each of a difference in frequency and a difference in phase between the vertical signal and the horizontal signal close to 0.

For example, a frequency deviation and a phase deviation that occur when two polarized signals received by the antennas are transmitted in a multiplexed manner through one cable may impair reception performance. However, in an aspect of the present disclosure, synchronization processing is performed on each of a vertical signal and a horizontal signal in cooperation, to bring each of a difference in frequency and a difference in phase close to 0, and thus a synchronization deviation of each of the vertical signal and the horizontal signal can be reduced.

The first synchronization processor and the second synchronization processor may further cooperate with each other in decreasing an error in clock timing between the vertical signal and the horizontal signal, and making a sum of power of the vertical signal and power of the horizontal signal constant.

Accordingly, the accuracy of synchronization processing on the vertical signal and the horizontal signal can be increased.

The signal processing device may further include: a polarization offsetter that provides an offset to the vertical signal and an offset to the horizontal signal; and a synchronization processor that performs synchronization processing on each of the vertical signal provided with the offset and the horizontal signal provided with the offset. The first transmission path estimator and the second transmission path estimator may estimate the first transmission path characteristic and the second transmission path characteristic, using the vertical signal and the horizontal signal on each of which the synchronization processing has been performed. The weighting applier may apply the weighted summation to the vertical signal and the horizontal signal on each of which the synchronization processing has been performed. The polarization offsetter may provide an offset to a vertical signal and an offset to a horizontal signal on each of which the synchronization processing is to be performed next, based on at least one of (i) results of the synchronization processing by the synchronization processor or (ii) information included in a signal resulting from the weighted summation.

Accordingly, even under a condition that an interference signal similar to a satellite signal (namely, a desired signal) from the transmission device is present, offsets can be provided to the vertical signal and the horizontal signal so that the desired signal can be obtained. Accordingly, a desired signal and an interference signal can be distinguished, and the influence of an interference component can be reduced, so that the received SINR can be improved.

The signal processing device may further include: an equalizer that performs equalization processing on the vertical signal and the horizontal signal, or on a signal resulting from the weighted summation.

Accordingly, equalization processing is performed, and thus the influence of inter-symbol interference can be decreased. Thus, the influence of a delay wave can be reduced. As a result, the received SINR can be improved.

The signal processing device may further include: a synchronization processor that performs synchronization processing on each of the vertical signal and the horizontal signal; and a handover controller that designates a handover candidate signal having a frequency different from a frequency of the transmission signal. When the handover candidate signal is designated, (i) the weighting applier may not apply the weighted summation, and (ii) the synchronization processor may determine whether a reception signal satisfies a predetermined condition, the reception signal resulting from being received by an antenna for polarization different from polarization of the transmission signal, out of the vertical polarization antenna and the horizontal polarization antenna. When the synchronization processor determines that the reception signal satisfies the predetermined condition, the handover controller may output a handover execution signal. When the handover execution signal is obtained, the synchronization processor, the first transmission path estimator, the second transmission path estimator, the weight calculator, and the weighting applier may switch a signal to be processed from the transmission signal to the handover candidate signal.

Accordingly, for example, application of MMSE weighted summation is stopped when handover is performed, but nevertheless, handover can be appropriately performed.

The signal processing device may further include: a synchronization processor that performs synchronization processing on each of the vertical signal and the horizontal signal; and a handover controller that designates a handover candidate signal having a frequency same as a frequency of the transmission signal and polarization different from polarization of the transmission signal. When the handover candidate signal is designated, the synchronization processor determines whether the handover candidate signal satisfies a predetermined condition, based on correlation values indicating correlations of known information with information items included in signals received by the vertical polarization antenna and the horizontal polarization antenna. When the synchronization processor determines that the handover candidate signal satisfies the predetermined condition, the handover controller may output a handover execution signal. When the handover execution signal is obtained, the synchronization processor, the first transmission path estimator, the second transmission path estimator, the weight calculator, and the weighting applier may switch a signal to be processed from the transmission signal to the handover candidate signal.

Accordingly, even when handover is performed, the synchronization timing can be continuously detected from a desired signal without interruption. As a result, weighted summation can be continuously applied to a desired signal also when handover is performed, and the SINR can be improved near the cell edge in particular.

The signal processing device may further include: a tuner that allows signals each having a frequency in a frequency band currently set to pass through, out of signals received by the vertical polarization antenna and the horizontal polarization antenna; a synchronization processor that performs synchronization processing on each of the signals that have passed through the tuner, out of the vertical signal and the horizontal signal; and a handover controller that designates a handover candidate signal having a frequency and polarization at least one of which is different from a frequency and polarization of the transmission signal. When the handover candidate signal is designated, (i) the tuner may increase the frequency band to allow the handover candidate signal to pass through, and (ii) the synchronization processor may determine whether the handover candidate signal satisfies a predetermined condition, based on a correlation value indicating a correlation of known information with information included in the handover candidate signal that has passed through the tuner. When the synchronization processor determines that the handover candidate signal satisfies the predetermined condition, the handover controller may output a handover execution signal. When the handover execution signal is obtained, the synchronization processor, the first transmission path estimator, the second transmission path estimator, the weight calculator, and the weighting applier may switch a signal to be processed from the transmission signal to the handover candidate signal.

Accordingly, no matter what signal the handover candidate signal is, the influence of interference components in both a desired signal and a handover candidate signal can be continuously reduced when handover is performed. As a result, the received SINR can be improved.

The signal processing device may further include; a tuner that allows signals each having a frequency in a first frequency band currently set to pass through, out of signals received by the vertical polarization antenna and the horizontal polarization antenna; a synchronization processor that performs synchronization processing on each of the signals that have passed through the tuner, out of the vertical signal and the horizontal signal; and a handover controller that designates a handover candidate signal having a frequency and polarization at least one of which is different from a frequency and polarization of the transmission signal. When the handover candidate signal is designated, (i) the tuner may switch, by time-sharing, a frequency band for a signal to pass through between the first frequency band and a second frequency band for the handover candidate signal to pass through, and (ii) the synchronization processor may determine whether the handover candidate signal satisfies a predetermined condition, based on a correlation value indicating a correlation of known information with information included in the handover candidate signal that has passed through the tuner. When the synchronization processor determines that the handover candidate signal satisfies the predetermined condition, the handover controller may output a handover execution signal. When the handover execution signal is obtained, the synchronization processor, the first transmission path estimator, the second transmission path estimator, the weight calculator, and the weighting applier may switch a signal to be processed from the transmission signal to the handover candidate signal.

Accordingly, no matter what signal the handover candidate signal is, the influence of an interference component in one of a desired signal and a handover candidate signal can be reduced by using time-sharing when handover is performed. As a result, the received SINR can be improved.

The signal processing device may further include: an antenna controller that changes orientations of polarization planes of signals received by the vertical polarization antenna and the horizontal polarization antenna. The antenna controller may change the orientations of the polarization planes, based on the first weight and the second weight calculated by the weight calculator.

Accordingly, the influence of an interference component can be further reduced, and the received SINR can be further improved.

A mobile body according to an aspect of the present disclosure includes: the signal processing device described above; the vertical polarization antenna; and the horizontal polarization antenna.

Accordingly, for example, a mobile body such as an aircraft can improve the received SNR that deteriorates when the polarization plane deviates from the optimal point, even if polarization of a transmission signal changes every moment due to rolling and yawing. Furthermore, the received SINR can also be improved.

The following specifically describes embodiments with dereference to the drawings.

Note that the embodiments described below each show a general or specific example. The numerical values, shapes, materials, elements, the arrangement and connection of the elements, steps, and the processing order of the steps, for instance, described in the following embodiments are examples, and thus are not intended to limit the present disclosure. Among the elements in the following embodiments, elements not recited in any of the independent claims defining the most generic concept of the present disclosure are described as arbitrary elements. Furthermore, the drawings are schematic diagrams, and do not necessarily provide strictly accurate illustration. The same numerals are given to equivalent members throughout the drawings.

Embodiment 1

FIG. 1 illustrates an example of a configuration of a communication system in Embodiment 1.

The communication system includes satellite 3000 that transmits satellite signals, and communication device 100 that receives the satellite signals.

As illustrated in FIG. 1, satellite 3000 is provided with antenna 3010. Antenna 3010 is for two orthogonal polarizations (V polarization and H polarization). Accordingly, satellite 3000 transmits and receives signals by multi-spot beams using antenna 3010, that is, repetitions of four spot beams (4 colors) resulting from the two orthogonal polarizations being applied to each of two frequency bands.

As illustrated in FIG. 1, antenna 2010 is provided in airplane 2000, and connected with communication device 100. Antenna 2010 is for two orthogonal polarizations (V polarization and H polarization). Note that satellite 3000 transmits a vertically polarized (V-polarized) satellite signal in the form of a beam to the location of airplane 2000 in the present embodiment. Communication device 100 receives, using antenna 2010, the V-polarized satellite signal transmitted from satellite 3000.

Figure 2:
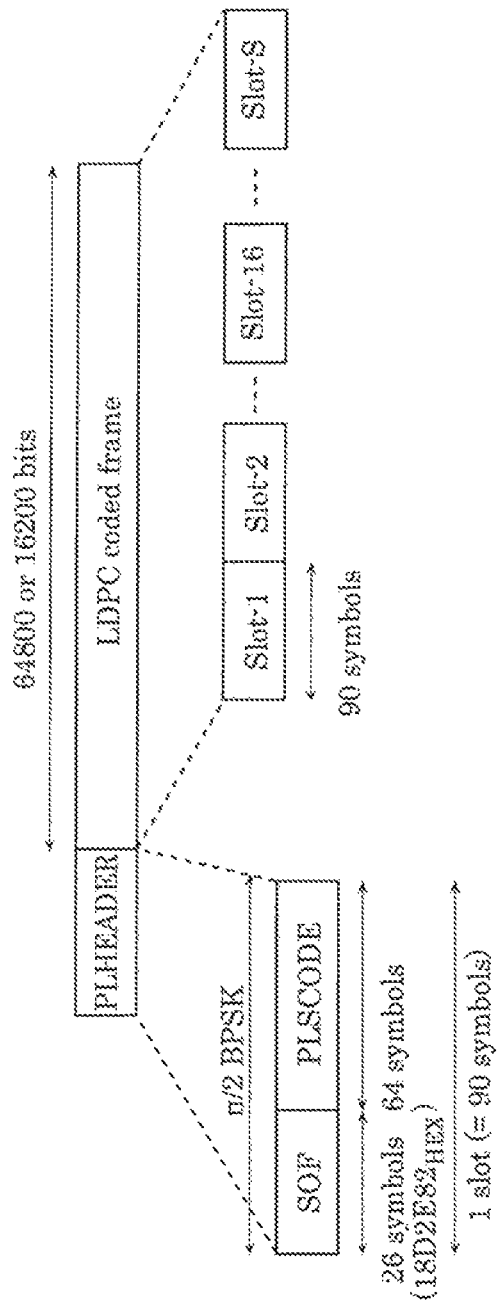
FIG. 2 illustrates a structure of a frame in accordance with the DVB-S2X standard transmitted from an antenna of a satellite in Embodiment 1.

FIG. 2 illustrates a structure of a frame in accordance with the DVB-S2X standard (Draft ETSI EN 302 307-2 v1.1.1 (October, 2014): Digital Video Broadcasting (DVB); Second generation framing structure, channel coding and modulation systems for Broadcasting, Interactive Services, News Gathering and other broadband satellite applications; DVB-S2 Extensions (DVB-S2X)) which is transmitted from antenna 3010 of satellite 3000. Each frame includes a physical layer header (PLHEADER) that includes 90 symbols, and low-density parity-check (LDPC) coded frame that includes 64800 bits or 16200 bits. PLHEADER has 90 symbols modulated by $\pi/2$-binary phase shift keying (BPSK), and includes a 26-symbol start of frame (SOF) which is a known bit pattern ($18D2E82_{HEX}$), and a 64-symbol physical layer signaling (PLS) code (PLSCODE). An LDPC coded frame includes an S slot or S slots (S is an integer of one or more), and the value of S varies depending on a modulation method. Note that one slot includes 90 symbols.

Figure 3:
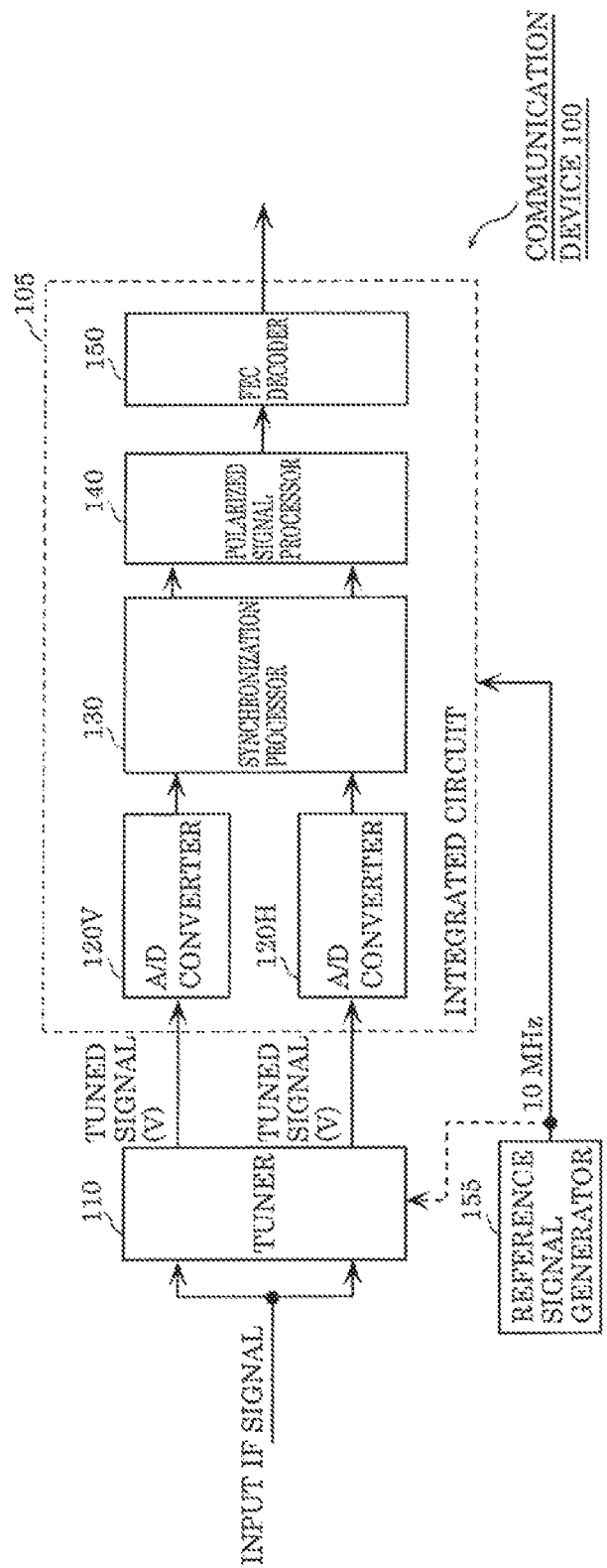
FIG. 3 illustrates an example of a configuration of a communication device provided in an airplane in Embodiment 1.

FIG. 3 illustrates an example of a configuration of communication device 100 provided in airplane 2000. Communication device 100 includes tuner 110, synchronization processor 130, polarized wave signal processer 140, forward error correction (FEC) decoder 150, and reference signal generator 155. Communication device 100 further includes analog-to-digital (A/D) converter 120V for V polarization, and A/D converter 120H for H polarization. Note that a unit that includes elements of communication device 100 except tuner 110 and reference signal generator 155 may be configured into integrated circuit 105.

The following describes operation of communication device 100.

Two polarized signals received by antenna 2010 are input to tuner 110 as signals each having a frequency in an intermediate frequency (IF) band (also referred to as an input IF signal).

Figure 4:
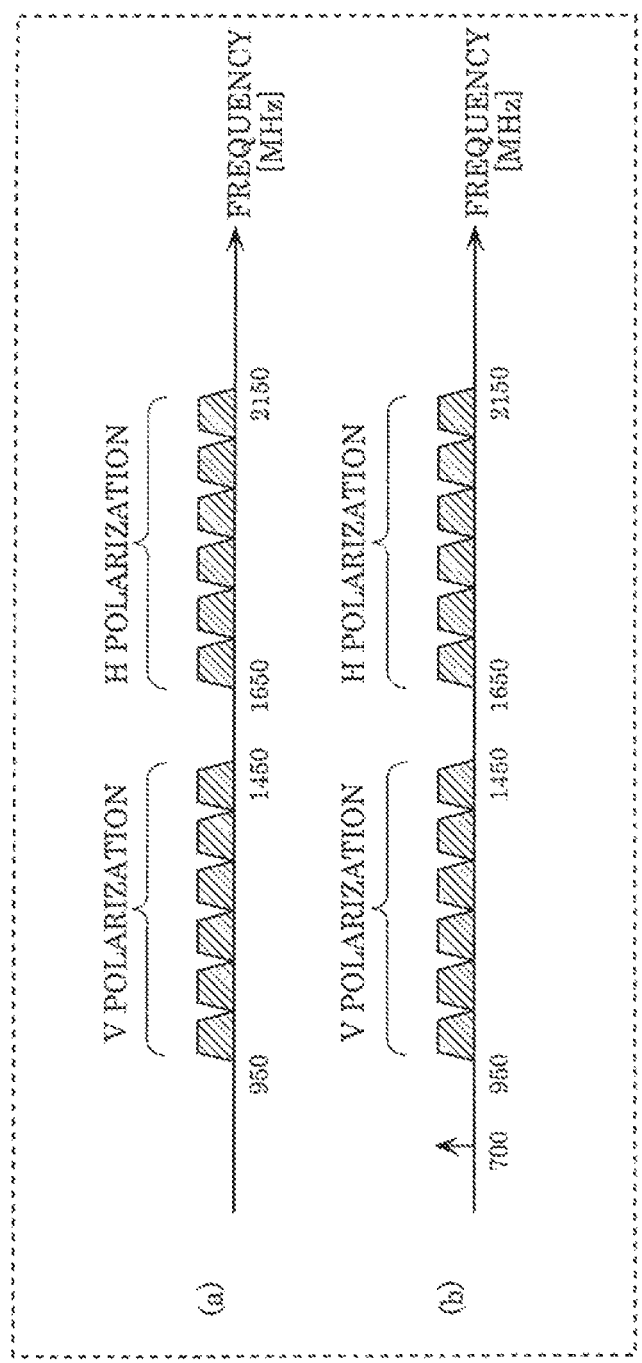
FIG. 4 illustrate examples of frequency spectra of input IF signals in Embodiment 1.

Parts (a) and (b) of FIG. 4 illustrate examples of frequency spectra of input IF signals. As illustrated in FIG. 4, a V-polarized input IF signal is input in a frequency band from 950 MHz to 1450 MHz, and a horizontally polarized (H-polarized) input IF signal is input in a frequency band from 1650 MHz to 2150 MHz. Thus, the H-polarized input IF signal is input in a frequency band higher than that for the V-polarized input IF signal by 700 MHz. Note that as described in the SUMMARY section, airplane 2000 calculates a polarization angle from the positional relationship between a satellite and the body of airplane 2000 (namely, latitude and longitude information), and mechanically or electronically changes the polarization plane of antenna 2010, but has not yet succeeded in obtaining the precise optimal point.

Figure 5:
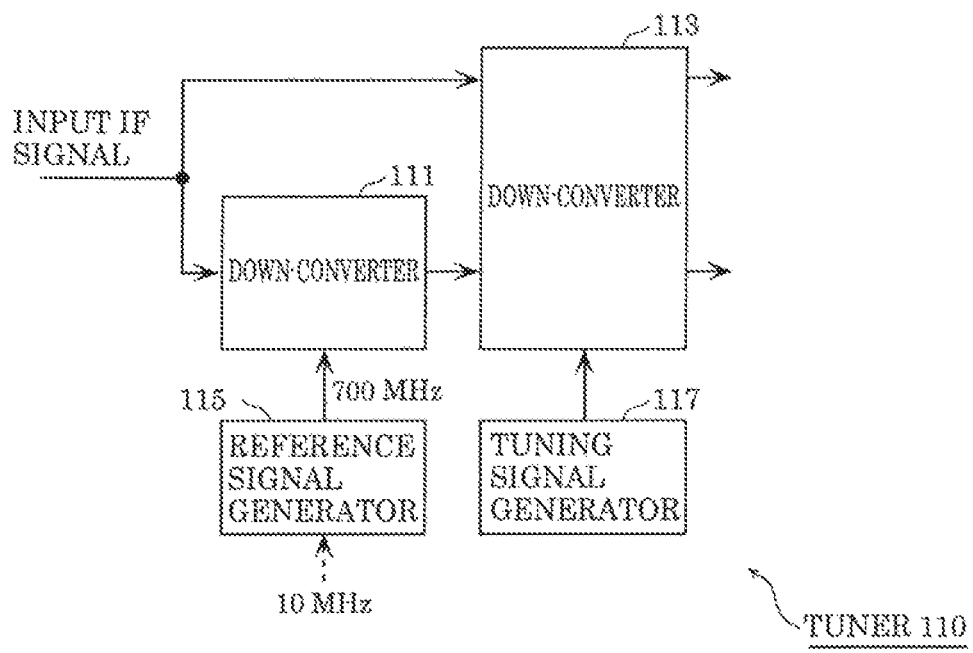
FIG. 5 illustrates an example of a configuration of a tuner in Embodiment 1.

FIG. 5 illustrates an example of a configuration of tuner 110. Tuner 110 includes down-converters 111 and 113, reference signal generator 115, and tuning signal generator 117.

In tuner 110 in FIG. 5, reference signal generator 115 generates a 700-MHz reference signal. Down-converter 111 multiplies an input IF signal illustrated in (a) of FIG. 4 by the 700-MHz reference signal, and extracts an H-polarized signal down-converted to a band from 950 MHz to 1450 MHz using a band-pass filter (BPF). Tuning signal generator 117 generates a tuning signal having the same center frequency as that of a selected frequency band, out of signals that occupy a band from 950 MHz to 1450 MHz. Down-converter 113 multiplies each of the input IF signal illustrated in (a) of FIG. 4 and a signal output from down-converter 111 by the tuning signal, extracts a V-polarized signal and an H-polarized signal each down-converted to the baseband using low-pass filters (LPFs), and outputs the resultant signals as a tuned V signal and a tuned H signal.

Note that in the present embodiment, satellite 3000 transmits a V-polarized signal in the form of a beam to the location of airplane 2000, as described above. Communication device 100 receives the V-polarized signal transmitted from satellite 3000 using antenna 2010. Accordingly, tuner 110 extracts a tuned V signal from the V-polarized signal received using a V polarization antenna included in antenna 2010 and outputs the tuned V signal, and extracts a tuned H signal from the V-polarized signal received using an H polarization antenna included in antenna 2010, and outputs the tuned H signal. In this case, down-converter 111 of tuner 110 down-converts only a signal having a frequency in a band from 1650 MHz to 2150 MHz, out of the input IF signals.

Next, as illustrated in FIG. 3, a 10-MHz reference signal generated by reference signal generator 155 is input to integrated circuit 105. V polarization A/D converter 120V converts a tuned V signal from an analog signal into a digital signal. As a result, a V-polarized tuned digital signal is output. H polarization A/D converter 120H converts a tuned H signal from an analog signal into a digital signal. As a result, an H-polarized tuned digital signal is output.

Figure 6:
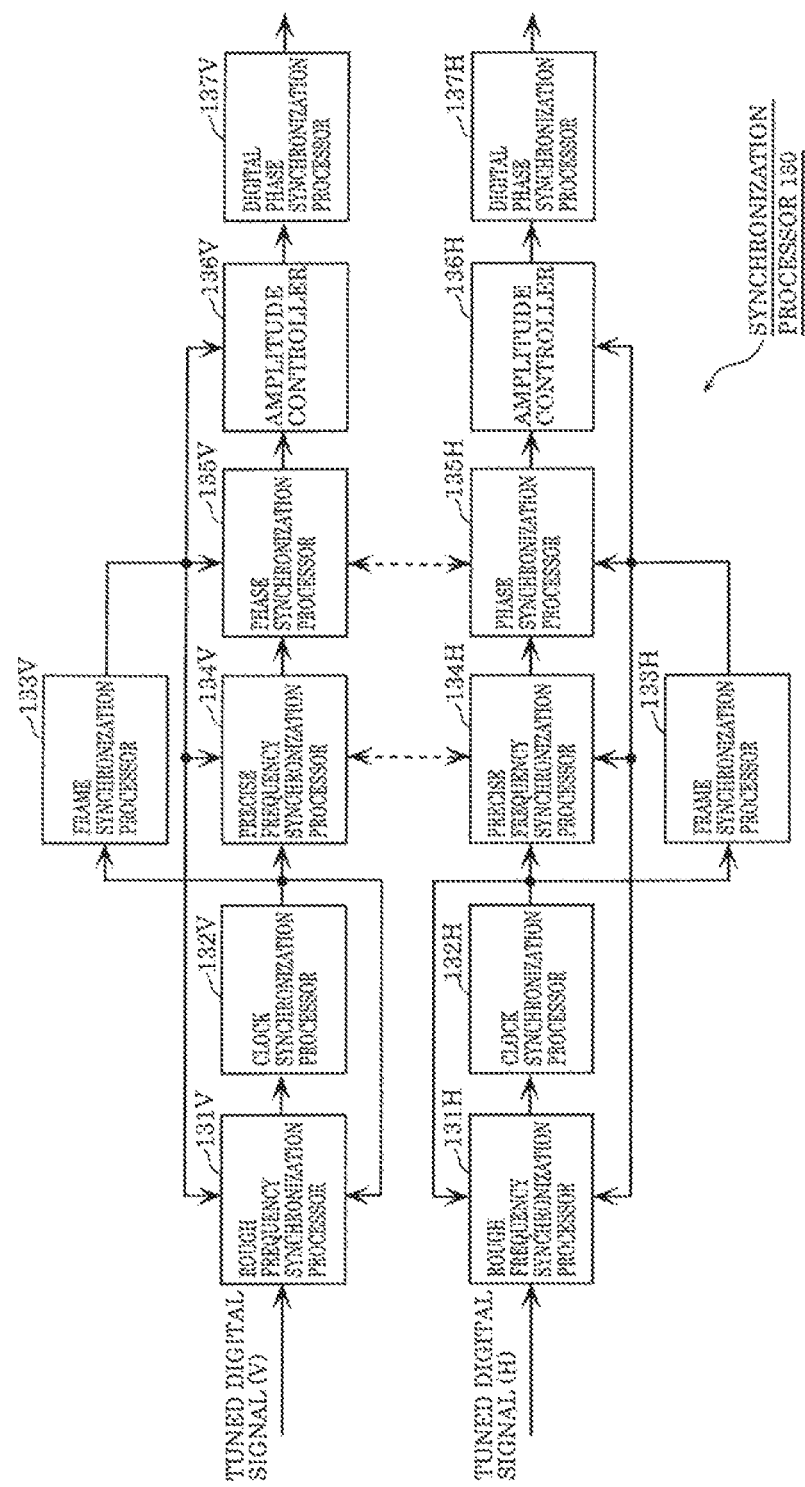
FIG. 6 illustrates an example of a configuration of a synchronization processor in Embodiment 1.

FIG. 6 illustrates an example of a configuration of synchronization processor 130. Synchronization processor 130 includes rough frequency synchronization processor 131V, clock synchronization processor 132V, frame synchronization processor 133V, precise frequency synchronization processor 134V, phase synchronization processor 135V, amplitude controller 136V, and digital phase synchronization processor 137V, which are for V polarization. Furthermore, synchronization processor 130 includes rough frequency synchronization processor 131H, clock synchronization processor 132H, frame synchronization processor 133H, precise frequency synchronization processor 134H, phase synchronization processor 135H, amplitude controller 136H, and digital phase synchronization processor 137H, which are for H polarization. Note that in the reference signs given to elements, "V" indicates that the element is for V polarization, and "H" indicates that the element is for H polarization, in the present disclosure. Furthermore, in the present disclosure, if "H" or "V" is omitted from a reference sign, the reference sign denotes an element for one of or each of V polarization and H polarization. For example, rough frequency synchronization processor 131 means one of or each of rough frequency synchronization processor 131V and rough frequency synchronization processor 131H.

Synchronization processor 130 performs synchronization processing on the tuned V signal and the tuned H signal converted into digital signals. Synchronization processor 130 outputs the tuned V signal on which synchronization processing is performed, as a V signal or a signal subjected to synchronization processing, and outputs the tuned H signal on which synchronization processing is performed, as an H signal or a signal subjected to synchronization processing. The basic operation is in accordance with Annex C of Non Patent Literature (NPL) 5 (DVB blue book A171-1 (March, 2015): Digital Video Broadcasting (DVB); Implementation guidelines for the second generation system for Broadcasting, Interactive Services, News Gathering and other broadband satellite applications; Part 1 (DVB-S2)), and thus the following describes only distinctive operation of the present embodiment.

Tuner 110 in FIG. 5 down-converts an H-polarized signal to a band from 950 to 1450 MHz, using a 700-MHz reference signal generated irrespectively of the 10-MHz reference signal used by synchronization processor 130. Accordingly, if synchronization processor 130 just performs synchronization processing for two routes independently from each other on the tuned V signal and the tuned H signal that are output from tuner 110, a frequency deviation and a phase deviation between a V signal and an H signal output from synchronization processor 130 occur. Accordingly, synchronization processor 130 performs phase locked loop (PLL) control or feed forward control to adjust the difference between frequencies synchronized by precise frequency synchronization processors 134 for V polarization and H polarization to 0. Furthermore, synchronization processor 130 performs PLL control or feed forward control to adjust the difference between phases synchronized by phase synchronization processors 135 for V polarization and H polarization to 0.

Alternatively, as illustrated in FIG. 5, the 10-MHz reference signal generated by reference signal generator 155 may be input to tuner 110, and reference signal generator 115 may generate a 700-MHz reference signal using the 10-MHz reference signal. Alternatively, as illustrated in (b) of FIG. 4, tuner 110 may extract the 10-MHz reference signal generated by reference signal generator 155 and multiplexed on an input IF signal, and reference signal generator 115 may generate a 700-MHz reference signal using the 10-MHz reference signal. In such cases, if synchronization processor 130 just performs synchronization processing for two routes independently from each other on the tuned V signal and the tuned H signal that are output from tuner 110, only a phase deviation occurs between a V signal and an H signal output from synchronization processor 130. Accordingly, synchronization processor 130 performs PLL control or feed forward control to adjust the difference between phases synchronized by phase synchronization processors 135 for V polarization and H polarization to 0.

As described above, a V-polarized tuned digital signal and an H-polarized tuned digital signal on which synchronization processor 130 has performed synchronization processing are input to polarized signal processor 140 as signals subjected to synchronization processing (namely, a V signal and an H signal).

FIG. 7 illustrates an example of a configuration of polarized signal processor 140. Polarized signal processor 140 includes weight calculator 170 and weighting applier 175. Furthermore, polarized signal processor 140 includes buffer 161V and transmission path estimator 165V for V polarization, and buffer 161H and transmission path estimator 166H for H polarization.

FIG. 8 illustrates an example of a configuration of transmission path estimator 165. Note that the configuration of transmission path estimator 165 illustrated in FIG. 8 represents the configuration of each of transmission path estimators 165V and 165H.

Transmission path estimator 165 includes 26 delay elements 181-1 to 181-26, 26 multipliers 182-1 to 182-26, and normalization average processor 183. Note that in the present embodiment, 26 delay elements 181-1 to 181-26 may be each referred to as delay element 181, and 26 multipliers 182-1 to 182-26 may be each referred to as multiplier 182.

In transmission path estimator 165 in FIG. 8, at the timing when 26 symbols of the SOF are stored in 26 delay elements

181, 26 multipliers 182 multiply complex numbers of outputs from 26 delay elements 181 with complex numbers of 26 coefficients $C_1$ to $C_{26}$. 26 coefficients $C_1$ to $C_{26}$ are conjugate complex numbers of symbols resulting from modulating bits of the known bit pattern ($18D2E82_{HEX}$) illustrated in FIG. 2 by π/2-BPSK. Normalization average processor 183 performs average processing on the outputs from 26 multipliers 182, and outputs a normalized value as a transmission path estimated value. Note that when there is no error of 26 symbols of the SOF input to transmission path estimator 165, transmission path estimator 165 performs processing to adjust the output to 1, as the normalization described above. Thus, transmission path estimator 165 performs processing of correlating 26 symbols of the SOF included in a signal to be input, which has been subjected to synchronization processing, with 26 symbols resulting from modulating bits of the known bit pattern ($18D2E82_{HEX}$) by π/2-BPSK.

Using the transmission path estimated values output from transmission path estimators 165V and 165H in FIG. 8, weight calculator 170 in FIG. 7 calculates minimum mean square error MMSE) weight $w=[w_{-V}, w_{-H}]^T$, as in Expression (1) below. $[.]^T$ expresses transpose of a matrix.

$$w=h^H(hh^H+o^2I)^{-1} \quad \text{Expression (1)}$$

Here, $h_{-V}$ and $h_{-H}$ denote transmission path estimated values of signals received by the V polarization antenna and the H polarization antenna in antenna 2010, respectively, and h in Expression (1) represents $h=[h_{-V}, h_{-H}]^T$, $[.]^H$ denotes Hermitian transpose of a matrix, $o^2$ denotes distribution of received noise, and I denotes an identity matrix.

If $o^2=0$, w denotes the weight of zero forcing (ZF).

If received signals received via antenna 2010 have interference components, when $h_{-VU} \ldots h_{-VU}$ and $h_{-HU}$ denote transmission path estimated values of the paths to the V polarization antenna and the H polarization antenna with respect to the interference components and $h_{-U}=[h_{-VU}, h_{-HU}]^T$ is satisfied, MMSE weight w is calculated by Expression (2).

$$w=h^H(hh^H+h_{-U}h_{-U}^H+o^2I)^{-1} \quad \text{Expression (2)}$$

Weighting applier 175 in FIG. 7 performs, using weights $w_{-V}$ and $w_{-H}$ output from weight calculator 170, processing of applying MMSE weighting as shown by Expression (3) below, and outputs resultant V-polarized signal $x_{-V}$.

$$x_{-V}=w_{-V}y_{-V}+w_{-H}y_{-H} \quad \text{Expression (3)}$$

Here, $y_{-V}$ denotes a signal delayed by buffer 161V by the time for processing in transmission path estimator 165V and weight calculator 170, out of V-polarized signals subjected to synchronization processing and input to polarized signal processor 140. $y_{-H}$ denotes a signal delayed by buffer 16111 by the time for processing in transmission path estimator 165H and weight calculator 170, out of H-polarized signals subjected to synchronization processing and input to polarized signal processor 140. As shown by Expressions (1) to (3), weight calculation and weighting processing is maximum-ratio combining processing on V-polarized and H-polarized signals subjected to synchronization processing.

Next, as illustrated in FIG. 3, FEC decoder 150 of communication device 100 performs forward error correction processing on V-polarized signal $x_{-V}$ that is an output from polarized signal processor 140.

The above configuration prevents a synchronization deviation for each of a V-polarized input IF signal and an H-polarized input IF signal that are input to communication device 100. Furthermore, a received SNR that has deteriorated due to the deviation of the polarization plane from the optimal point can be improved by performing MMSE processing using signals received by the V and H polarization antennas (namely, antenna 2010). Further, a signal in the form of a neighboring beam, which has the same frequency as and different polarization from a beam at the location of airplane 2000, is attenuated by the cross-polar discrimination (XPD) ratio, and becomes an interference component. However, in the present embodiment, a received SINR can be improved by MMSE processing. Furthermore, when the airplane is flying at the edge of a beam, a signal in the form of a neighboring beam, which has the same frequency as and the same polarization as those of a beam at the location of airplane 2000, becomes a greater interference component. However, in the present embodiment, influence due to an interference component can be reduced by MMSE processing, and the received SINR can be improved.

<Variation>

For example, an unknown satellite signal having the same frequency may reach airplane 2000 as an interference wave. At this time, transmission path estimated value $h_{-U}$ of the unknown satellite signal cannot be obtained, and thus weight calculator 170 in FIG. 7 may calculate MMSE weight w as shown by Expression (2)' below, instead of Expression (2).

$$w=h^H(E[yy^H])^{-1} \quad \text{Expression (2)'}$$

Here, y in Expression (2)' represents $y=[y_{-V}, y_{-H}]^T$, and E[.] is an expected value.

Accordingly, the influence of an interference component due to an unknown satellite signal can also be reduced by MMSE processing, and the received SINR can be improved.

Here, communication device 100 in the present embodiment and this variation includes a signal processing device for receiving signals transmitted from satellite 3000. This signal processing device includes polarized signal processor 140, for example.

Specifically, the signal processing device includes transmission path estimator 165V that is a first transmission path estimator, transmission path estimator 165H that is a second transmission path estimator, weight calculator 170, and weighting applier 175.

Transmission path estimator 165V estimates a first transmission path characteristic of a transmission signal using, out of a vertical signal and a horizontal signal, the vertical signal, the transmission signal being transmitted from satellite 3000 that is a transmission device in form of one of vertical polarization and horizontal polarization, the vertical signal and the horizontal signal resulting from a vertical polarization antenna and a horizontal polarization antenna receiving the transmission signal. Note that antenna 2010 includes the vertical polarization antenna and the horizontal polarization antenna, for example. Transmission path estimator 165H estimates a second transmission path characteristic of the transmission signal using the horizontal signal.

The first transmission path characteristic is a characteristic of a transmission path through which a transmission signal is transmitted from a transmission device (for example, satellite 3000) to the vertical polarization antenna. The second transmission path characteristic is a characteristic of a transmission path through which a transmission signal is transmitted from the transmission device to the horizontal polarization antenna. For example, when a transmission signal is transmitted in the form of vertical polarization, if the polarization angles of the vertical polarization antenna and the horizontal polarization antenna deviate from the vertical polarization, a portion of the transmission signal is received by the horizontal polarization antenna. Accordingly, for example, 80% of signal components of the transmission signal are contained in a vertical signal, and remaining 20% of the signal components are contained in a horizontal signal. The first transmission path characteristic described above may indicate a proportion of a signal included in the vertical signal within the transmission signal, and the second transmission path characteristic may indicate a proportion of a signal included in the horizontal signal within the transmission signal. The first transmission path characteristic and the second transmission path characteristic may each indicate a deviation of the polarization angle relative to a transmission signal, or more specifically, may indicate a deviation of a polarization angle of the vertical polarization antenna and a deviation of a polarization angle of the horizontal polarization antenna relative to a transmission signal, respectively. Furthermore, the first transmission path characteristic and the second transmission path characteristic may each include an attenuation characteristic of a transmission signal. The attenuation characteristic may indicate the amount or factor of attenuation of a transmission signal transmitted from the transmission device and received by the antenna due to the transmission distance of the transmission signal. The attenuation characteristic may indicate the amount or factor of attenuation of a transmission signal due to the state of a transmission path of the transmission signal such as water vapor in the air, for example. Note that in the present embodiment, the first transmission path characteristic and the second transmission path characteristic may be determined as the transmission path estimated values described above, for example.

Weight calculator 170 calculates a first weight for a vertical signal and a second weight for a horizontal signal, using the first transmission path characteristic and the second transmission path characteristic. Weighting applier 175 applies weighted summation to the vertical signal and the horizontal signal using the first weight and the second weight. For example, the first weight and the second weight are each an MMSE weight, and weighted summation is applied so that maximum-ratio combining is performed on the vertical signal and the horizontal signal. Note that a vertical signal is, for example, a V signal mentioned above, but may be any signal as long as the signal can be obtained by the V polarization antenna. Similarly, a horizontal signal is, for example, an H signal mentioned above, but may be any signal as long as the signal can be obtained by the H polarization antenna.

FIG. 9 is a flowchart illustrating an example of processing operation of the signal processing device in Embodiment 1.

The signal processing device first estimates a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from the vertical polarization antenna and the horizontal polarization antenna receiving the transmission signal (step S101). Next, the signal processing device estimates a second transmission path characteristic of the transmission signal using the horizontal signal (step S102). Next, the signal processing device calculates a first weight for the vertical signal and a second weight for the horizontal signal using the first transmission path characteristic and the second transmission path characteristic (step S103). The signal processing device applies weighted summation to the vertical signal and the horizontal signal using the first weight and the second weight (step S104). Note that polarized signal processor 140, for example, performs processing in steps S101 to S104.

Accordingly, in order to receive a signal transmitted from a transmission device such as a satellite, the signal processing device and the signal processing method in the present embodiment use not only a signal obtained from an antenna for polarization of the signal transmitted from the transmission device, but also a signal obtained from an antenna for polarization orthogonal to the polarization of the signal transmitted from the transmission device. Stated differently, a vertical signal and a horizontal signal are used. Furthermore, weighted summation is applied to such a vertical signal and a horizontal signal using weights based on the transmission path characteristics the signals. Accordingly, when the MMSE weight is used as the weights, even if the polarization of a transmission signal varies every moment, the received SNR that deteriorates when the polarization plane deviates from the optimal point can be improved. Furthermore, the received SINR can be improved.

The signal processing device may further include synchronization processor 130 that performs synchronization processing on each of the vertical signal and the horizontal signal. In this case, transmission path estimator 165V and transmission path estimator 165H estimate the first transmission path characteristic and the second transmission path characteristic, using the vertical signal and the horizontal signal on each of which synchronization processing has been performed. Weighting applier 175 applies weighted summation to the vertical signal and horizontal signal on each of which synchronization processing has been performed. Synchronization processor 130 includes a first synchronization processor that performs synchronization processing on the vertical signal, and a second synchronization processor that performs synchronization processing on the horizontal signal. The first synchronization processor and the second synchronization processor cooperate with each other in bringing each of a difference in frequency and a difference in phase between the vertical signal and the horizontal signal close to 0. For example, the first synchronization processor includes rough frequency synchronization processor 131V, clock synchronization processor 132V, frame synchronization processor 133V, precise frequency synchronization processor 134V, phase synchronization processor 135V, amplitude controller 136V, and digital phase synchronization processor 137V. The second synchronization processor includes rough frequency synchronization processor 131H, clock synchronization processor 132H, frame synchronization processor 133H, precise frequency synchronization processor 134H, phase synchronization processor 135H, amplitude controller 136H, and digital phase synchronization processor 137H. Precise frequency synchronization processor 134V and precise frequency synchronization processor 134H cooperate with each other, and phase synchronization processor 135V and phase synchronization processor 135H cooperate with each other. Specifically, when precise frequency synchronization processor 134V and precise frequency synchronization processor 134H cooperate with each other, precise frequency synchronization processor 134V transmits information indicating the frequency of a vertical signal to precise frequency synchronization processor 134H. Conversely, precise frequency synchronization processor 134H transmits information indicating the frequency of a horizontal signal to precise frequency synchronization processor 134V. When phase synchronization processor 135V and phase synchronization processor 135H cooperate with each other, phase synchronization processor 135V transmits information indicating the phase of a vertical signal to phase synchronization processor 135H. Conversely, phase synchronization processor 135H transmits information indicating the phase of a horizontal signal to phase synchronization processor 135V.

FIG. 10 is a flowchart illustrating another example of processing operation of the signal processing device in Embodiment 1.

First, the signal processing device performs synchronization processing on each of a vertical signal and a horizontal signal (step S90). At this time, as described above, the first synchronization processor and the second synchronization processor cooperate with each other in bringing each of a difference in frequency and a difference in phase between the vertical signal and the horizontal signal close to 0. The signal processing device performs polarized signal processing that includes processing of steps S101 to S104 illustrated in FIG. 9 (step S100).

Accordingly, the signal processing device and the signal processing method in the present embodiment can reduce synchronization deviations of the input vertical signal and the input horizontal signal.

Embodiment 2

Figure 11:
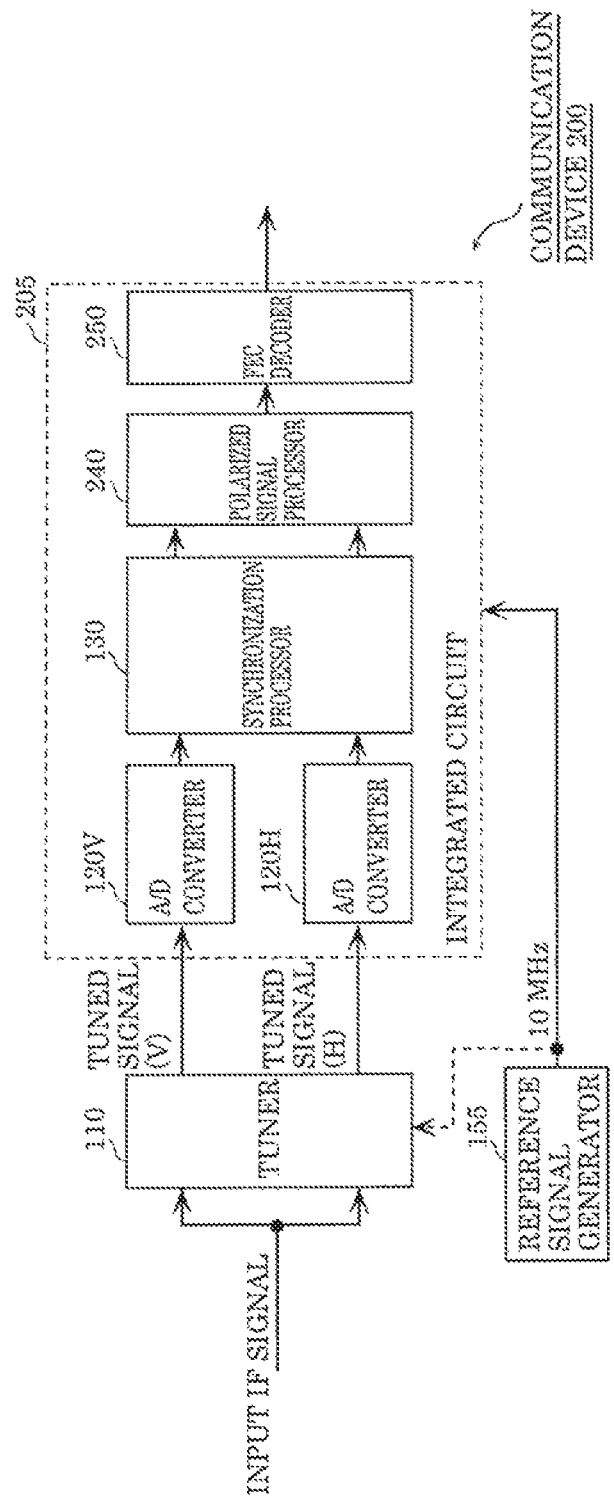
FIG. 11 illustrates an example of a configuration of a communication device in Embodiment 2.

FIG. 11 illustrates an example of a configuration of communication device 200 in Embodiment 2. Note that out of the elements included in communication device 200 in the present embodiment, the same element as an element in communication device 100 in Embodiment 1 is given the same sign as that of the element in Embodiment 1, and a detailed description thereof is omitted.

In the present embodiment, satellite signals are transmitted in a multiplexed manner in a single frequency band using V polarization and H polarization in the form of a beam at the location of airplane 2000. However, DVB-S2X frames are transmitted in a multiplexed manner at slightly different timings between V polarization and H polarization. Accordingly, this yields an advantage that the existing modulator in conformity with the DVB-S2X standard can be used as it is.

Communication device 200 in FIG. 11 has a configuration in which polarized signal processor 140 and FEC decoder 150 are replaced with polarized signal processor 240 and FEC decoder 250, respectively, as compared with communication device 100 in Embodiment 1 illustrated in FIG. 3. Note that in communication device 200, a unit that includes elements except tuner 110 and reference signal generator 155 may be configured into integrated circuit 205.

Figure 12:
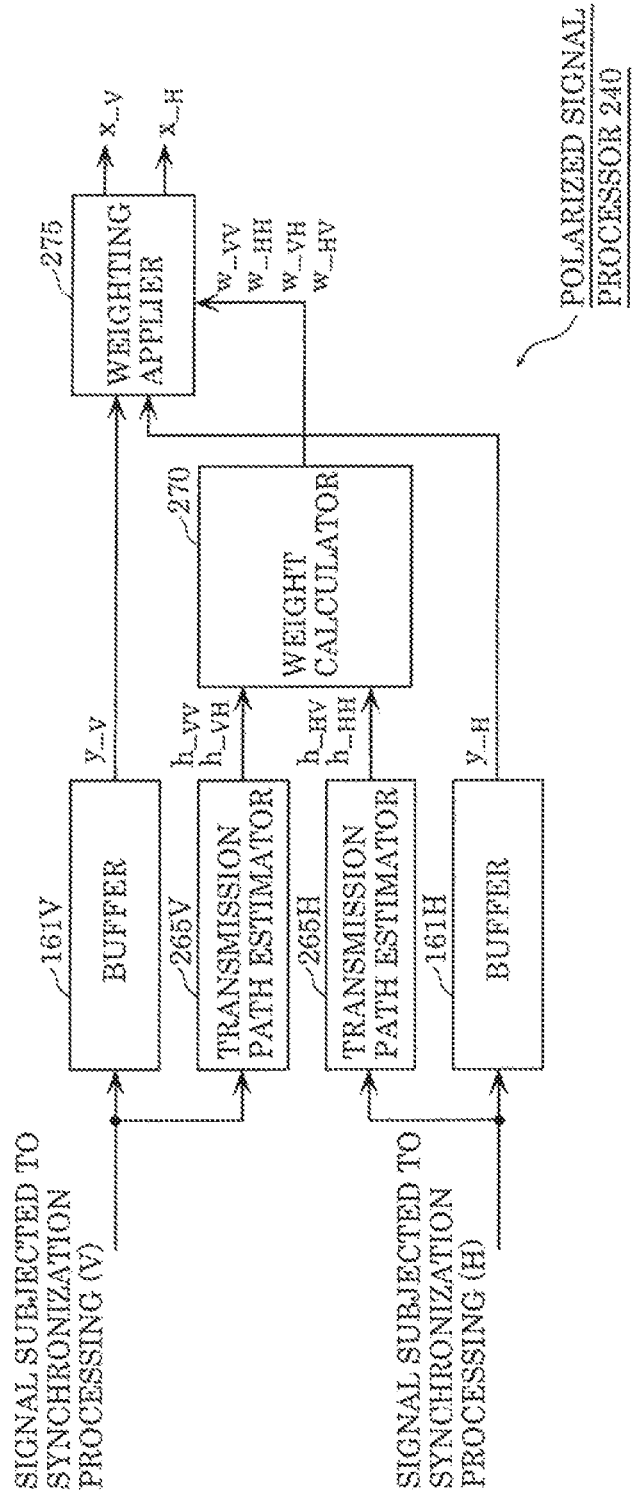
FIG. 12 illustrates an example of a configuration of a polarized signal processor in Embodiment 2.

FIG. 12 illustrates an example of a configuration of polarized signal processor 240. Polarized signal processor 240 has a configuration in which transmission path estimators 165V and 165H, weight calculator 170, and weighting applier 175 are replaced with transmission path estimators 265V and 265H, weight calculator 270, and weighting applier 275, respectively as compared with polarized signal processor 140 in Embodiment 1 illustrated in FIG. 7.

Figure 13:
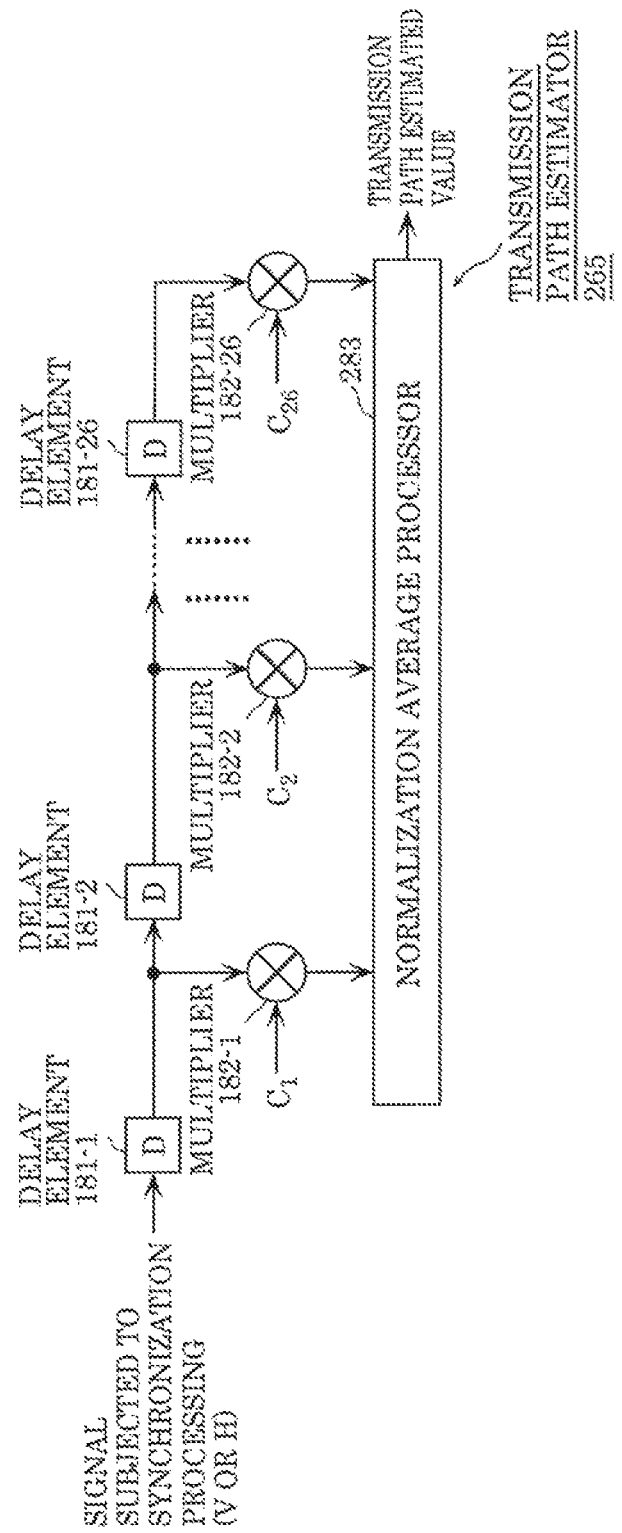
FIG. 13 illustrates a configuration of a transmission path estimator in Embodiment 2.

FIG. 13 illustrates a configuration of transmission path estimator 265. Note that the configuration of transmission path estimator 265 illustrated in FIG. 13 is a configuration of each of transmission path estimators 265V and 265H.

Transmission path estimator 265 has a configuration in which normalization average processor 183 is replaced with normalization average processor 283, as compared with transmission path estimator 165 in Embodiment 1 illustrated in FIG. 8.

Normalization average processor 283 outputs a transmission path estimated value of a satellite signal transmitted in the form of polarization identical to the reception polarization of a route in which normalization average processor 283 is disposed (a V-polarized signal, for example), similarly to normalization average processor 183 in Embodiment 1 illustrated in FIG. 8. Normalization average processor 283 monitors a normalization average processing result, from and up to times a certain symbol period ahead and behind a timing at which the normalization average processing is performed. Normalization average processor 283 outputs a monitored peak value as a transmission path estimated value of a satellite signal transmitted in the form of polarization orthogonal to the reception polarization of the above route (an H-polarized signal, for example). Specifically, normalization average processor 283 of transmission path estimator 265V outputs transmission path estimated values $h\_{VV}$ and $h\_{VH}$, and normalization average processor 283 of transmission path estimator 265H outputs transmission path estimated values $h\_{HV}$ and $h\_{HH}$.

Weight calculator 270 in FIG. 12 calculates MMSE weight matrix W using the transmission path estimated values output from transmission path estimators 265 in FIG. 13, as shown by Expressions (4) to (6) below.

[Math 1]
$$W = \begin{pmatrix} w\_{VV} & w\_{VH} \\ w\_{HV} & w\_{HH} \end{pmatrix} \quad \text{Expression (4)}$$

[Math 2]
$$H = \begin{pmatrix} h\_{VV} & h\_{VH} \\ h\_{HV} & h\_{HH} \end{pmatrix} \quad \text{Expression (5)}$$

[Math 3]
$$W = H^H (HH^H + \sigma^2 I)^{-1} \quad \text{Expression (6)}$$
$$= H^H \left( E\left[ \begin{pmatrix} y\_V \\ y\_H \end{pmatrix} \begin{pmatrix} y^*\_V & y^*\_H \end{pmatrix} \right] \right)^{-1}$$

Here, $h\_{VV}$, $h\_{VH}$, $h\_{HV}$, and $h\_{HH}$ denote a transmission path estimated value of a signal resulting from a satellite signal transmitted in the form of V polarization being received by the V polarization antenna, a transmission path estimated value of a signal resulting from a satellite signal transmitted in the form of H polarization being received by the V polarization antenna, a transmission path estimated value of a signal resulting from a satellite signal transmitted in the form of V polarization being received by the H polarization antenna, and a transmission path estimated value of a signal resulting from a satellite signal transmitted in the form of H polarization being received by the H polarization antenna.

Using weight matrix W output from weight calculator 270, weighting applier 275 in FIG. 12 performs MMSE weighting processing as shown in the following expression, and outputs resultant V-polarized signal $x\_V$ and H-polarized signal $x\_H$.

[Math 4]
$$\begin{pmatrix} x\_V \\ x\_H \end{pmatrix} = W \begin{pmatrix} y\_V \\ y\_H \end{pmatrix} \quad \text{Expression (7)}$$

Here, $y\_V$ denotes a signal delayed by buffer 161V by the time for processing in transmission path estimator 265V and weight calculator 270, out of V-polarized signals subjected to synchronization processing and input to polarized signal processor 240. $y_{-H}$ denotes a signal delayed by buffer 161H by the time for processing in transmission path estimator 265H and weight calculator 270, out of H-polarized signals subjected to synchronization processing and input to polarized signal processor 240. Further, $y^*_{-V}$ and $y^*_{-H}$ in Expression (6) are complex conjugates of $y_{-V}$ and $y_{-H}$, respectively.

Next, as illustrated in FIG. 11, FEC decoder 250 of communication device 200 performs forward error correction processing on each of V-polarized signal $x_{-V}$ and H-polarized signal $x_{-H}$ that are outputs from polarized signal processor 240. The signals subjected to forward error correction processing are output through different routes or multiplexed in accordance with a predetermined rule and output through a single route.

With the above configuration, in the present embodiment, satellite signals transmitted in a multiplexed manner in the form of V polarization and H polarization in a single band can be received while an existing modulator in conformity with the DVB-S2X standard is used as it is, in addition to advantageous effects yielded by Embodiment 1. In the receiving process, an interference component mixes between V polarization and H polarization, yet in the present embodiment, MMSE processing is performed using signals received by the V and H polarization antennas, and thus the influence due to the interference component can be reduced, and the received SINR can be improved.

<Variation>

The known bit pattern ($18D2E82_{HEX}$) of the 26-symbol SOF illustrated in FIG. 2 may be changed between V polarization and H polarization, instead of slightly changing the timing for transmitting a DVB-S2X frame. Specifically, one bit pattern for one of V polarization and H polarization is set to "$18D2E82_{HEX}$", and the other is changed to a bit pattern orthogonal to "$18D2E82_{HEX}$". Accordingly, the timing of transmitting a DVB-S2X frame may be the same for V polarization and H polarization, and the accuracy of transmission path estimated values of satellite signals transmitted in the form of V polarization and H polarization, which are obtained by the transmission path estimators improve.

Figure 14:
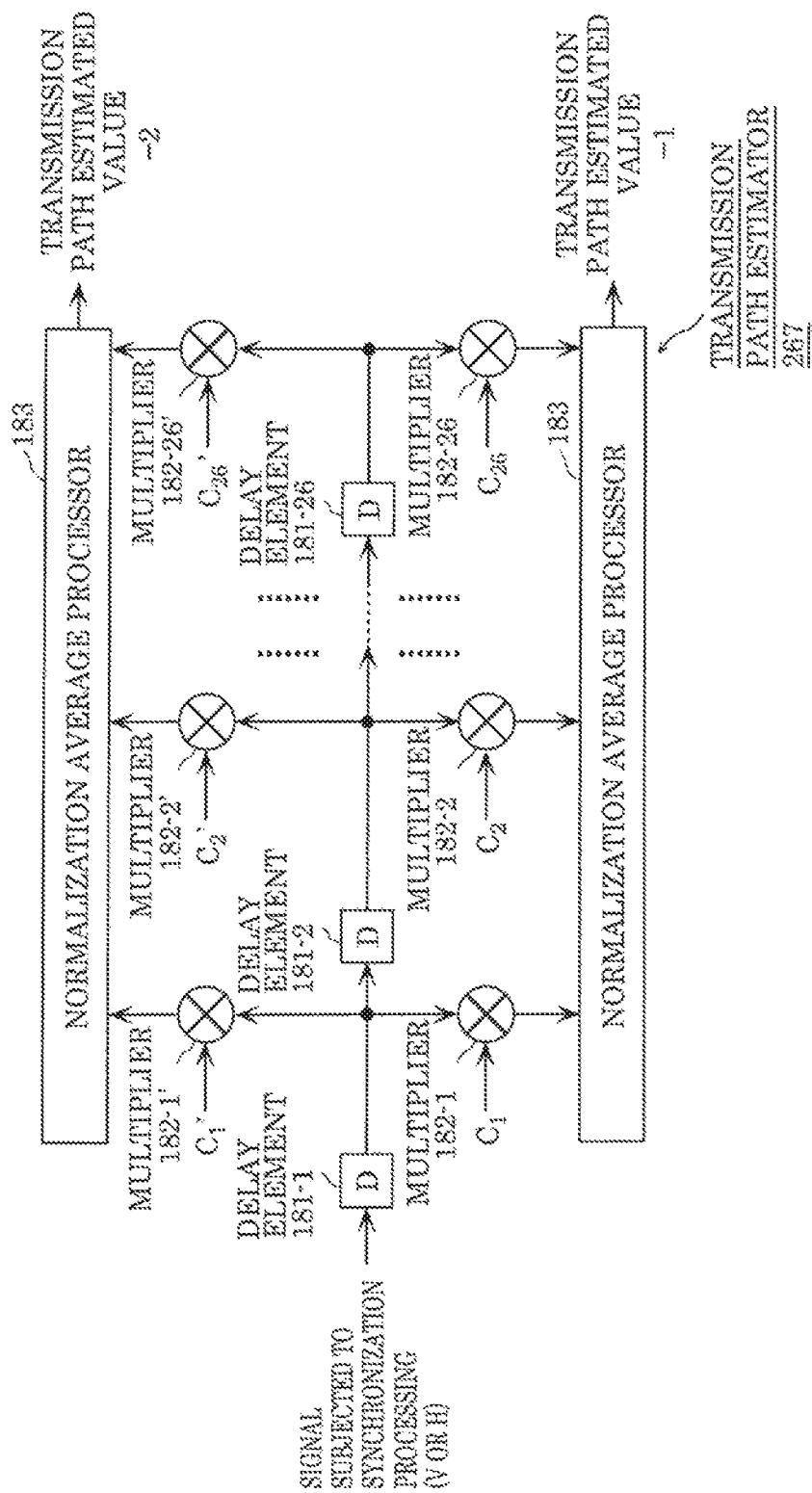
FIG. 14 illustrates an example of a configuration of a transmission path estimator in a variation of Embodiment 2.

FIG. 14 illustrates an example of a configuration of transmission path estimator 267 in this variation. Polarized signal processor 240 of communication device 200 in this variation includes transmission path estimators 267V and 267H, instead of transmission path estimators 265V and 265H described above. Note that the configuration of transmission path estimator 267 illustrated in FIG. 14 is the configuration of each of transmission path estimators 267V and 267H.

Transmission path estimator 267 has a configuration in which 26 multipliers 182-1' to 182-26' are added, and one more normalization average processor 183 is further added, as compared with transmission path estimator 165 in Embodiment 1 illustrated in FIG. 8. Note that 26 multipliers 182-1 to 182-26' may be each referred to as multiplier 182' in the present embodiment. 26 multipliers 182' multiply complex numbers of outputs from 26 delay elements 181 with complex numbers of 26 coefficients $C_1$ to $C_{26'}$. 26 coefficients $C_1$ to $C_{26'}$ are conjugate complex numbers of symbols resulting from modulating bits of a known bit pattern orthogonal to "$18D2E82_{HEX}$" illustrated in FIG. 2 by π/2-BPSK. Accordingly, transmission path estimator 267 can obtain two transmission path estimated values with sufficient accuracy.

Embodiment 3

Figure 15:
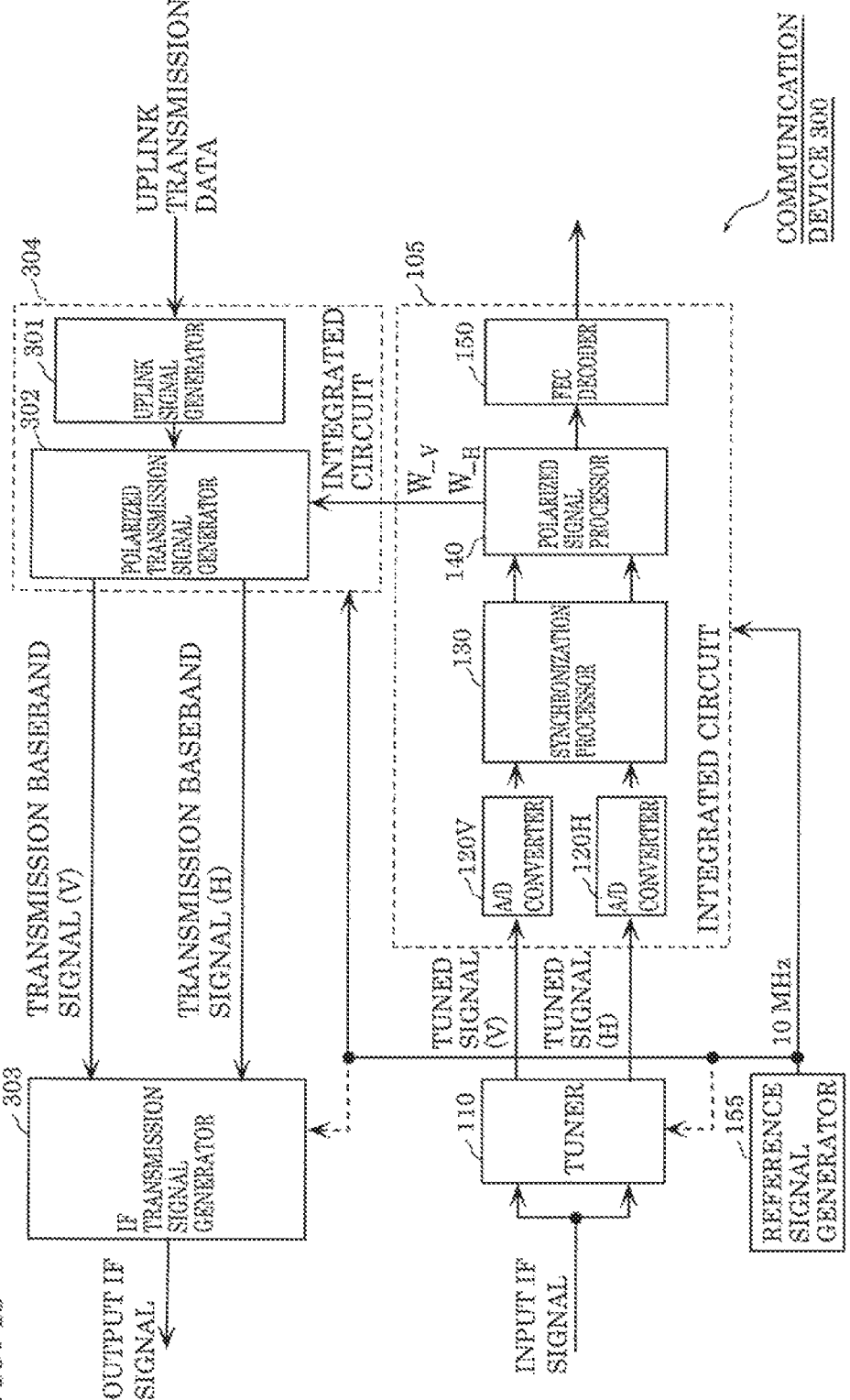
FIG. 15 illustrates an example of a configuration of a communication device in Embodiment 3.

FIG. 15 illustrates an example of a configuration of communication device 300 in Embodiment 3. Note that out of the elements included in communication device 300 in the present embodiment, the same element as an element in the communication device in Embodiment 1 or 2 is given the same sign as that of the element in Embodiment 1 or 2, and a detailed description thereof is omitted.

In the present embodiment, communication device 300 has an uplink transmission function, and uses an MMSE weight used for downlink reception as a weight at the time of the transmission.

Communication device 300 in FIG. 15 has a configuration in which uplink signal generator 301, polarized transmission signal generator 302, and IF transmission signal generator 303 are added, as compared with communication device 100 in Embodiment 1 illustrated in FIG. 3. Note that a unit that includes uplink signal generator 301 and polarized transmission signal generator 302 in communication device 300 may be configured into integrated circuit 304.

In communication device 300 in FIG. 15, uplink signal generator 301 performs processing such as modulation and error correction coding on input uplink transmission data, and outputs the resultant uplink transmission data. Uplink signal generator 301 performs processing in accordance with the DVB-RCS2 standard (ETSI EN 301 545-2 v1.2.1 (April, 2014) Digital Video Broadcasting (DVB); Second Generation DVB Interactive Satellite System (DVB-RCS2); Part 2: Lower Layers for Satellite standard), for example.

Polarized transmission signal generator 302 performs, using the MMSE weight used for downlink reception ($w_{-V}$ and $w_{-H}$ in Expressions (1) and (2) above), weighting processing as shown by Expressions (8) and (9) below, and outputs resultant V-polarized transmission baseband signal $z_{-V}$ and H-polarized transmission baseband signal $z_{-H}$.

$$z_{-V} = w_{-V} \cdot u \qquad \text{Expression (8)}$$

$$z_{-H} = w_{-H} \cdot u \qquad \text{Expression (9)}$$

Here, u denotes an output signal from uplink signal generator 301.

Figure 16:
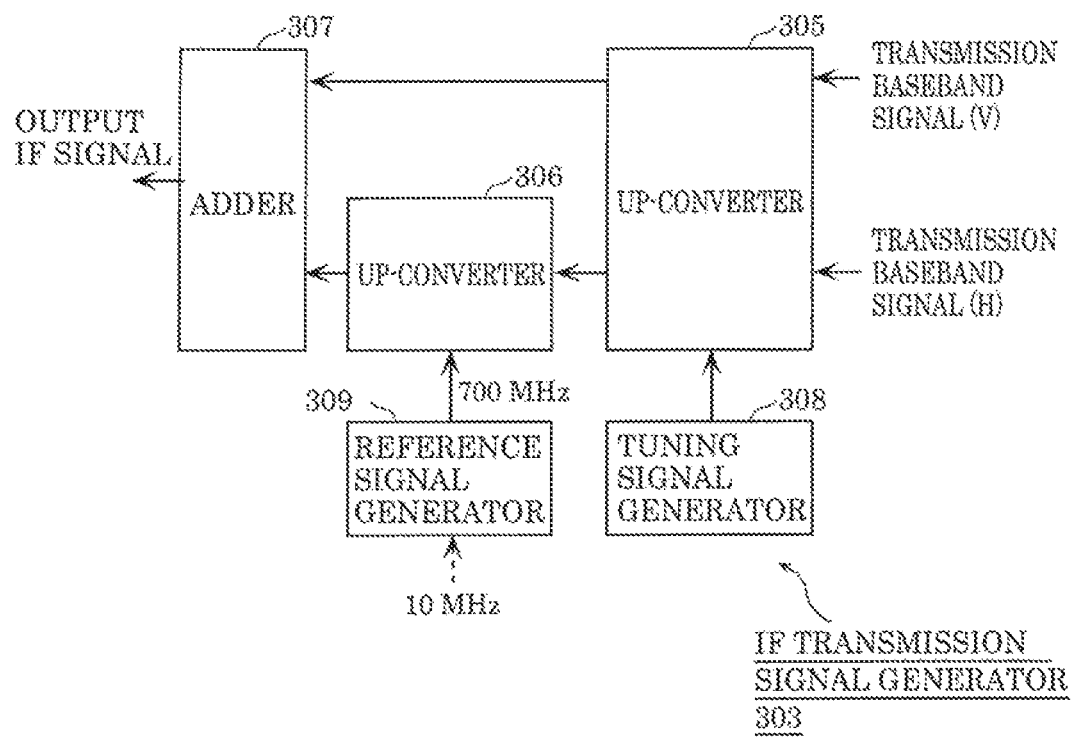
FIG. 16 illustrates an example of a configuration of an IF transmission signal generator in Embodiment 3.

FIG. 16 illustrates an example of a configuration of IF transmission signal generator 303. IF transmission signal generator 303 includes up-converters 305 and 306, adder 307, tuning signal generator 308, and reference signal generator 309.

In IF transmission signal generator 303 in FIG. 16, tuning signal generator 308 generates a tuning signal having the same center frequency at the frequency position for transmission. Up-converter 305 multiplies each of two signals output from polarized transmission signal generator 302 with the tuning signal, extracts the up-converted V-polarized signal and the up-converted H-polarized signal using BPFs, and outputs the extracted signals. Reference signal generator 309 generates a 700-MHz reference signal, and up-converter 306 multiplies the H-polarized signal output from up-converter 305 with the 700-MHz reference signal, extracts the up-converted H-polarized signal using a BPF, and outputs the extracted signal. Alternatively, as illustrated in FIG. 16, reference signal generator 309 may generate a 700-MHz reference signal using a 10-MHz reference signal generated by reference signal generator 155. Alternatively, as illustrated in (b) of FIG. 4, IF transmission signal generator 303 extracts a 10-MHz reference signal generated by reference signal generator 155 and multiplexed on an input IF signal, and reference signal generator 309 may generate a 700-MHz reference signal using the 10-MHz reference signal.

Adder 307 adds a V-polarized signal output from up-converter 305 and an H-polarized signal output from up-converter 306, and outputs the resultant signal as an output IF signal to antenna 2010 illustrated in FIG. 1. An output IF signal that includes a V-polarized signal and an H-polarized signal and is output to antenna 2010 occupies a selected band in (a) of FIG. 4, and a frequency difference between V polarization and H polarization is 700 MHz. Antenna 2010 converts the output IF signal into an RF signal, amplifies power of the signal, and transmits V-polarized and H-polarized RF signals to satellite 3000 in FIG. 1.

As described above, in the present embodiment, communication device 300 has an uplink transmission function, and uses the MMSE weight used when a downlink is received as a weight for transmission. Accordingly, the transmission polarization plane of airplane 2000 can be aligned with the reception polarization plane of satellite 3000, so that the received SINR at satellite 3000 can be improved.

<Variation>

Also when communication device 200 in Embodiment 2 has an uplink transmission function, the MMSE weight used when a downlink is received may be used as a weight for transmission, similarly to the present embodiment. Stated differently, a communication device in this variation is a device that is communication device 200 in Embodiment 2 having the function of communication device 300 in Embodiment 3.

Figure 17:
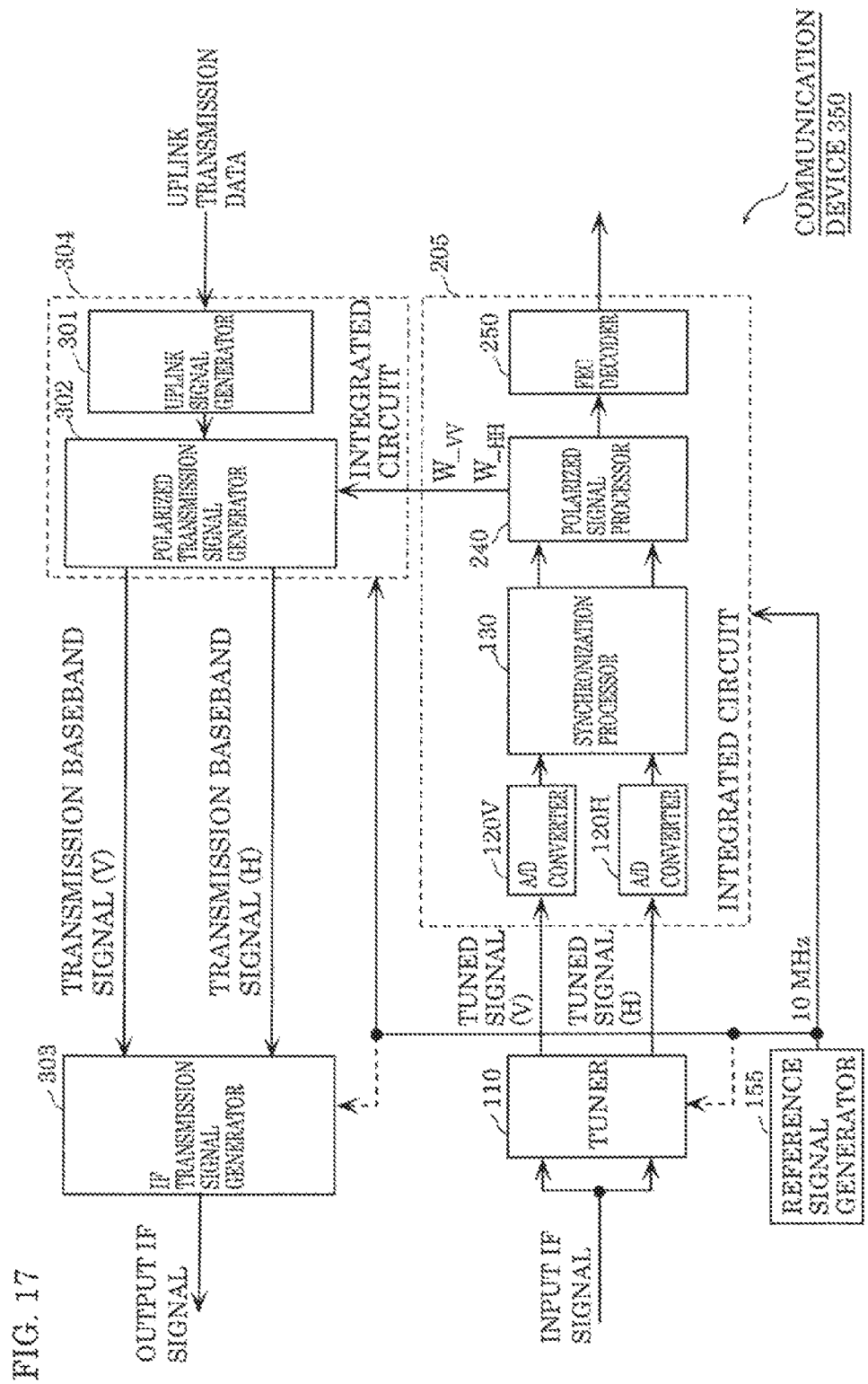
FIG. 17 illustrates an example of a configuration of a communication device in a variation of Embodiment 3.

FIG. 17 illustrates an example of a configuration of communication device 350 in this variation. Communication device 350 in FIG. 17 has a configuration in which uplink signal generator 301, polarized transmission signal generator 302, and IF transmission signal generator 303 are added, as compared with communication device 200 in Embodiment 2 illustrated in FIG. 11. Note that a unit that includes uplink signal generator 301 and polarized transmission signal generator 302 in communication device 300 may be configured into integrated circuit 304.

Polarized transmission signal generator 302 performs weighting processing as shown by Expressions (9a) and (10) below, using the MMSE weight used when a downlink is received ($w_{\_VV}$ and $w_{\_HH}$ in Expressions (4) and (5) above), and outputs resultant V-polarized transmission baseband signal $z_{\_V}$, and resultant H-polarized transmission baseband signal $z_{\_H}$.

$$z_{\_V} = w_{\_VV} \cdot u \qquad \text{Expression (9a)}$$

$$z_{\_H} = w_{\_HH} \cdot u \qquad \text{Expression (10)}$$

Here, u denotes an output signal from uplink signal generator 301. Accordingly, also when satellite signals transmitted in a multiplexed manner in the form of V polarization and H polarization in a single band are downlinked, the transmission polarization plane of airplane 2000 can be aligned with the reception polarization plane of satellite 3000, so that the received SINR at satellite 3000 can be improved.

Embodiment 4

Figure 18:
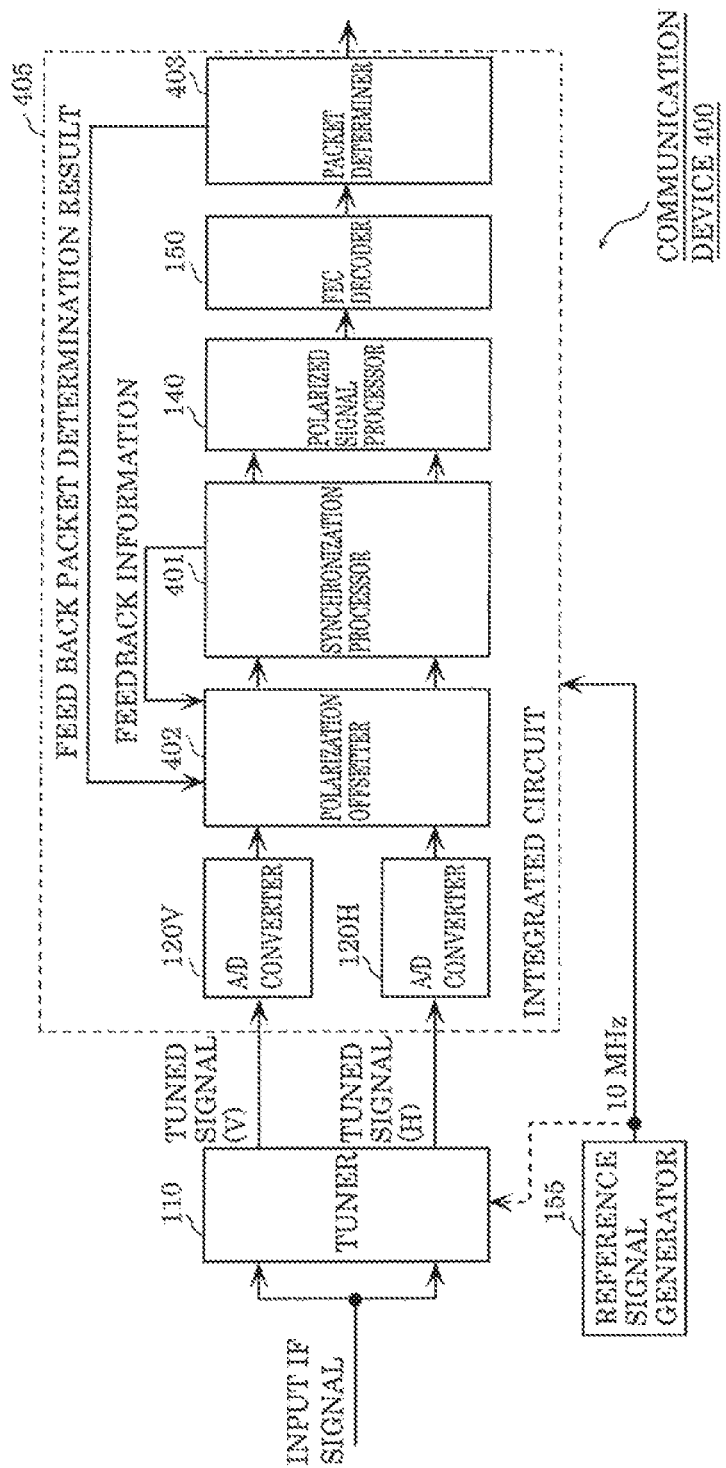
FIG. 18 illustrates an example of a configuration of a communication device in Embodiment 4.

FIG. 18 illustrates an example of a configuration of communication device 400 in Embodiment 4. Note that out of elements included in communication device 400 in the present embodiment, the same element as that of the communication device in any of Embodiments 1 to 3 is given the same sign as that of the element in the embodiment, and a detailed description thereof is omitted. In the present embodiment, a signal similar to a desired signal is present as an interference signal. Note that the desired signal is a signal transmitted from satellite 3000 to the location of airplane 2000.

Communication device 400 in FIG. 18 has a configuration in which polarization offsetter 402 and packet determiner 403 are added, and synchronization processor 130 is replaced with synchronization processor 401, as compared with communication device 100 in Embodiment 1 illustrated in FIG. 3. Packet determiner 403 feeds back a packet determination result as a packet reception state to polarization offsetter 402. Note that a unit that includes elements except tuner 110 and reference signal generator 155 in communication device 400 may be configured into integrated circuit 405.

Figure 19:
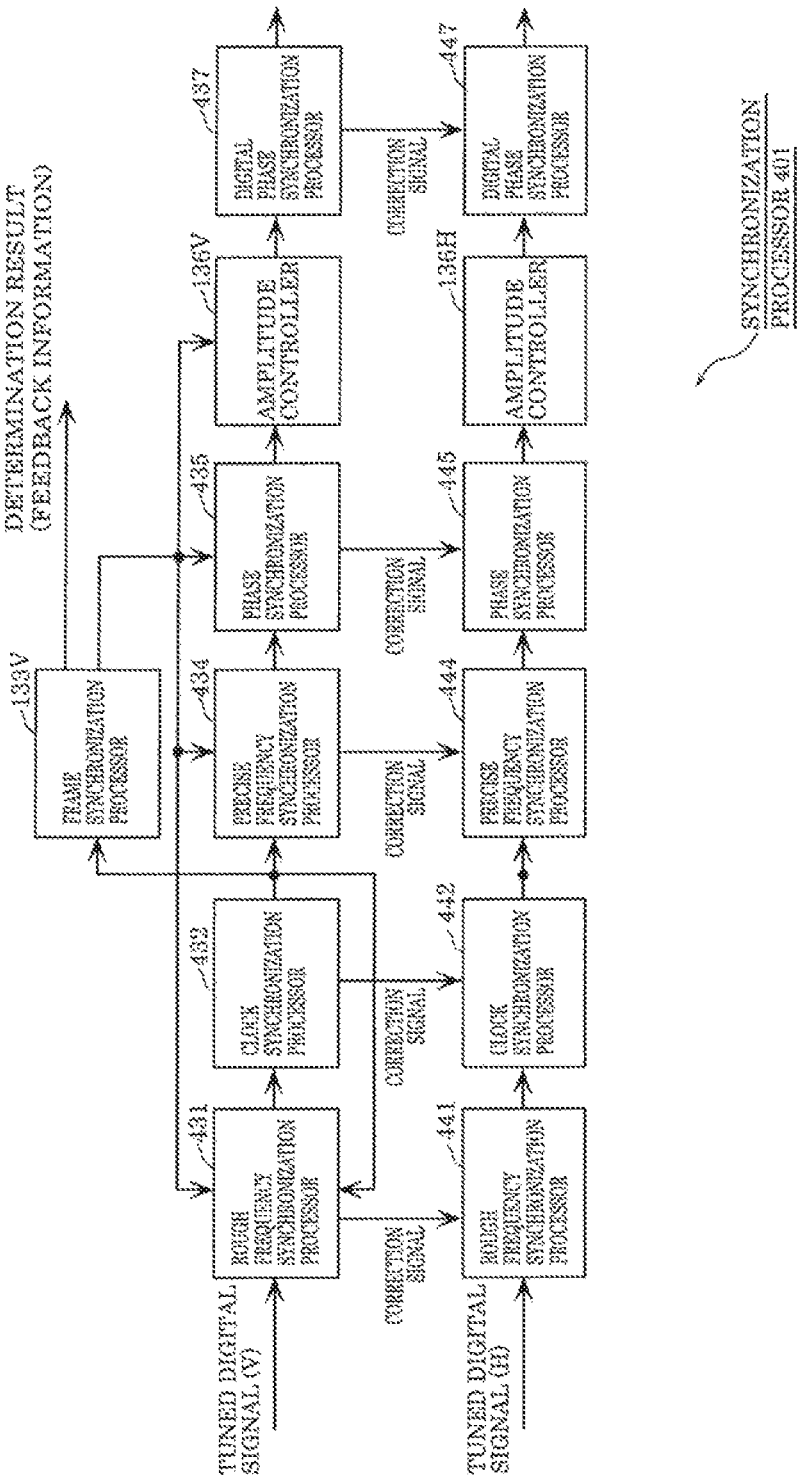
FIG. 19 illustrates an example of a configuration of a synchronization processor in Embodiment 4.

FIG. 19 illustrates an example of a configuration of synchronization processor 401. Synchronization processor 401 includes frame synchronization processor 133V, rough frequency synchronization processor 431, clock synchronization processor 432, precise frequency synchronization processor 434, phase synchronization processor 435, amplitude controller 136V, and digital phase synchronization processor 437, which are for V polarization. Synchronization processor 401 further includes rough frequency synchronization corrector 441, clock synchronization corrector 442, precise frequency synchronization corrector 444, phase synchronization corrector 445, amplitude controller 136H, and digital phase synchronization corrector 447, which are for H polarization.

Thus, in synchronization processor 401, rough frequency synchronization processor 131V, clock synchronization processor 132V, precise frequency synchronization processor 134V, phase synchronization processor 135V, and digital phase synchronization processor 137V which are for V polarization are replaced with rough frequency synchronization processor 431, clock synchronization processor 432, precise frequency synchronization processor 434, phase synchronization processor 435, and digital phase synchronization processor 437, respectively, as compared with synchronization processor 130 in Embodiment 1 illustrated in FIG. 6. Furthermore, rough frequency synchronization processor 131H, clock synchronization processor 132H, precise frequency synchronization processor 134H, phase synchronization processor 135H, and digital phase synchronization processor 137H which are for H polarization are replaced with rough frequency synchronization corrector 441, clock synchronization corrector 442, precise frequency synchronization corrector 444, phase synchronization corrector 445, and digital phase synchronization corrector 447, respectively. In synchronization processor 401, the processors for V polarization detect errors in, for instance, frequency, clock, and phase, as error signals, and calculate and output correction signals for synchronization processing from the detected error signals. The correctors for H polarization perform correction for synchronization processing on an input signal using the correction signals.

Frame synchronization processor 133V outputs feedback information indicating a frame synchronization determination result. For example, frame synchronization processor 133V derives a correlation value that is a transmission path estimated value, similarly to transmission path estimator 165V, and if the correlation value is greater than a threshold, outputs feedback information indicating that frame synchronization has succeeded as the frame synchronization determination result. In this case, transmission path estimator 165V may obtain the correlation value from frame synchronization processor 133V, rather than deriving the correlation value by itself.

Figure 20:
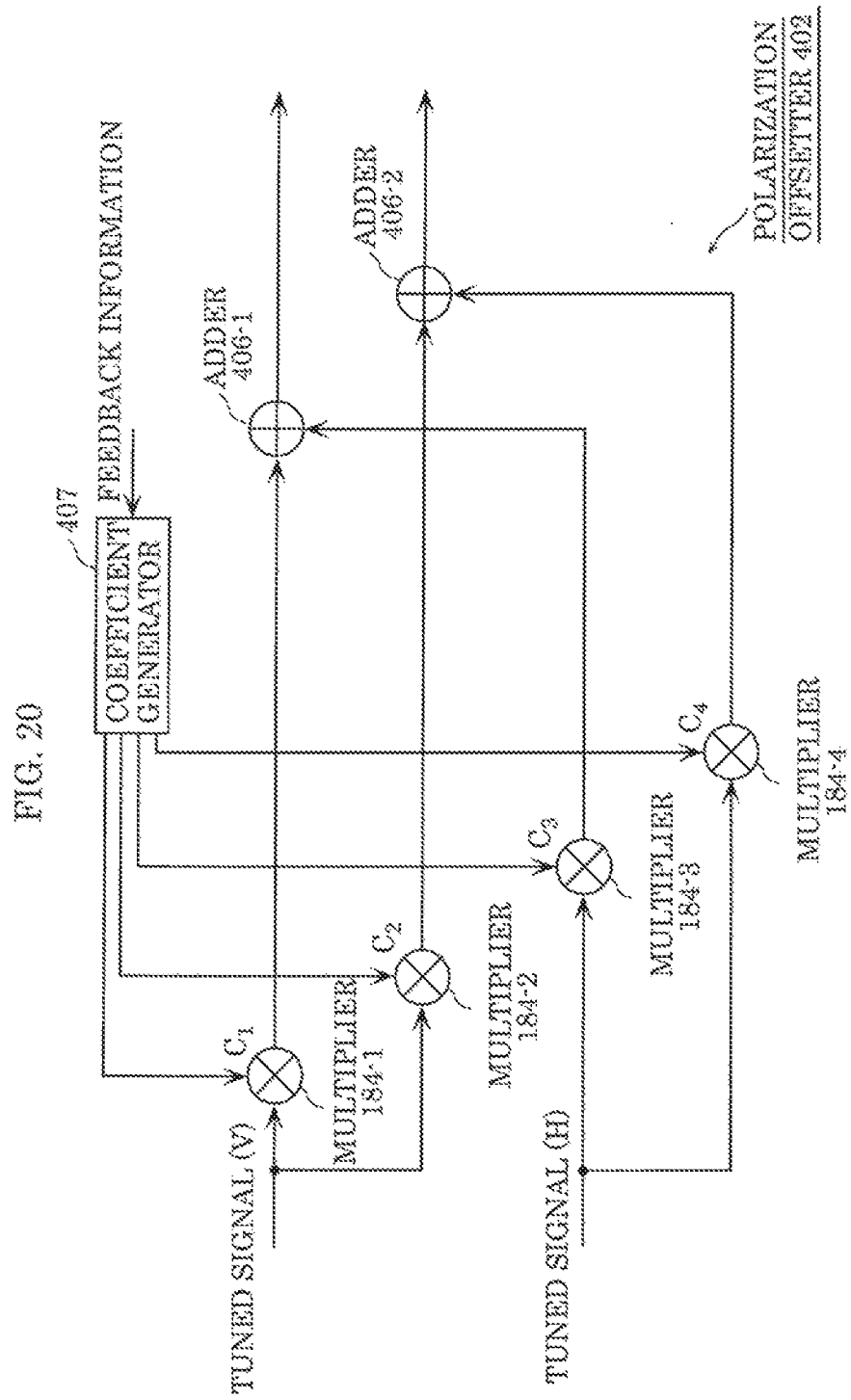
FIG. 20 illustrates an example of a configuration of a polarization offsetter in Embodiment 4.

FIG. 20 illustrates an example of a configuration of polarization offsetter 402. Polarization offsetter 402 includes a total of four multipliers 184-1 to 184-4 and a total of two adders 406-1 and 406-2, for a V-polarized signal and an H-polarized signal. Polarization offsetter 402 includes coefficient generator 407. Coefficient generator 407 receives feedback information from synchronization processor 401. Here, polarization offsetter 402 provides polarization offsets to an input V-polarized signal and an input H-polarized signal (V-polarized and H-polarized tuned digital signals), based on Expressions (11) and (12) below.

[Math 5]

$$\begin{pmatrix} V' \\ H' \end{pmatrix} = C \begin{pmatrix} V \\ H \end{pmatrix} \quad \text{Expression (11)}$$

[Math 6]

$$C = \begin{pmatrix} c_1 & c_2 \\ c_3 & c_4 \end{pmatrix} \quad \text{Expression (12)}$$

Here, elements c1, c2, c3, and c4 of matrix C are generated by coefficient generator 407. For example, when feedback information that indicates the frame synchronization determination result is obtained from synchronization processor 401, coefficient generator 407 sets matrix C as shown by Expression (13) below. Coefficient generator 407 may sequentially change the value of θ in Expression (13) until feedback information indicating that frame synchronization has succeeded is obtained as the frame synchronization determination result.

[Math 7]

$$C = \begin{pmatrix} \cos\theta & -\sin\theta \\ \sin\theta & \cos\theta \end{pmatrix} \quad \text{Expression (13)}$$

Polarization offsetter 402 can obtain feedback information from synchronization processor 401 immediately, yet it is difficult for polarization offsetter 402 to determine whether the success in frame synchronization indicated by the feedback information is success for a desired signal or an interference signal. Accordingly, after frame synchronization has succeeded, packet determiner 403 may determine whether a stream output from FEC decoder 150 is a desired signal or an interference signal, based on an IP address included in the stream or a network information table (NIT) included in a transport stream (TS). Packet determiner 403 may feed back a packet determination result, which is the determination result, to polarization offsetter 402. For example, when the packet determination result indicating that a stream is an interference signal is fed back to polarization offsetter 402, polarization offsetter 402 changes the value of θ in Expression (13).

Alternatively, the frame synchronization determination result may not be fed back from synchronization processor 401 to polarization offsetter 402, and only the packet determination result may be fed back from packet determiner 403 to polarization offsetter 402.

Note that when the value of θ increases power of a desired signal or an interference signal obtained in the form of V polarization, the accuracy of synchronization processing for V polarization increases, and thus frame synchronization processor 133H for H polarization is unnecessary.

From the above configuration, in the present embodiment, even under the condition in which an interference signal similar to a desired signal is present, a desired signal and an interference signal can be distinguished by the polarization offset function and the frame synchronization determination function or the packet determination function, in addition to advantageous effects yielded by Embodiment 1. As a result, the influence of an interference component can be reduced and the received SINR can be improved, by performing MMSE processing on a desired signal using both the V-polarized and H-polarized signals.

Here, communication device 400 in the present embodiment includes a signal processing device for receiving a signal transmitted from satellite 3000. The signal processing device includes polarization offsetter 402, synchronization processor 401, and polarized signal processor 140, for example. Polarization offsetter 402 provides offsets to a vertical signal and a horizontal signal on which synchronization processing is to be performed next, based on at least one of the result of synchronization processing by synchronization processor 401 or information included in a signal resulting from weighted summation. As a result, synchronization processor 401 performs synchronization processing on each of the vertical signal and the horizontal signal provided with offsets.

Note that the result of synchronization processing by synchronization processor 401 is notified to polarization offsetter 402 as the feedback information described above. The information included in a signal resulting from weighted summation is an IP address or a NIT described above, for example. Such information is obtained by packet determiner 403, and a packet determination result based on the information is fed back to polarization offsetter 402.

Figure 21:
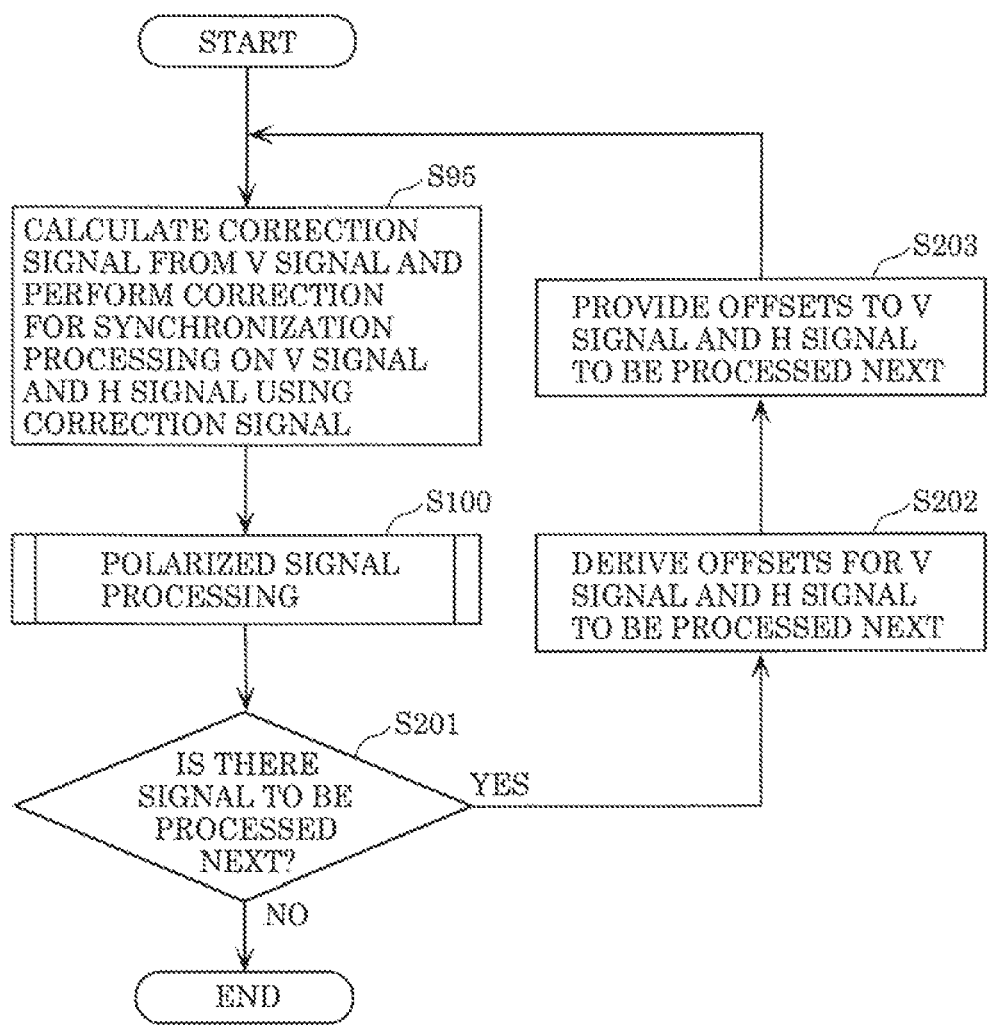
FIG. 21 is a flowchart illustrating an example of processing operation of a signal processing device in Embodiment 4.

FIG. 21 is a flowchart illustrating an example of processing operation of the signal processing device in Embodiment 4.

First, the signal processing device calculates a correction signal from a vertical signal, performs correction for synchronization processing on the vertical signal and a horizontal signal using the correction signal (step S95), and further performs polarized signal processing on the signals (step S100). Here, if there are signals to be processed next (Yes in step S201), polarization offsetter 402 in the signal processing device derives offsets for a vertical signal and a horizontal signal on which synchronization processing is to be performed next, based on at least one of the result of synchronization processing by synchronization processor 401 or information included in a signal resulting from weighted summation (step S202). Furthermore, polarization offsetter 402 provides the derived offsets to the vertical signal and the horizontal signal on which synchronization processing is to be performed next (step S203).

Accordingly, with the signal processing device and the signal processing method in the present embodiment, even under the condition in which an interference signal similar to a desired signal from a transmission device is present, an offset can be provided so that the desired signal can be obtained. Accordingly, a desired signal and an interference signal can be distinguished, the influence of an interference component can be reduced, and the received SINR can be improved.

Embodiment 5

Figure 22:
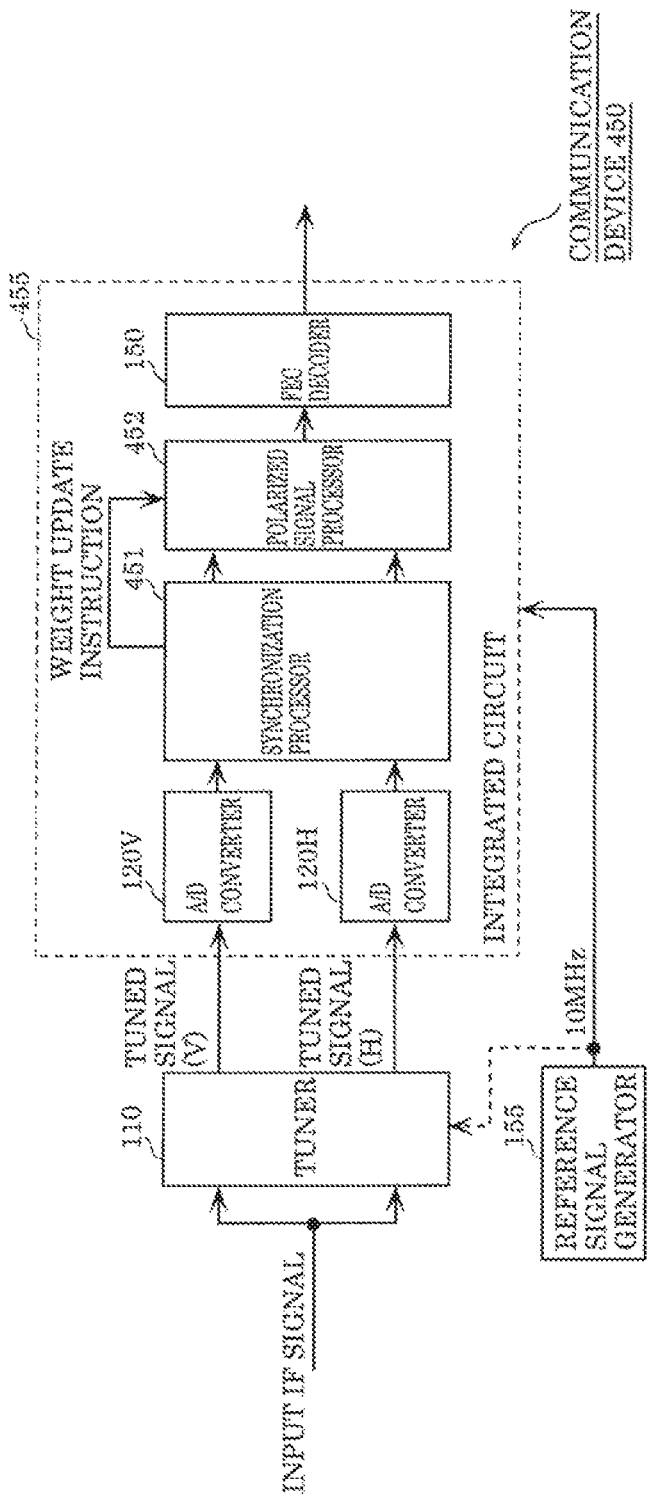
FIG. 22 illustrates an example of a configuration of a communication device in Embodiment 5.

FIG. 22 illustrates an example of a configuration of communication device 450 in Embodiment 5. Note that out of the elements included in communication device 450 in the present embodiment, the same element as that of the communication device in any of Embodiments 1 to 4 is given the same sign as that of the element in the embodiment, and a detailed description thereof is omitted. In the present embodiment, a signal similar to a desired signal is present as an interference signal.

Communication device 450 in FIG. 22 has a configuration in which synchronization processor 130 and polarized signal processor 140 are replaced with synchronization processor 451 and polarized signal processor 452, respectively, as compared with communication device 100 in Embodiment 1 illustrated in FIG. 3. Note that a unit that includes elements except tuner 110 and reference signal generator 155 in communication device 450 may be configured into integrated circuit 455.

Figure 23:
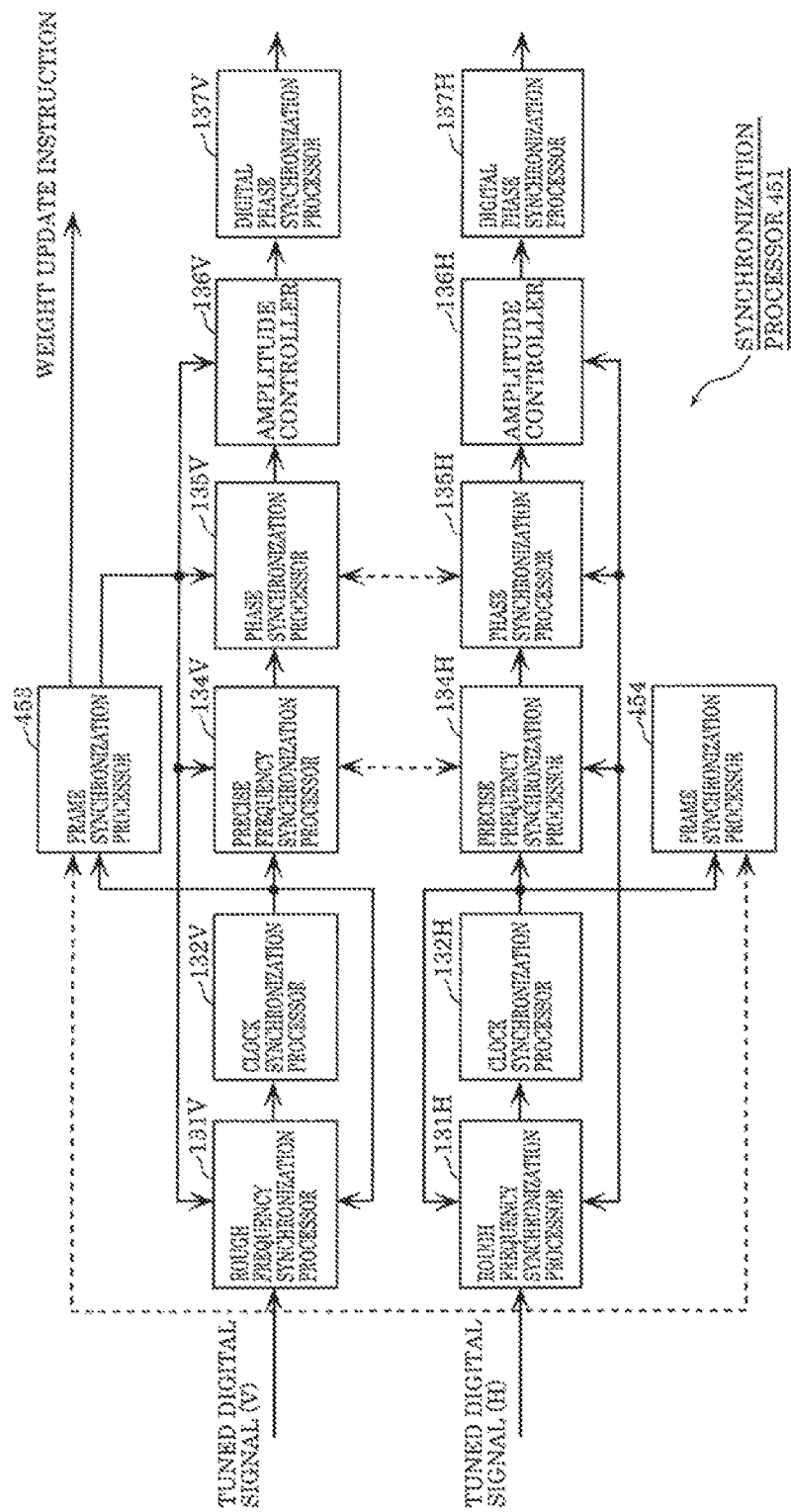
FIG. 23 illustrates an example of a configuration of a synchronization processor in Embodiment 5.

FIG. 23 illustrates an example of a configuration of synchronization processor 451. Synchronization processor 451 has a configuration in which frame synchronization processor 133V for V polarization, and frame synchronization processor 133H for H polarization are replaced with frame synchronization processors 453 and 454, respectively, as compared with synchronization processor 130 in Embodiment 1 illustrated in FIG. 6. Frame synchronization processor 453 for V polarization and frame synchronization processor 454 for H polarization cooperate with each other in establishing frame synchronization, and generate a frame synchronization timing signal, and frame synchronization processor 453 for V polarization outputs the frame synchronization timing signal. At a timing different from frame synchronization timing, at least one of frame synchronization processor 453 for V polarization or frame synchronization processor 454 for H polarization detects that a correlation value indicating a correlation of a tuned digital signal with the known bit pattern of the SOF exceeds a threshold. In this case, frame synchronization processor 453 for V polarization calculates a difference between that detection timing and the frame synchronization timing. Frame synchronization processor 453 for V polarization outputs a weight update instruction as being invalid if the timing difference is smaller than a predetermined value.

Figure 24:
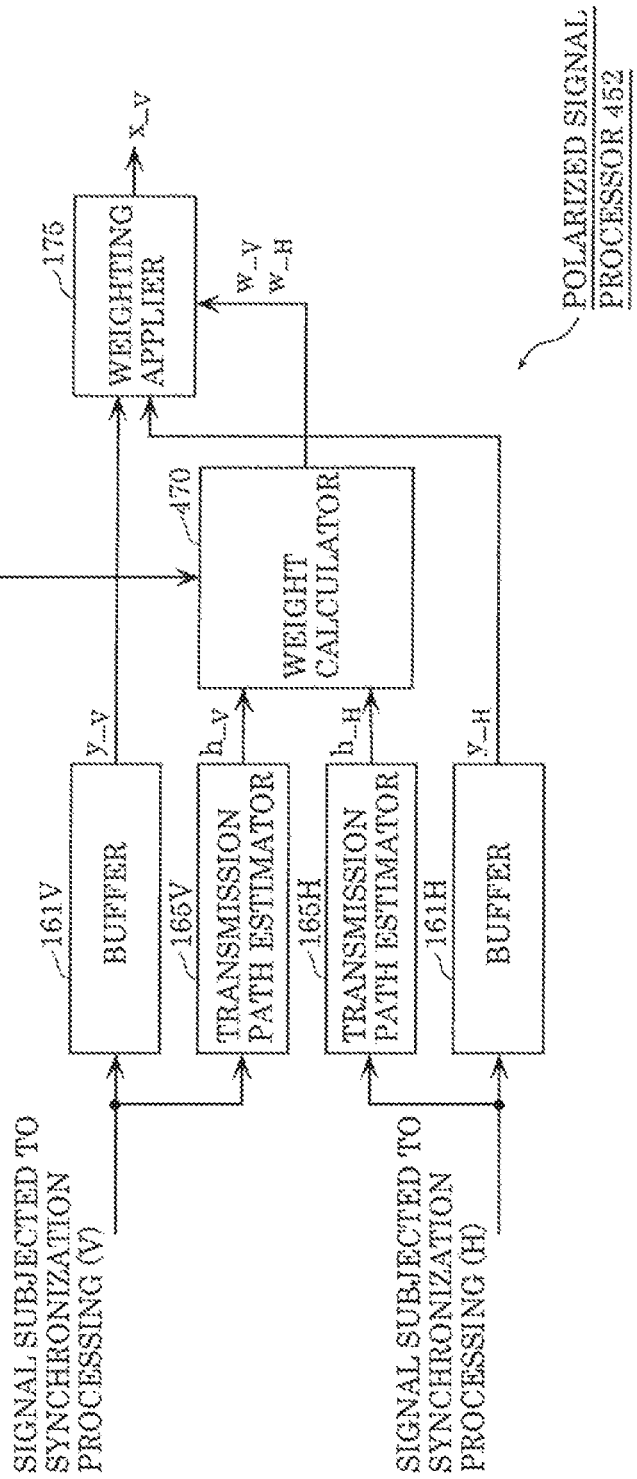
FIG. 24 illustrates an example of a configuration of a polarized signal processor in Embodiment 5.

FIG. 24 illustrates an example of a configuration of polarized signal processor 452. Polarized signal processor 452 has a configuration in which weight calculator 170 is replaced with weight calculator 470, as compared with polarized signal processor 140 in Embodiment 1 illustrated in FIG. 7. In polarized signal processor 452, when the weight update instruction is invalid, weight calculator 470 stops updating an MMSE weight, and maintains the weight calculated last time.

As described above, in the present embodiment, when the timing at which a desired signal is received and the timing at which an interference signal similar to the desired signal is received are close, updating the MMSE weight is stopped. Accordingly, the influence of an interference signal can be reduced.

Embodiment 6

Figure 25:
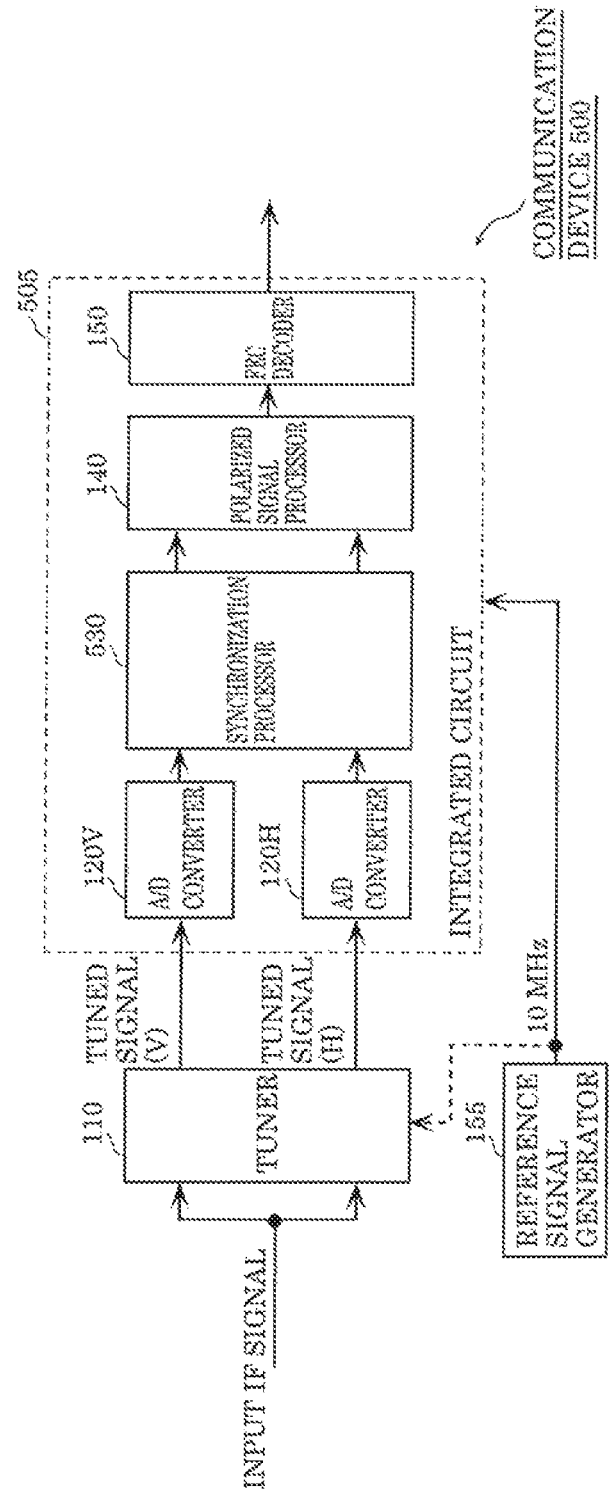
FIG. 25 illustrates an example of a configuration of a communication device in Embodiment 6.

FIG. 25 illustrates an example of a configuration of communication device 500 in Embodiment 6. Note that out of the elements included in communication device 500 in the present embodiment, the same element as that of the communication device in any of Embodiments 1 to 5 is given the same sign as that of the element in the embodiment, and a detailed description thereof is omitted.

Communication device 500 in FIG. 25 has a configuration in which synchronization processor 130 is replaced with synchronization processor 530, as compared with communication device 100 in Embodiment 1 illustrated in FIG. 3. Note that a unit that includes elements except tuner 110 and reference signal generator 155 in communication device 500 may be configured into integrated circuit 505. Synchronization processor 530 in the present embodiment may be applied to Embodiments 1 to 5.

Figure 26:
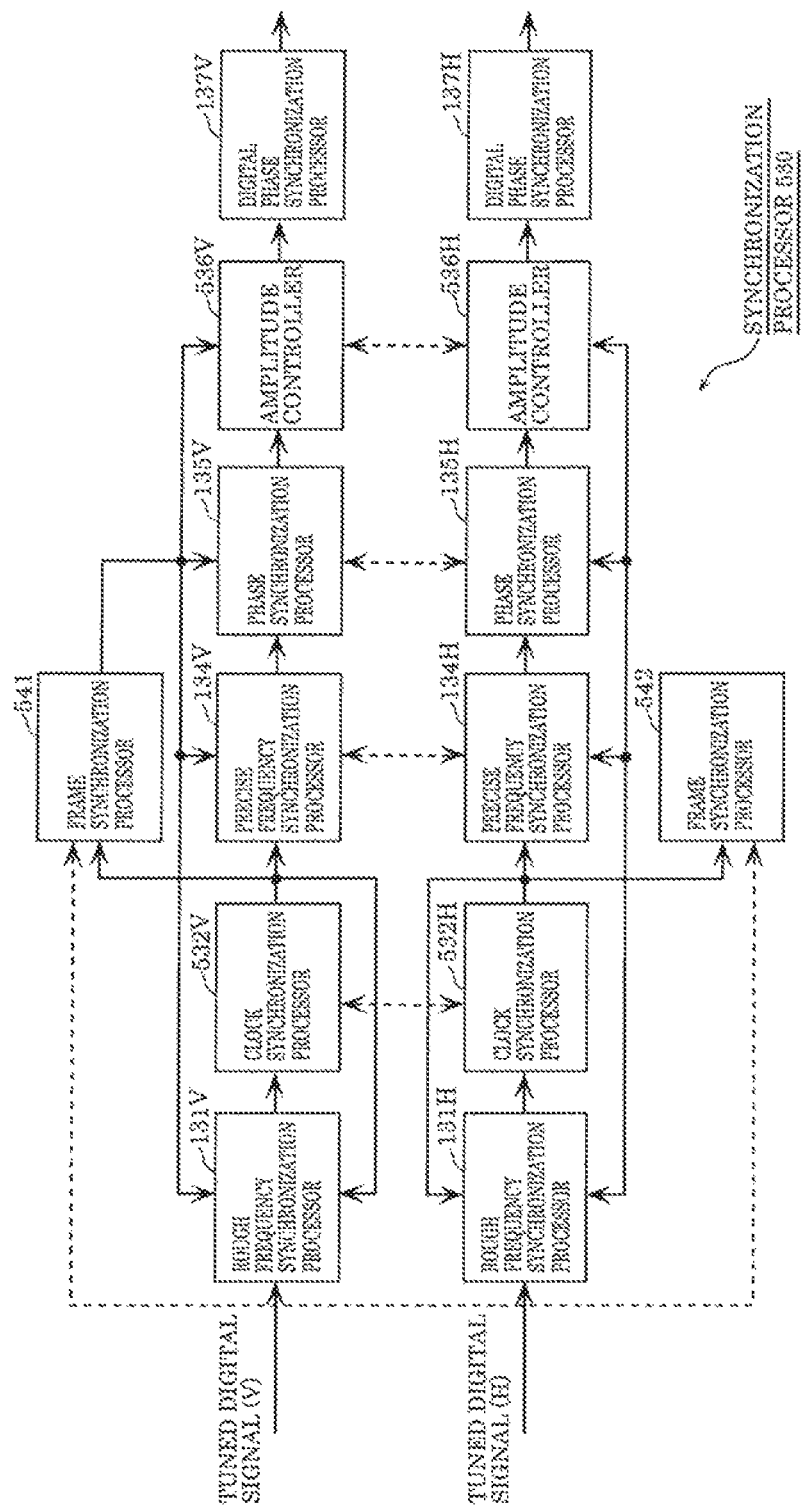
FIG. 26 illustrates an example of a configuration of a synchronization processor in Embodiment 6.

FIG. 26 illustrates an example of a configuration of synchronization processor 530. Synchronization processor 530 includes frame synchronization processor 541, rough frequency synchronization processor 131V, clock synchronization processor 532V, precise frequency synchronization processor 134V, phase synchronization processor 135V, amplitude controller 536V, and digital phase synchronization processor 137V, which are for V polarization. Synchronization processor 530 further includes frame synchronization processor 542, rough frequency synchronization processor 131H, clock synchronization processor 532H, precise frequency synchronization processor 134H, phase synchronization processor 135H, amplitude controller 536H, and digital phase synchronization processor 137H, which are for H polarization. Thus, in synchronization processor 530, as compared with synchronization processor 130 in Embodiment 1 illustrated in FIG. 6, clock synchronization processors 132V and 132H and amplitude controllers 136V and 136H are replaced with clock synchronization processors 532V and 532H and amplitude controllers 536V and 536H, respectively. Furthermore, frame synchronization processor 133V for V polarization and frame synchronization processor 133H for H polarization are replaced with frame synchronization processors 541 and 542, respectively.

Clock synchronization processors 532V and 532H do not independently perform clock synchronization processing, and cooperate with each other in performing the synchronization processing. Similarly, amplitude controllers 536V and 536H do not independently perform amplitude control, and cooperate with each other in performing the amplitude control. Clock synchronization processors 532V and 532H cooperate with each other in clock synchronization processing by adding vectors of errors in clock timing of V polarization and H polarization. For example, amplitude controllers 536V and 536H cooperate with each other in amplitude control by controlling the gains of V polarization and H polarization so that the gains are the same to make a sum of power of V polarization and power of H polarization constant.

Frame synchronization processor 541 for V polarization and frame synchronization processor 542 for H polarization cooperate with each other in establishing frame synchronization, and generate a frame synchronization timing signal. Frame synchronization processor 541 for V polarization outputs the generated frame synchronization timing signal. For example, frame synchronization processor 541 for V polarization and frame synchronization processor 542 for H polarization cooperate with each other in establishing frame synchronization by detecting that a correlation value indicating a correlation of the known bit pattern of the SOP with at least one of a tuned digital signal for V polarization or a tuned digital signal for H polarization has exceeded a threshold.

The above configuration achieves an increase in the accuracy of synchronization processing in the present embodiment. Similar advantageous effects can also be obtained when the present embodiment is applied to Embodiments 1 to 5.

Here, communication device 500 in the present embodiment includes a signal processing device for receiving signals transmitted from satellite 3000. The signal processing device includes synchronization processor 530 and polarized signal processor 140, for example. Synchronization processor 530 includes a first synchronization processor and a second synchronization processor. In the present embodiment, the first synchronization processor includes rough frequency synchronization processor 131V, clock synchronization processor 532V, frame synchronization processor 541, precise frequency synchronization processor 134V, phase synchronization processor 135V, amplitude controller 536V, and digital phase synchronization processor 137V. The second synchronization processor includes rough frequency synchronization processor 131H, clock synchronization processor 532H, frame synchronization processor 542, precise frequency synchronization processor 134H, phase synchronization processor 135H, amplitude controller 536H, and digital phase synchronization processor 137H. The first synchronization processor and the second synchronization processor as above cooperate with each other in further decreasing an error in clock timing between a vertical signal and a horizontal signal (for example, bringing the error close to 0) and making a sum of power of the vertical signal and power of the horizontal signal constant. Accordingly, clock synchronization processor 532V and clock synchronization processor 532H cooperate with each other, and amplitude controller 536V and amplitude controller 536H cooperate with each other.

Figure 27:
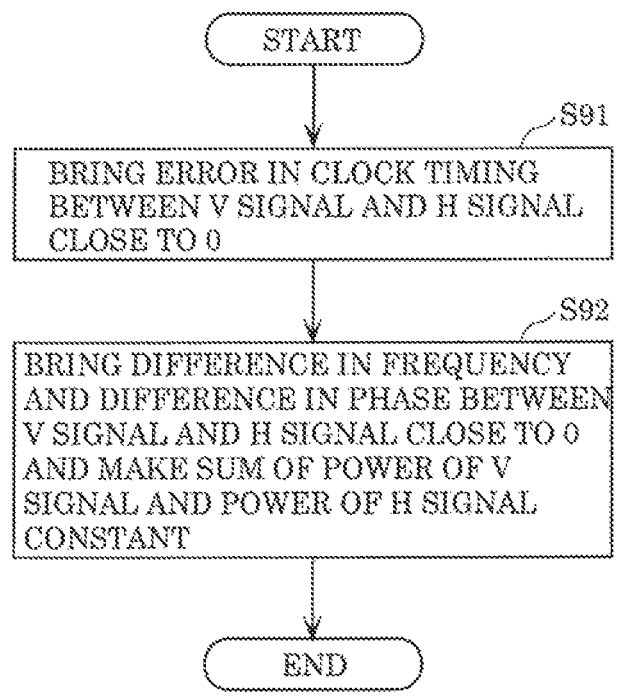
FIG. 27 is a flowchart illustrating an example of processing operation of a signal processing device in Embodiment 6.

FIG. 27 is a flowchart illustrating an example of processing operation of the signal processing device in Embodiment 6.

In synchronization processing in the signal processing device, the first synchronization processor and the second synchronization processor cooperate with each other in bringing the error in clock timing between a vertical signal and a horizontal signal close to 0 (step S91). Furthermore, the first synchronization processor and the second synchronization processor cooperate with each other in bringing each of a difference in frequency and a difference in phase between the vertical signal and the horizontal signal close to 0, and making a sum of power of the vertical signal and power of the horizontal signal constant (step S92).

Accordingly, the signal processing device and the signal processing method in the present embodiment achieve increase in the accuracy of synchronization processing.

Embodiment 7

Figure 28:
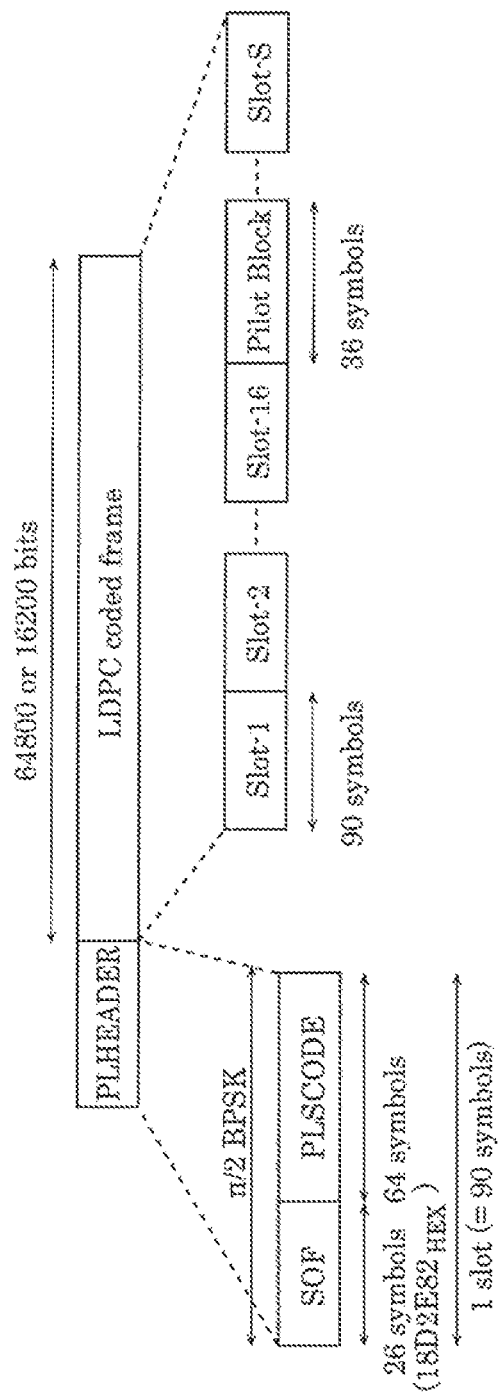
FIG. 28 illustrates the position of a pilot block included in a frame structure in accordance with the DVB-82X standard.

FIG. 28 illustrates a position of a pilot block included in a frame structure in accordance with the DVB-S2X standard. A pilot block has 36 symbols, and is inserted in an LDPC coded frame for each set of 16 slots. The pilot block has a characteristic value for each scramble ID.

Figure 29:
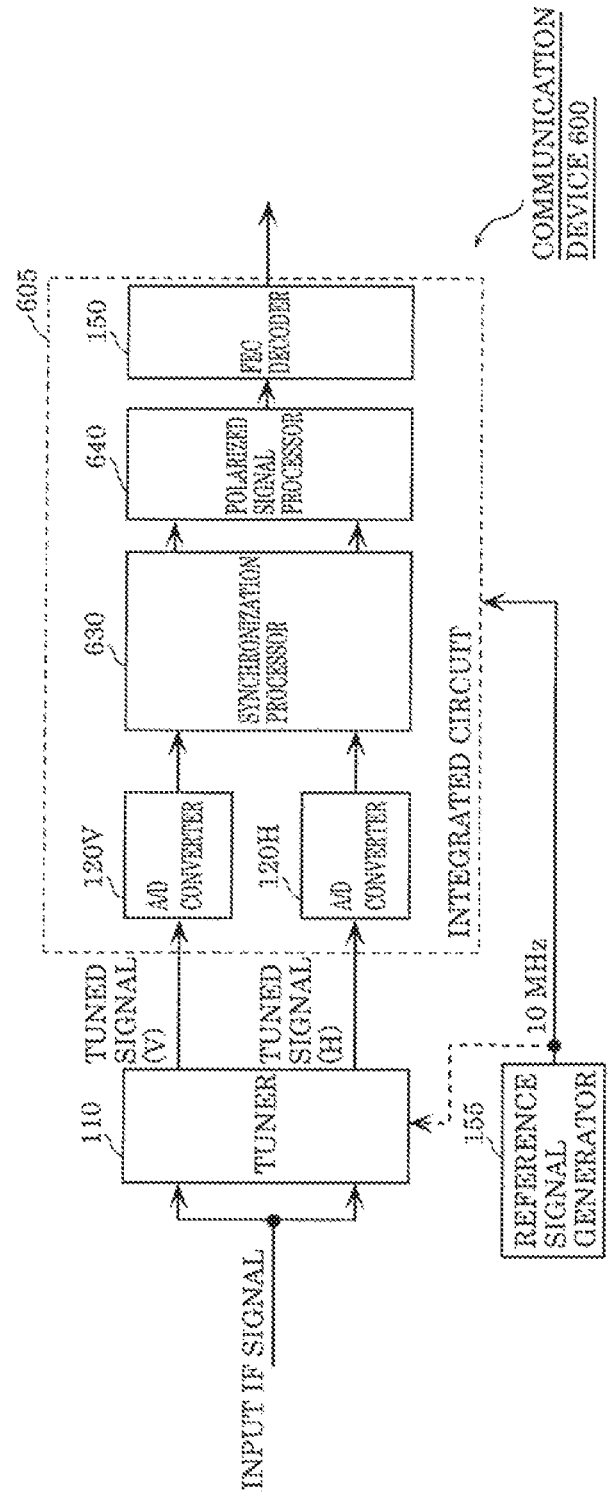
FIG. 29 illustrates an example of a configuration of a communication device in Embodiment 7.

FIG. 29 illustrates an example of a configuration of communication device 600 in Embodiment 7. Note that out of the elements included in communication device 600 in the present embodiment, the same element as that of the communication device in any of Embodiments 1 to 6 is given the same sign as that of the element in the embodiment, and a detailed description thereof is omitted.

Communication device 600 in FIG. 29 has a configuration in which synchronization processor 130 and polarized signal processor 140 are replaced with synchronization processor 630 and polarized signal processor 640, respectively, as compared with communication device 100 in Embodiment 1 illustrated in FIG. 3. Note that a unit that includes elements except tuner 110 and reference signal generator 155 in communication device 600 may be configured into integrated circuit 605. Synchronization processor 630 and polarized signal processor 640 in the present embodiment may be applied to Embodiments 1 to 6.

Figure 30:
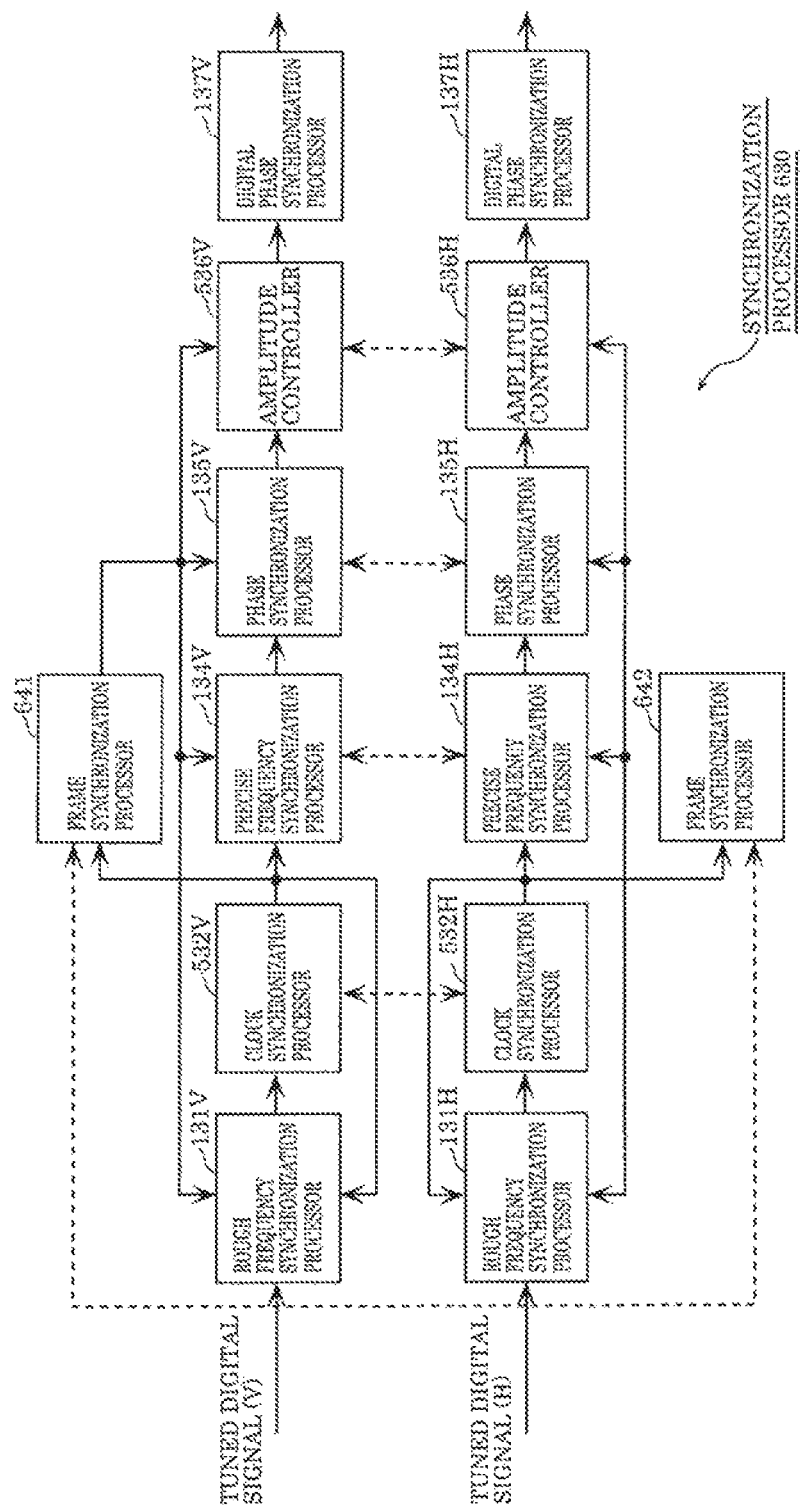
FIG. 30 illustrates an example of a configuration of a synchronization processor in Embodiment 7.

FIG. 30 illustrates an example of a configuration of synchronization processor 630. Synchronization processor 630 has a configuration in which frame synchronization processor 541 for V polarization and frame synchronization processor 542 for H polarization are replaced with frame synchronization processors 641 and 642, respectively, as compared with synchronization processor 530 in Embodiment 6 illustrated in FIG. 26.

Frame synchronization processor 641 for V polarization and frame synchronization processor 642 for H polarization cooperate with each other in establishing frame synchronization, and generate a frame synchronization timing signal. Frame synchronization processor 641 for V polarization outputs the generated frame synchronization timing signal. Here, frame synchronization processor 641 for V polarization and frame synchronization processor 642 for H polarization use not only the SOF but also one or more pilot blocks for frame synchronization. For example, frame synchronization processor 641 for V polarization and frame synchronization processor 642 for H polarization cooperate with each other in establishing frame synchronization by detecting that an accumulated correlation value indicating correlations of at least one of a tuned digital signal for V polarization or a tuned digital signal for H polarization with the SOF and with one or more pilot blocks has exceeded the threshold. Note that the accumulated correlation value is obtained by accumulating (1) a correlation value indicating a correlation of a tuned digital signal with the known bit pattern of the SOF, and (2) a correlation value indicating a correlation of a tuned digital signal with each of characteristic values of N pilot blocks (N is an integer of one or more).

Note that the number of pilot blocks included between adjacent SOFs varies depending on a slot modulating method. Thus, if only a predetermined number of pilot blocks after an SOF are used for frame synchronization, correlation values regarding two SOFs can be prevented from being included in the accumulated correlation value.

Note that in synchronization processor 630 in FIG. 30, processors other than frame synchronization processors 641 and 642 may also perform processing using one or more pilot blocks.

Figure 31:
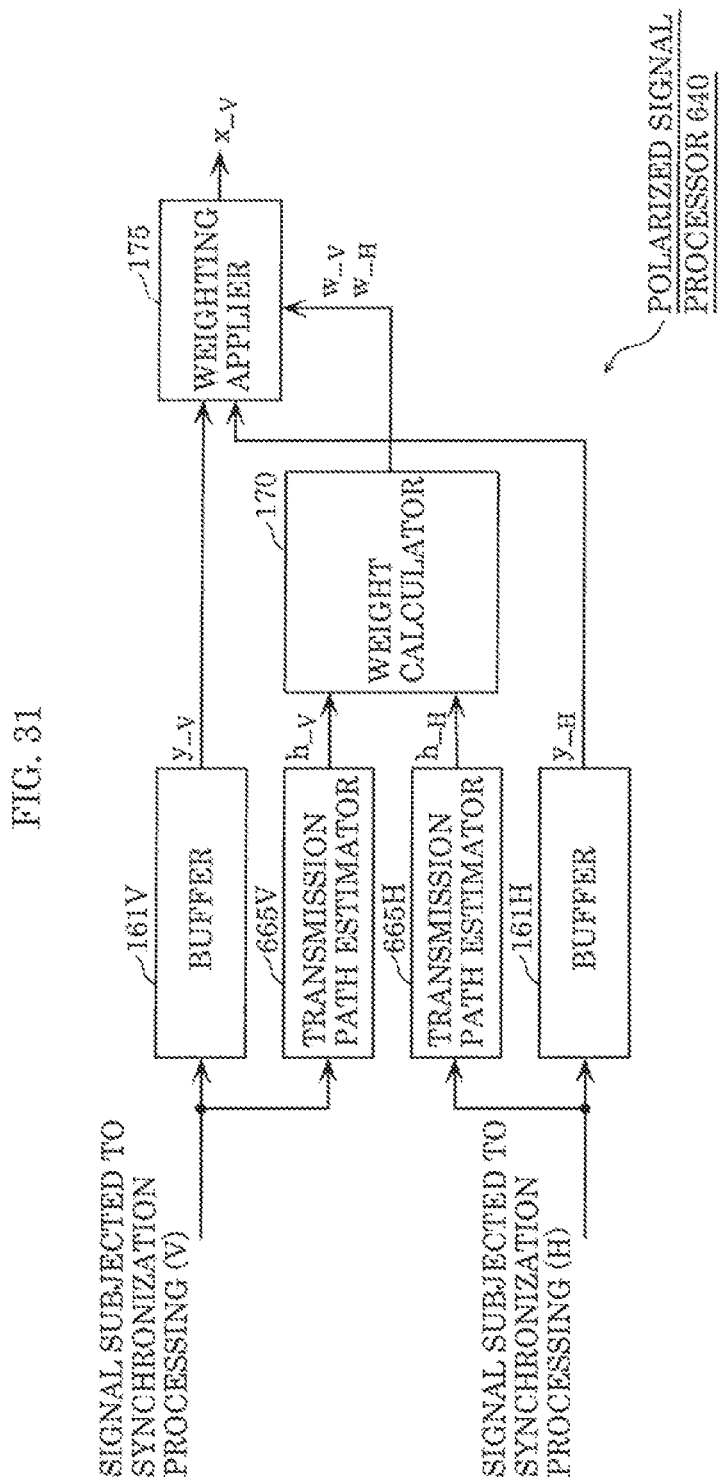
FIG. 31 illustrates an example of a configuration of a polarized signal processor in Embodiment 7.

FIG. 31 illustrates an example of a configuration of polarized signal processor 640. Polarized signal processor 640 has a configuration in which transmission path estimator 165V for V polarization and transmission path estimator 165H for H polarization are replaced with transmission path estimators 665V and 665H, respectively, as compared with polarized signal processor 140 in Embodiment 1 illustrated in FIG. 7. In polarized signal processor 640 in FIG. 31, transmission path estimators 665V and 665H calculate transmission path estimated values by using not only the SOF but also pilot blocks. Thus, transmission path estimators 665V and 665H calculate accumulated correlation values as described above as transmission path estimated values for V polarization and H polarization.

As described above, in the present embodiment, not only an SOF but also pilot blocks are used for frame synchronization processing and transmission path estimation. Accordingly, even when an interference signal is similar to a desired signal, if a scramble ID is different, it is possible to determine that the reception signal is an interference signal, and the accuracy of synchronization processing and MMSE weight calculation can be increased. Similar advantageous effects can be obtained also when the present embodiment is applied to Embodiments 1 to 6.

Embodiment 8

Figure 32:
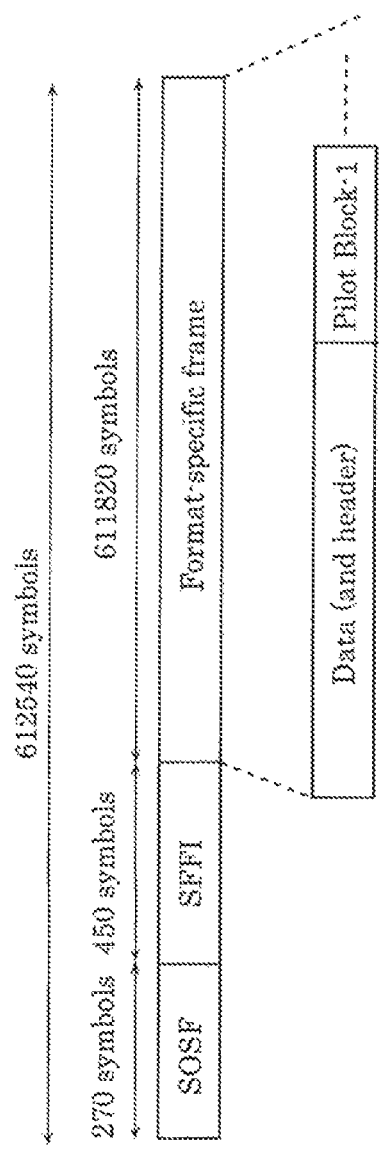
FIG. 32 illustrates a super frame (SF) structure in accordance with the DVB-S2X standard.

FIG. 32 illustrates a super frame (SF) structure in accordance with the DVB-S2X standard. Each frame has a 270-symbol start of super frame (SOSF), a 450-symbol super-frame format indication (SFFI), and a 611820-symbol format-specific frame, and is configured of 612540 symbols in total.

The SOSF includes a 256-bit Walsh-Hadamard sequence and 14-bit padding. Accordingly, the SOSF includes 256 kinds of sequences that are orthogonal to each other. In the format-specific frame, a pilot block can be inserted subsequently to data or a header. The intervals at each of which a pilot block is inserted and the length of a pilot block can be varied depending on the SF format (0 to 4). Further, a pilot block also includes a Walsh-Hadamard sequence, similarly to the SOSF, and thus pilot blocks that include different Walsh-Hadamard sequences are orthogonal to each other. Note that the format-specific frame also includes the SOF illustrated in FIG. 2.

Figure 33:
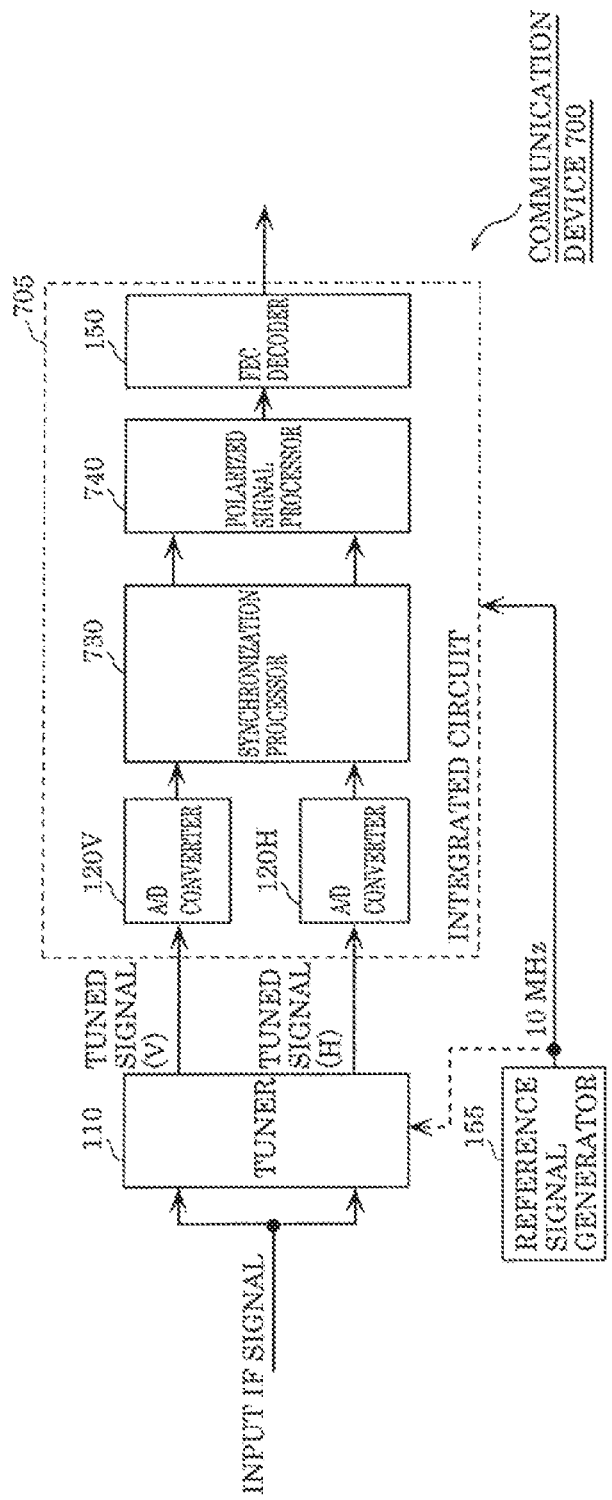
FIG. 33 illustrates an example of a configuration of a communication device in Embodiment 8.

FIG. 33 illustrates an example of a configuration of communication device 700 in Embodiment 8. Note that out of the elements included in communication device 700 in the present embodiment, the same element as that of the communication device in any of Embodiments 1 to 7 is given the same sign as that of the element in the embodiment, and a detailed description thereof is omitted.

Communication device 700 in FIG. 33 has a configuration in which synchronization processor 130 and polarized signal processor 140 are replaced with synchronization processor 730 and polarized signal processor 740, respectively, as compared with communication device 100 in Embodiment 1 illustrated in FIG. 3. Note that a unit that includes elements except tuner 110 and reference signal generator 155 in communication device 700 may be configured into integrated circuit 705. Synchronization processor 730 and polarized signal processor 740 in the present embodiment may be applied to Embodiments 1 to 7.

Figure 34:
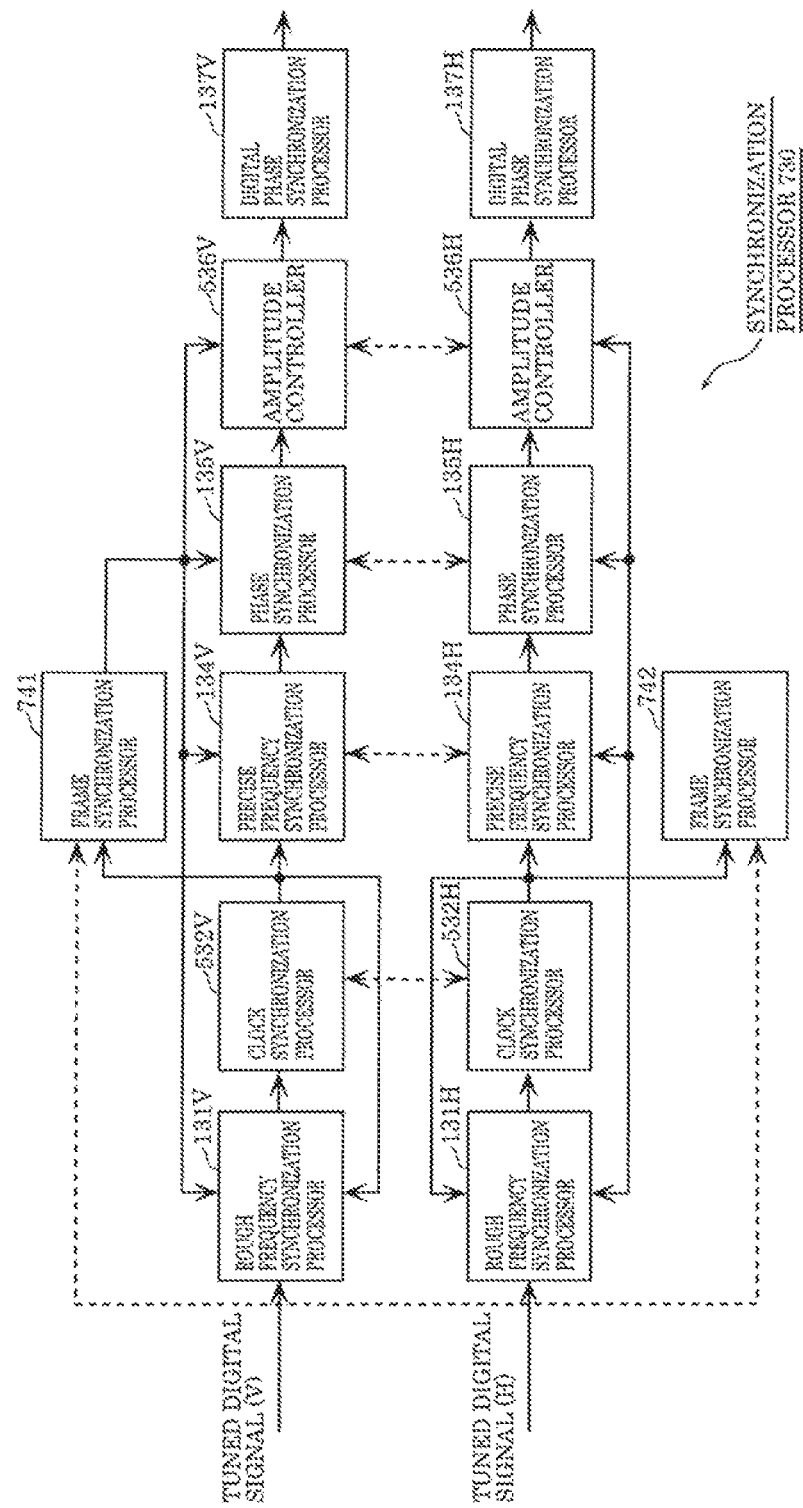
FIG. 34 illustrates an example of a configuration of a synchronization processor in Embodiment 8.

FIG. 34 illustrates an example of a configuration of synchronization processor 730. Synchronization processor 730 has a configuration in which frame synchronization processor 541 for V polarization and frame synchronization processor 542 for H polarization are replaced with frame synchronization processors 741 and 742, respectively, as compared with synchronization processor 530 in Embodiment 6 illustrated in FIG. 26.

Frame synchronization processor 741 for V polarization and frame synchronization processor 742 for H polarization cooperate with each other in establishing frame synchronization, and generate a frame synchronization timing signal. Frame synchronization processor 741 for V polarization outputs the generated frame synchronization timing signal. Frame synchronization processor 741 for V polarization and frame synchronization processor 742 for H polarization also use the SOSF and pilot blocks for frame synchronization. For example, frame synchronization processor 741 for V polarization and frame synchronization processor 742 for H polarization cooperate with each other in establishing frame synchronization by detecting that an accumulated correlation value indicating correlations of at least one of a tuned digital signal for V polarization or a tuned digital signal for H polarization with the SOSF, the SOF, and one or more pilot blocks has exceeded a threshold. Note that the accumulated correlation value is obtained by accumulating (1) a correlation value indicating a correlation of a tuned digital signal with the known bit pattern of the SOSF, (2) a correlation value indicating a correlation of a tuned digital signal with the known bit pattern of the SOF, and (3) a correlation value indicating a correlation of a tuned digital signal with each of characteristic values of N pilot blocks (N is an integer of one or more).

Note that the number of pilot blocks included between adjacent SOFs varies depending on a slot modulating method. Thus, if only a predetermined number of pilot blocks after an SOF are used for frame synchronization, correlation values regarding two SOFs can be prevented from being included in the accumulated correlation value.

Note that in synchronization processor 730 in FIG. 34, the processors other than frame synchronization processors 741 and 742 may also perform processing using the SOSF and pilot blocks.

Figure 35:
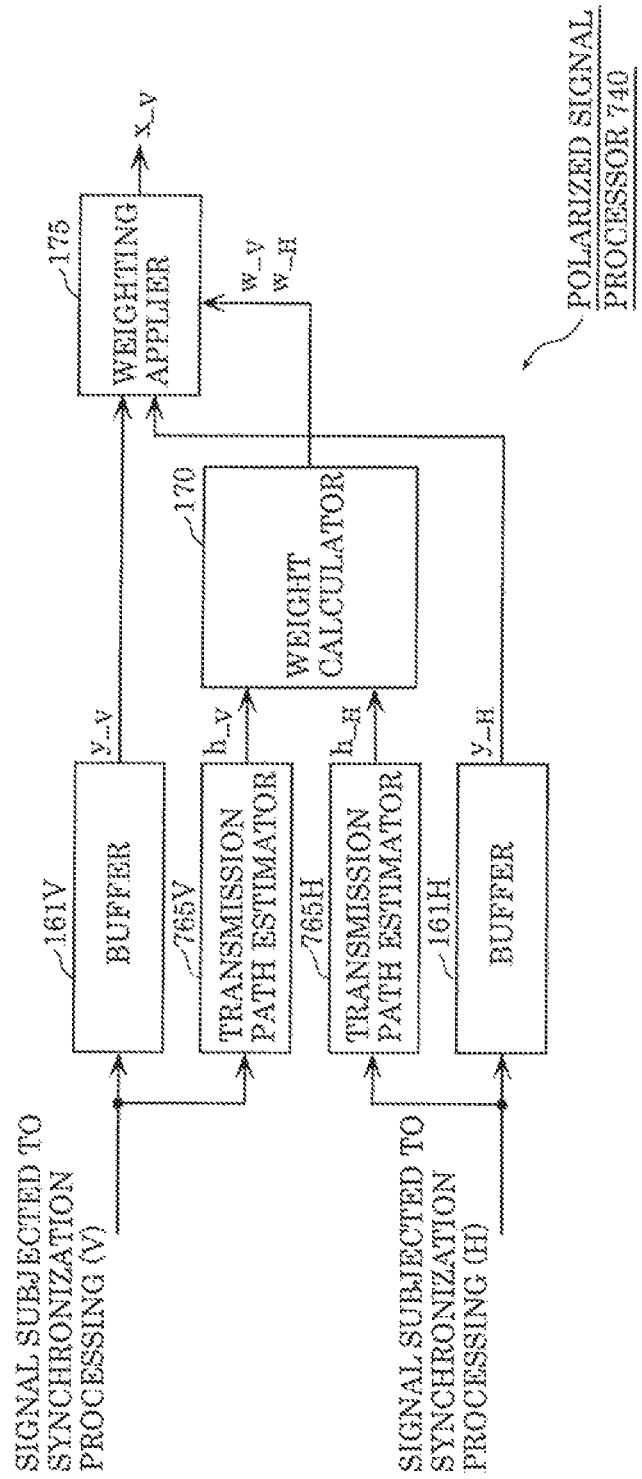
FIG. 35 illustrates an example of a configuration of a polarized signal processor in Embodiment 8.

FIG. 35 illustrates an example of a configuration of polarized signal processor 740. Polarized signal processor 740 has a configuration in which transmission path estimator 165V for V polarization and transmission path estimator 165H for H polarization are replaced with transmission path estimators 765V and 765H, respectively, as compared with polarized signal processor 140 in Embodiment 1 illustrated in FIG. 7. In polarized signal processor 740 in FIG. 35, transmission path estimators 765V and 765H calculate transmission path estimated values by using not only the SOF but also the SOSF and pilot blocks. Thus, transmission path estimators 765V and 765H calculate accumulated correlation values as described above as transmission path estimated values for V polarization and H polarization.

As described above, in the present embodiment, frame synchronization is performed on the SOSF and pilot blocks included in the SF in accordance with the DVB-S2X standard, and orthogonalities thereof are used. Accordingly, even if an interference signal is similar to a desired signal, it is possible to determine whether a reception signal is an interference signal or a desired signal, and the accuracy of synchronization processing can be increased. Similar advantageous effects can be obtained also when the present embodiment is applied to Embodiments 1 to 7.

Embodiment 9

Figure 36:
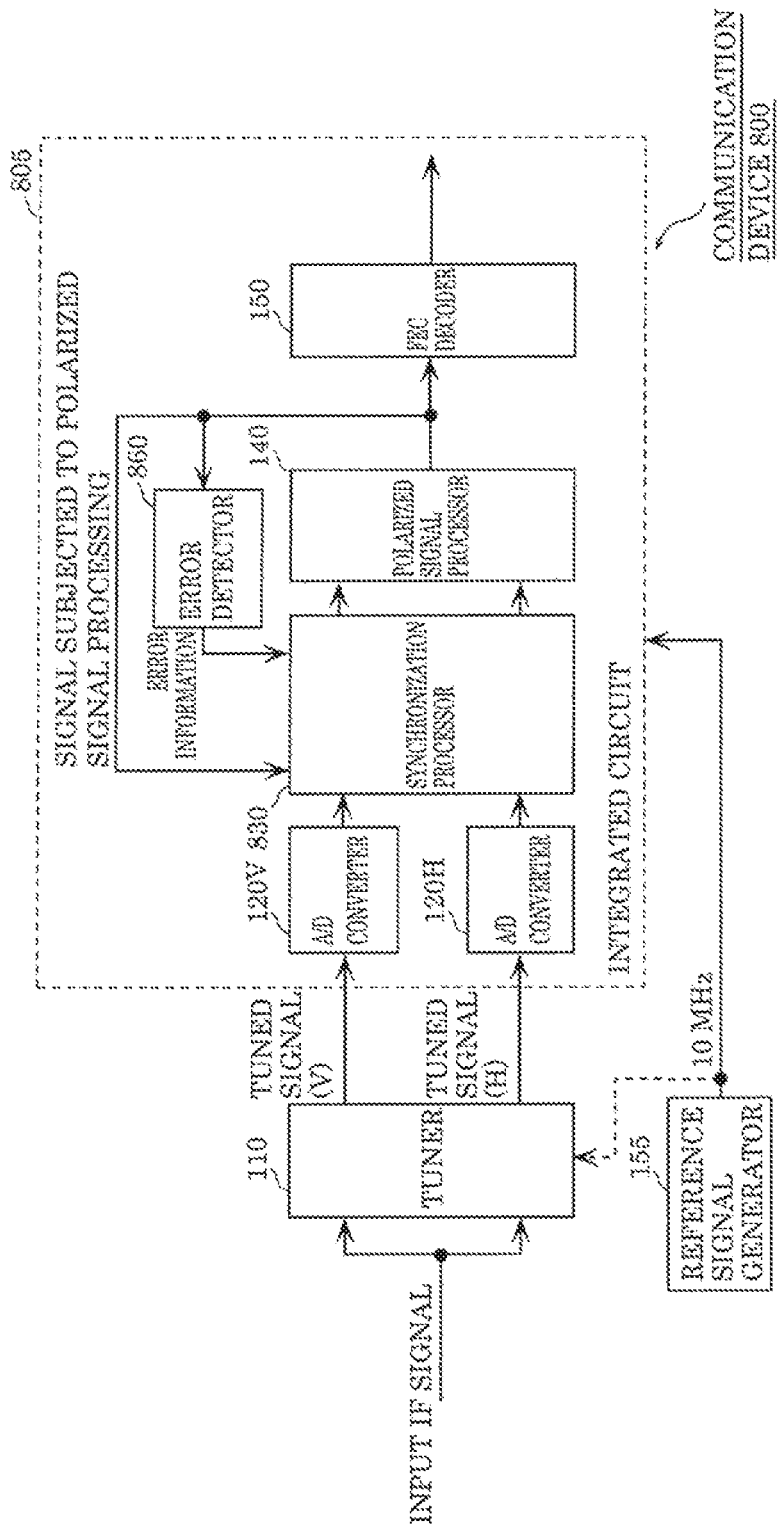
FIG. 36 illustrates an example of a configuration of a communication device in Embodiment 9.

FIG. 36 illustrates an example of a configuration of communication device 800 in Embodiment 9. Note that out of the elements included in communication device 800 in the present embodiment, the same element as that of the communication device in any of Embodiments 1 to 8 is given the same sign as that of the element in the embodiment, and a detailed description thereof is omitted.

Communication device 800 in FIG. 36 has a configuration in which synchronization processor 130 is replaced with synchronization processor 830, and error detector 860 is added, as compared with communication device 100 in Embodiment 1 illustrated in FIG. 3. Note that a unit that includes elements except tuner 110 and reference signal generator 155 in communication device 800 may be configured into integrated circuit 805. Synchronization processor 830 and error detector 860 in the present embodiment may be applied to Embodiments 1 to 8.

Error detector 860 obtains an output signal (also referred to as a signal subjected to polarized signal processing) from polarized signal processor 140, and detects an error in the output signal. For example, error detector 860 detects, as errors, differences in, for instance, frequency and phase between symbols included in the output signal. Such an error may be an average value of a predetermined number of symbols. Error detector 860 feeds back error information that indicates the errors to synchronization processor 830.

Figure 37:
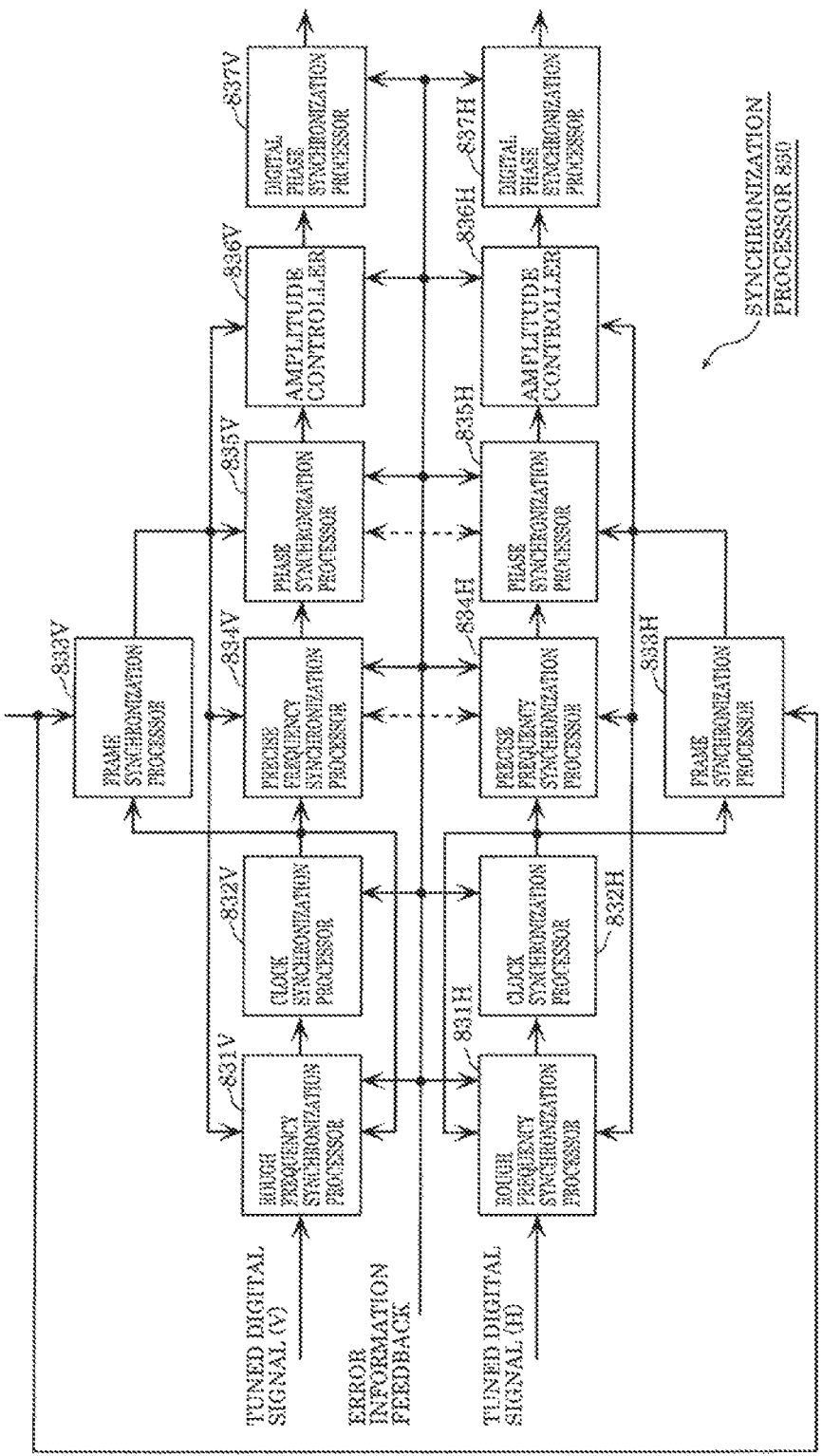
FIG. 37 illustrates an example of a configuration of a synchronization processor in Embodiment 9.

FIG. 37 illustrates an example of a configuration of synchronization processor 830. Synchronization processor 830 in FIG. 37 includes rough frequency synchronization processor 831V, clock synchronization processor 832V, frame synchronization processor 833V, precise frequency synchronization processor 834V, phase synchronization processor 835V, amplitude controller 836V, and digital phase synchronization processor 837V, which are for V polarization. Synchronization processor 830 further includes rough frequency synchronization processor 831H, clock synchronization processor 832H, frame synchronization processor 833H, precise frequency synchronization processor 834H, phase synchronization processor 835H, amplitude controller 836H, and digital phase synchronization processor 837H, which are for H polarization.

Note that in this disclosure, as described above, if "H" or "V" is omitted from a reference sign, the reference sign denotes an element for one of or each of elements for V polarization and H polarization. For example, rough frequency synchronization processor 831 denotes one of or each of rough frequency synchronization processor 831V and rough frequency synchronization processor 831H.

Synchronization processor 830 performs synchronization processing on a tuned V signal and a tuned H signal converted into digital signals. Synchronization processor 830 outputs the tuned V signal on which synchronization processing has been performed as a V signal or a signal subjected to synchronization processing, and outputs a tuned H signal on which synchronization processing has been performed as an H signal or a signal subjected to synchronization processing. The basic operation is in accordance with Annex C of NPL 5, and thus only distinctive operation of the present embodiment is to be described in the following.

In the present embodiment, error information fed back from error detector 860 is input to each of rough frequency synchronization processor 831, clock synchronization processor 832, precise frequency synchronization processor 834, phase synchronization processor 835, amplitude controller 836, and digital phase synchronization processor 837 in synchronization processor 830. Note that the above synchronization processors to which error information is input are hereinafter referred to as parameter synchronization processors.

When performing frequency or phase synchronization processing, the parameter synchronization processors detect an error from an input polarized signal (namely, a tuned digital signal), and perform synchronization processing using the error. Here, the parameter synchronization processors in the present embodiment use not only the error detected from the input polarized signal, but also add the error and an error indicated by the error information fed back from error detector 860 and use the addition result for synchronization processing. As compared with an input polarized signal, the influence of interference and noise in the output signal from polarized signal processor 140 is reduced by MMSE processing. Accordingly, the parameter synchronization processors can perform more accurate error detection by also using error information based on this output signal. As a result, the accuracy of synchronization processing in each of the parameter synchronization processors can be increased. Examples of the synchronization processing herein include clock synchronization, rough or precise frequency synchronization, phase synchronization, amplitude control, and digital phase synchronization.

Frame synchronization processor 833 in the present embodiment obtains a signal subjected to polarized signal processing. Such frame synchronization processor 833 performs processing using an output signal from clock synchronization processor 832 after the operation starts, and outputs a frame synchronization timing signal upon detecting, for the first time, that a correlation value indicating a correlation regarding the SOF has exceeded a threshold. Using a signal subjected to polarized signal processing, frame synchronization processor 833 decodes the PLSCODE subsequent to the SOF, obtains information regarding modulation and coding (MODCOD) (a modulation scheme and a coding rate) or regarding as to whether a pilot signal is included, and detects the number of symbols included in the frame. Accordingly, frame synchronization processor 833 detects the timing of the head symbol of the next frame. A signal subjected to polarized signal processing may be used for frame synchronization processor 833 also in subsequent operation.

As described above, in the present embodiment, the accuracy of synchronization processing can be increased by feeding back the error detected from a signal on which polarized signal processing has been performed (a signal subjected to polarized signal processing as described above) to synchronization processor 830. Similar advantageous effects can be obtained also when the present embodiment is applied to Embodiments 1 to 8. In the present embodiment, communication device 800 includes error detector 860, and an output signal from error detector 860 is fed back to synchronization processor 830. However, communication device 800 may not include error detector 860, and a signal subjected to polarized signal processing from polarized signal processor 140 may be fed back to each of the parameter synchronization processors of synchronization processor 830. In this case, the parameter synchronization processors each detect an error in a signal subjected to polarized signal processing, using the error detector used in synchronization processing. Accordingly, error detection from the output of polarized signal processor 140 can be performed with a less amount of calculation.

Embodiment 10

Figure 38:
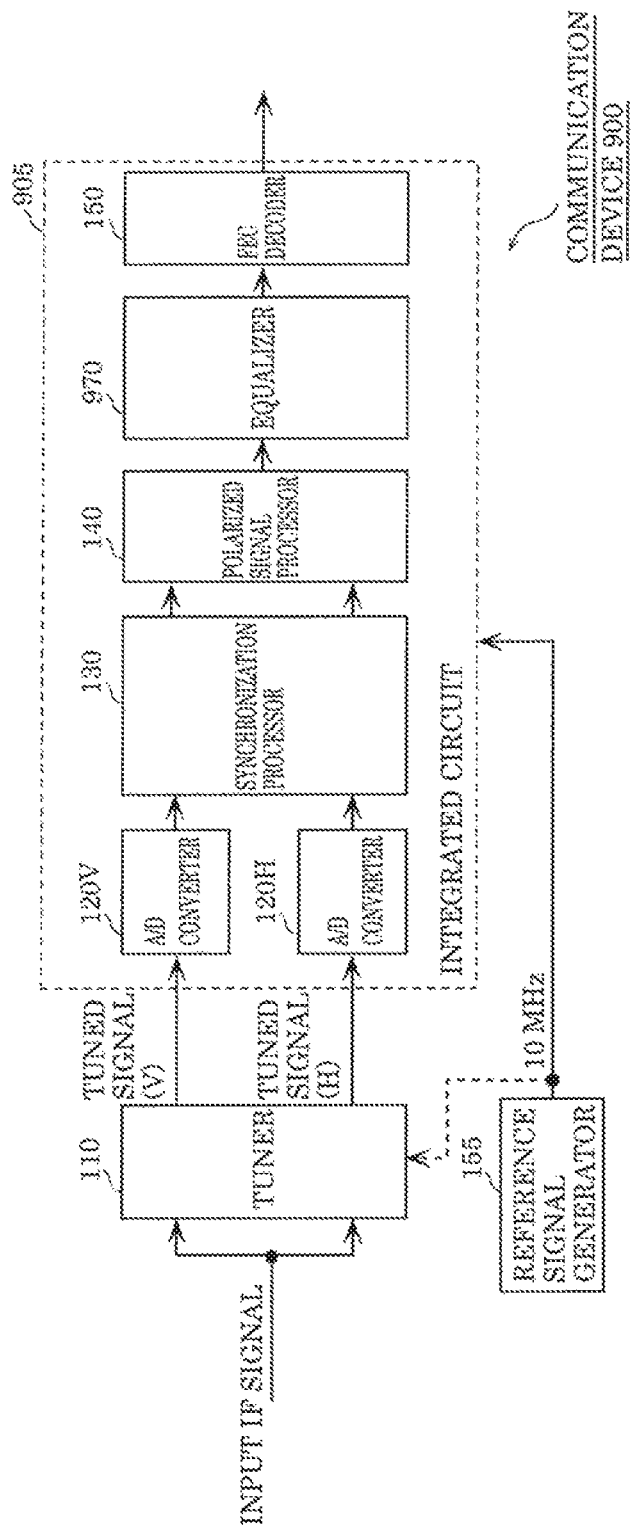
FIG. 38 illustrates an example of a configuration of a communication device in Embodiment 10.

FIG. 38 illustrates an example of a configuration of communication device 900 in Embodiment 10. Note that out of the elements included in communication device 900 in the present embodiment, the same element as that of the communication device in any of Embodiments 1 to 9 is given the same sign as that of the element in the embodiment, and a detailed description thereof is omitted.

Communication device 900 in FIG. 38 has a configuration in which equalizer 970 is added, as compared with communication device 100 in Embodiment 1 illustrated in FIG. 3. Note that a unit that includes elements except tuner 110 and reference signal generator 15 in communication device 900 may be configured into integrated circuit 905. Here, for example, equalizer 970 performs, on an output signal from polarized signal processor 140, equalization processing such as linear equalization using a transversal filter, for instance, or nonlinear equalization using maximum likelihood sequence estimation (MLSE), for instance.

As described above, in the present embodiment, equalization processing is performed on an output signal from polarized signal processor 140, thus reducing the influence of inter-symbol interference and achieving improvement in the received SINR. Similar advantageous effects can be obtained also when the present embodiment is applied to Embodiments 1 to 9.

<Variation 1>

Instead of performing equalization processing on an output signal from polarized signal processor 140, equalization processing may be performed on an output signal from synchronization processor 130.

Figure 39:
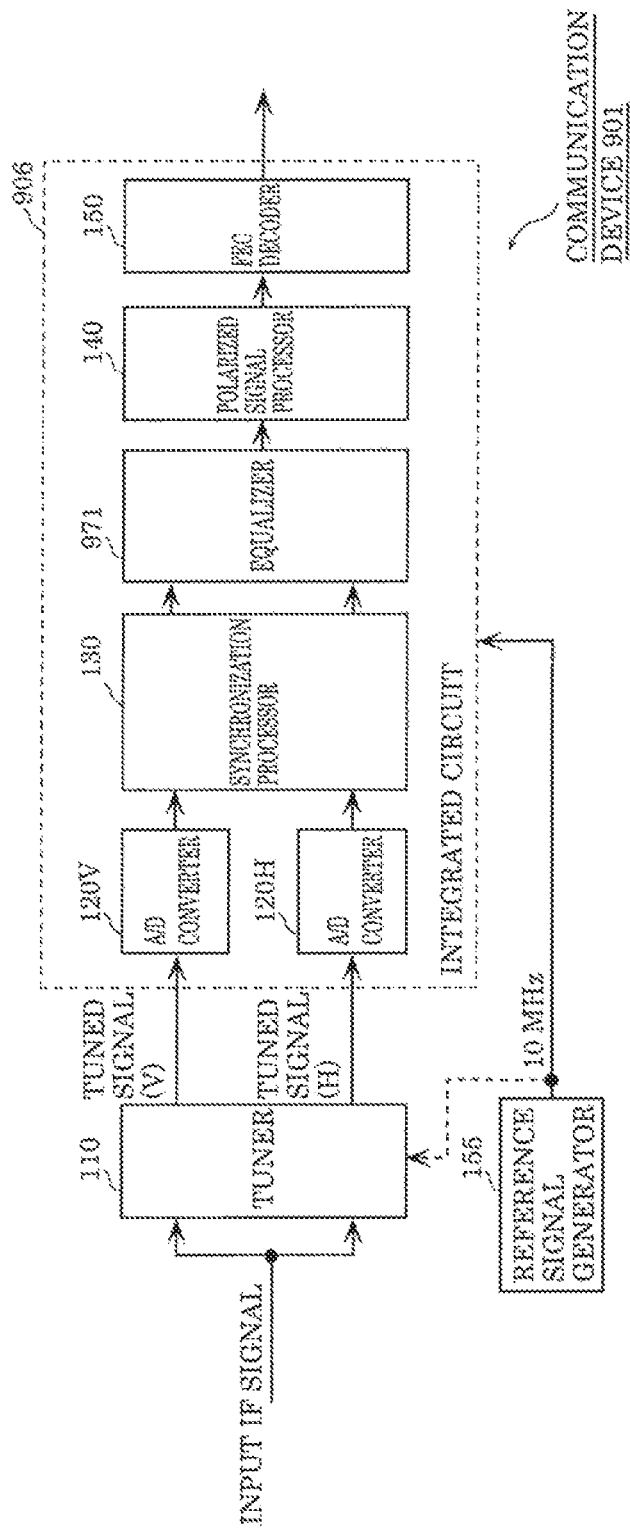
FIG. 39 illustrates an example of a configuration of a communication device in Variation 1 of Embodiment 10.

FIG. 39 illustrates an example of a configuration of communication device 901 in Variation 1. In communication device 901, as compared with communication device 900, equalizer 970 is replaced with equalizer 971, and equalizer 971 is disposed upstream of polarized signal processor 140 rather than downstream thereof. As compared with equalizer 970, the number of input signals to equalizer 971 is increased to 2, and equalizer 971 performs equalization processing on each of the two input signals. Thus, equalizer 971 performs equalization processing on each of a V-polarized signal subjected to synchronization processing and an H-polarized signal subjected to synchronization processing, which are output from synchronization processor 130.

Thus, inter-symbol interference is eliminated in advance from signals to be processed by polarized signal processor 140, thus achieving further improvement in the received SINR produced by MMSE processing in polarized signal processor 140.

<Variation 2>

The equalizer and the polarized signal processor may be combined.

Figure 40:
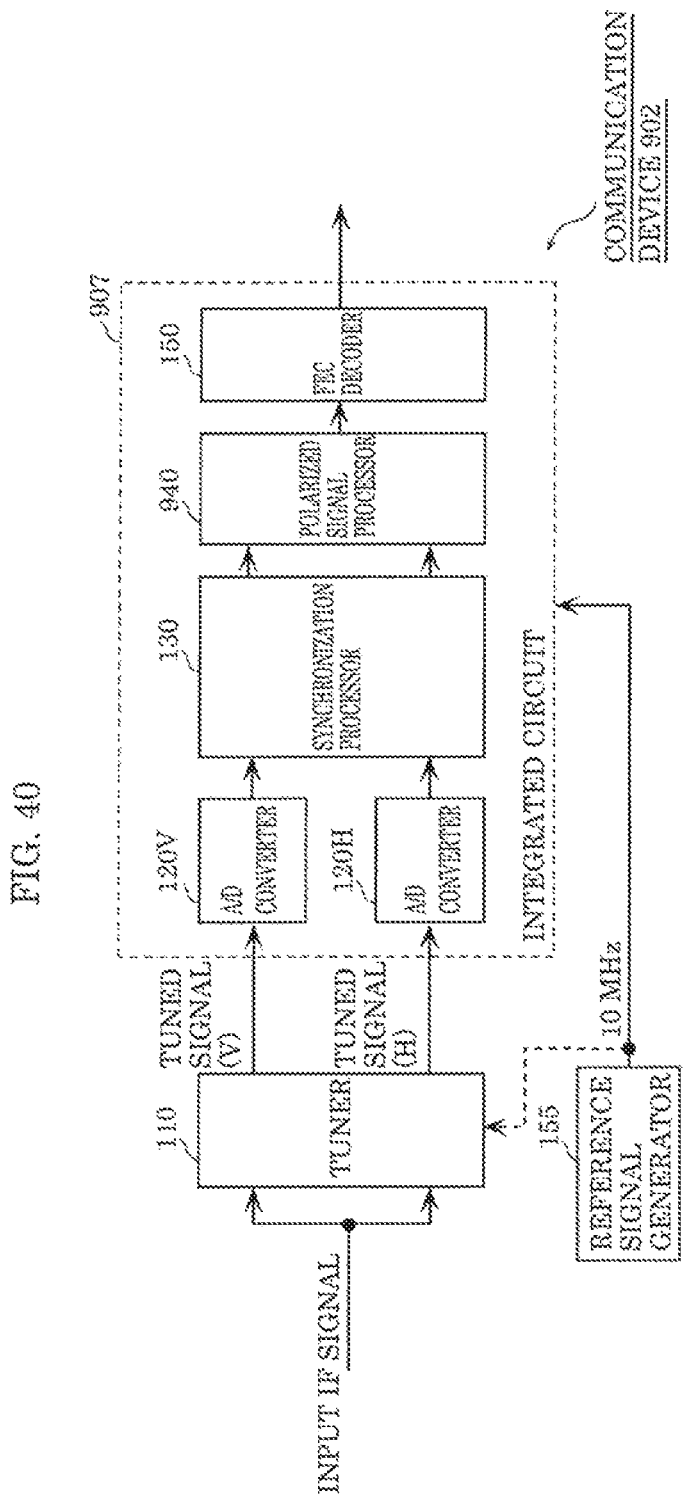
FIG. 40 illustrates an example of a configuration of a communication device in Variation 2 of Embodiment 10.

FIG. 40 illustrates an example of a configuration of communication device 902 in Variation 2. Communication device 902 has a configuration in which polarized signal processor 140 and equalizer 970 are replaced with polarized signal processor 940, as compared with communication device 900.

Figure 41:
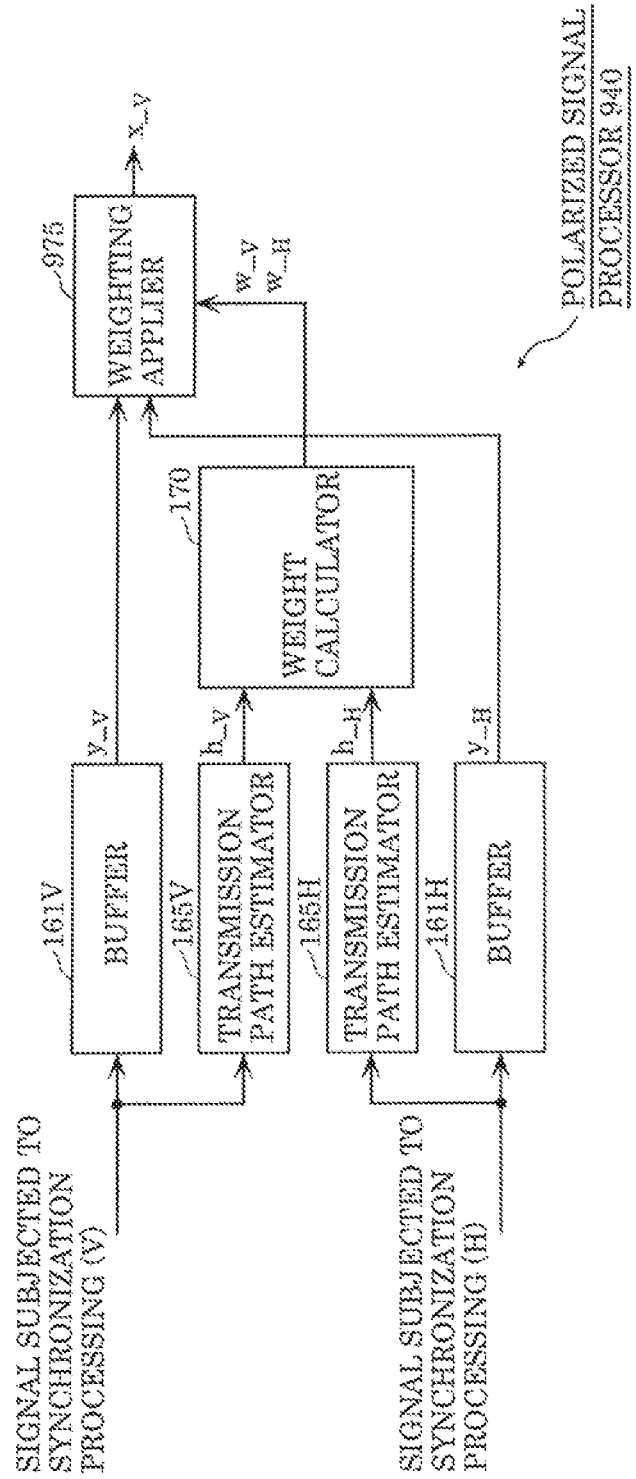
FIG. 41 illustrates an example of a configuration of a polarized signal processor in Variation 2 of Embodiment 10.

FIG. 41 illustrates an example of a configuration of polarized signal processor 940. Polarized signal processor 940 in FIG. 41 has a configuration in which weighting applier 175 is replaced with weighting applier 975, as compared with polarized signal processor 140 in Embodiment 1 illustrated in FIG. 7. Weighting applier 975 in FIG. 41 performs MMSE weighting processing using weights for N symbols (N is a natural number of two or more) $w_{\_V}(t-N+1)$, $w_{\_V}(t-N+2)$, ..., $w_{\_V}(t)$ and $w_{\_H}(t-N+1)$, $w_{\_H}(t-N+2)$, ..., $w_{\_H}(t)$ output from weight calculator 170, as shown by Expression (14). Weighting applier 975 outputs V-polarized signal $x_{\_V}(t)$ which is the result of the weighting processing.

[Math 8]

$$x_{\_V}(t)=\Sigma_{i=-(N-1)-0}(w_{\_V}(t-i)\cdot y_{\_V}(t-i)+w_{\_H}(t-i)\cdot y_{\_H}(t-i))$$  Expression (14)

Here, $y_{\_V}(t-N+1)$, $y_{\_V}(t-N+2)$, ..., $y_{\_V}(t)$ are N-symbol signals delayed by buffer 161V, out of V-polarized signals subjected to synchronization processing and input to polarized signal processor 940. $y_{\_H}(t-N+1)$, $y_{\_H}(t-N+2)$, ..., $y_{\_H}(t)$ are N-symbol signals delayed by buffer 161H out of H-polarized signals subjected to synchronization processing and input to polarized signal processor 940. Polarized signal processor 940 illustrated in FIG. 41 performs MMSE weighting processing using weight coefficients for N symbols and an N-symbol signal subjected to synchronization processing, thus also performing equalization processing in polarized signal processor 940. Polarized signal processor 940 having such a configuration can reduce the influence of inter-symbol interference due to equalization processing, similarly to Embodiment 1.0 and Variation 1.

Here, the communication devices in the present embodiment and the variation each include a signal processing device for receiving signals transmitted from satellite 3000. This signal processing device includes synchronization processor 130, a polarized signal processor, and an equalizer, for example. The equalizer may be equalizer 970 or 971 described above. The polarized signal processor may be polarized signal processor 140 described above, and may be polarized signal processor 940 having the function of an equalizer. The equalizer performs equalization processing on a vertical signal and a horizontal signal on which synchronization processing has been performed, or a signal resulting from weighted summation. For example, equalizer 971 performs equalization processing on a vertical signal and a horizontal signal on which synchronization processing has been performed, and equalizer 970 performs equalization processing on a signal resulting from weighted summation. Polarized signal processor 940 performs equalization processing on a vertical signal and a horizontal signal on which synchronization processing has been performed.

Figure 42:
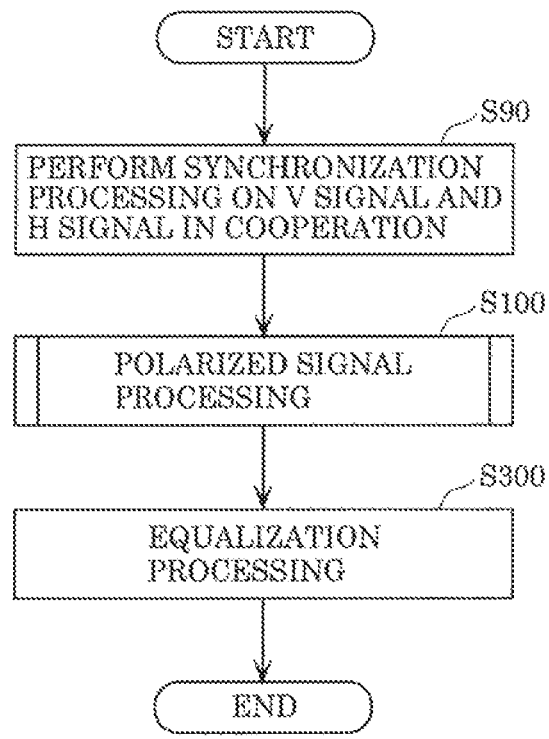
FIG. 42 is a flowchart illustrating an example of processing operation of a signal processing device in Embodiment 10.

FIG. 42 is a flowchart illustrating an example of processing operation of the signal processing device in Embodiment 10.

The signal processing device first performs synchronization processing on each of a vertical signal and a horizontal signal in cooperation (step S90), and further performs polarized signal processing on the signals (step S100). Equalizer 970 in the signal processing device performs equalization processing on a signal resulting from weighted summation in the polarized signal processing (step S300).

Accordingly, the signal processing device and the signal processing method in the present embodiment achieve reduction in the influence of intersymbol interference, since equalization processing is performed. Accordingly, the influence of a delay wave can be reduced. As a result, the received SINR can be improved.

Embodiment 11

Figure 43:
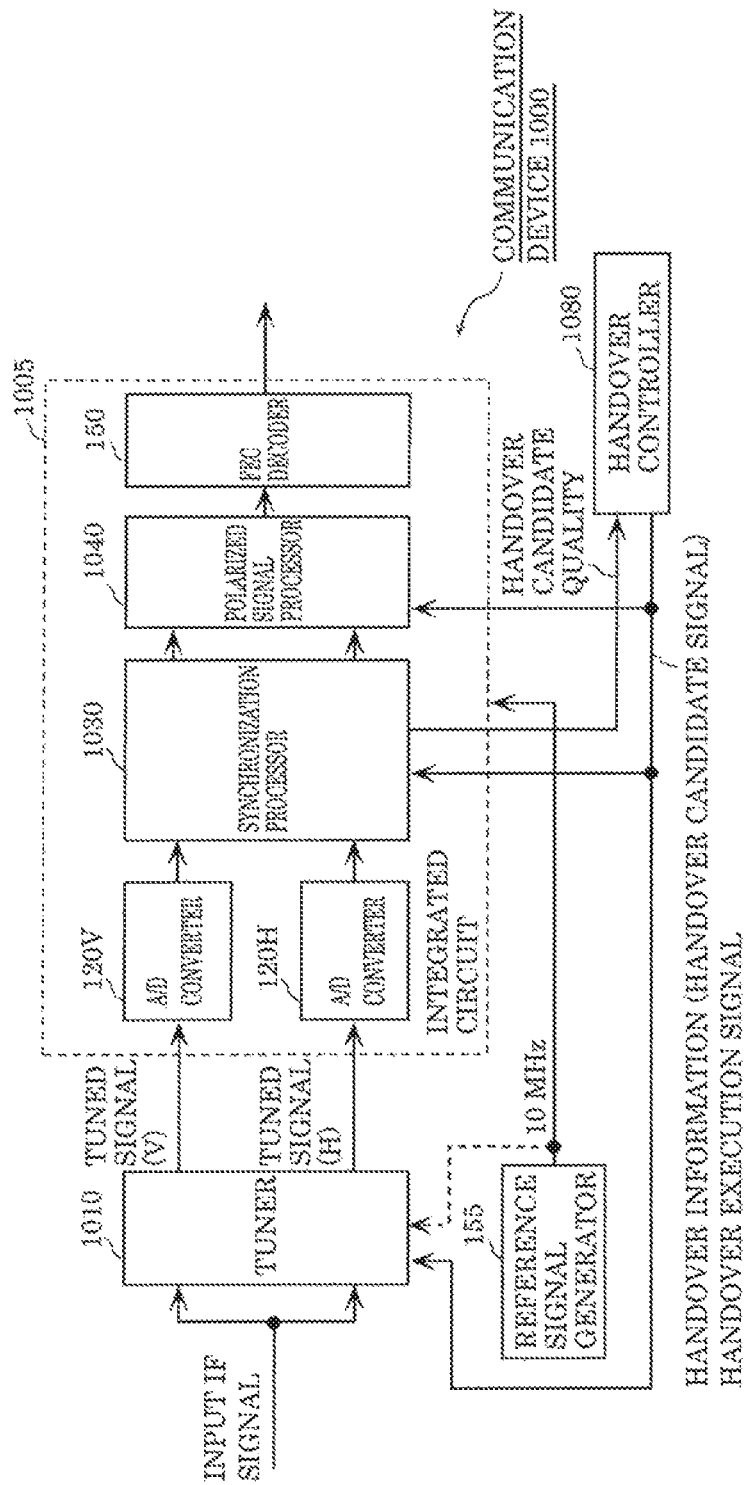
FIG. 43 illustrates an example of a configuration of a communication device in Embodiment 11.

FIG. 43 illustrates an example of a configuration of communication device 1000 in Embodiment 11. Note that out of the elements included in communication device 1000 in the present embodiment, the same element as that of the communication device in any of Embodiments 1 to 10 is given the same sign as that of the element in the embodiment, and a detailed description thereof is omitted.

Communication device 1000 in FIG. 43 has a configuration in which tuner 110, synchronization processor 530, and polarized signal processor 140 are replaced with tuner 1010, synchronization processor 1030, and polarized signal processor 1040, respectively, and handover controller 1080 is added, as compared with communication device 500 in Embodiment 6 illustrated in FIG. 25. Note that a unit that includes elements except tuner 1010, reference signal generator 155, and handover controller 1080 in communication device 1000 may be configured into integrated circuit 1005. Tuner 1010, synchronization processor 1030, polarized signal processor 1040, and handover controller 1080 in the present embodiment may be applied to Embodiments 1 to 10.

In the present embodiment, handover controller 1080 designates a signal having a frequency different from that of a current signal, as a handover candidate signal. Note that the current signal is a signal transmitted from satellite 3000 to the current location of airplane 2000. When this designation is made, tuner 1010 selects and outputs a signal having the designated frequency as a reception signal for H polarization. Note that when a V-polarized signal having a frequency different from that of the current signal is designated as a handover candidate signal, tuner 1010 selects and outputs a V-polarized signal having the designated frequency, as a reception signal for H polarization.

Figure 44:
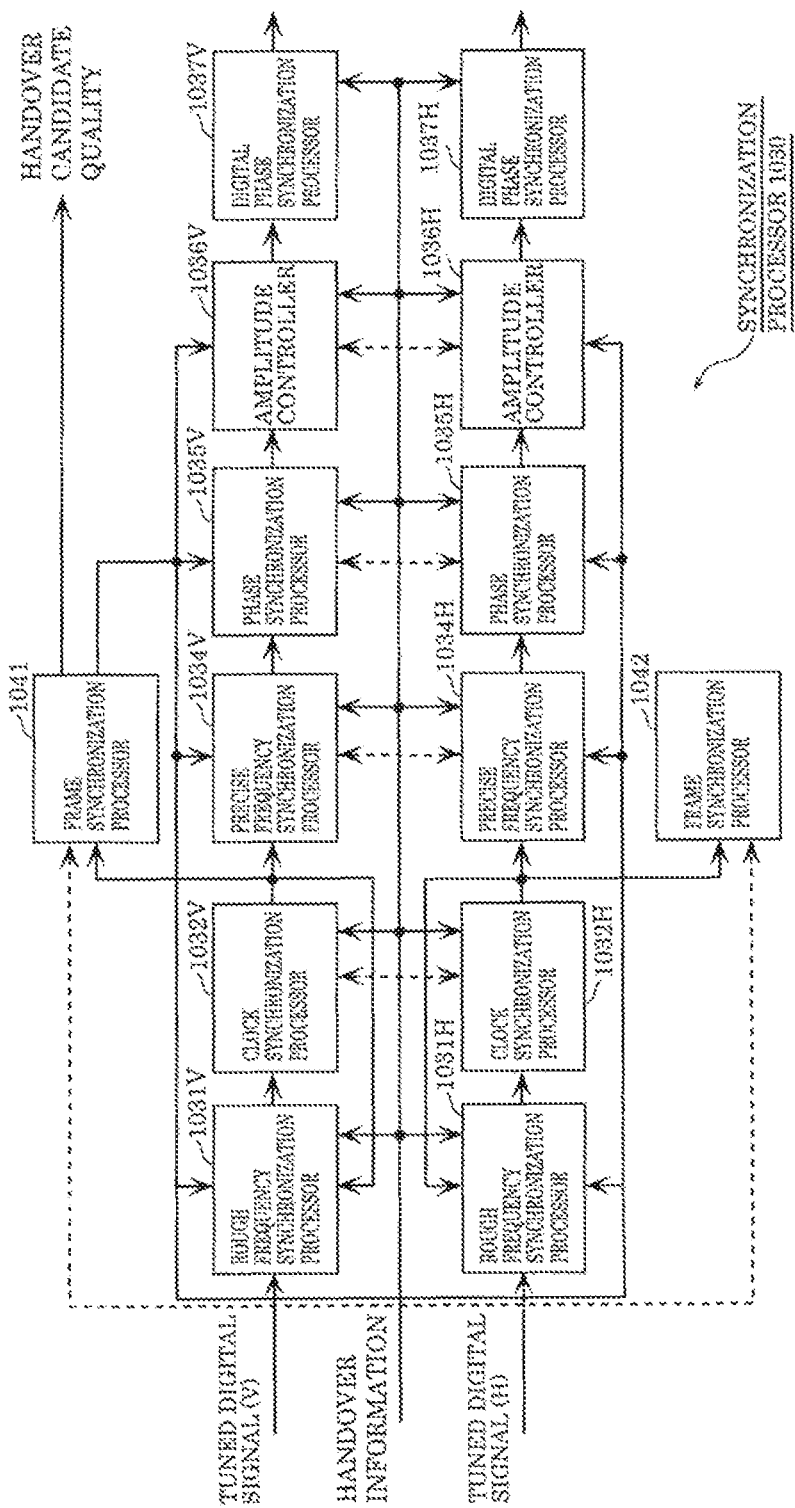
FIG. 44 illustrates an example of a configuration of a synchronization processor in Embodiment 11.

FIG. 44 illustrates an example of a configuration of synchronization processor 1030. Synchronization processor 1030 in FIG. 44 includes rough frequency synchronization processor 1031V, clock synchronization processor 1032V, frame synchronization processor 1041, precise frequency synchronization processor 1034V, phase synchronization processor 1035V, amplitude controller 1036V, and digital phase synchronization processor 1037V, which are for V polarization. Furthermore, synchronization processor 1030 includes rough frequency synchronization processor 1031H, clock synchronization processor 1032H, frame synchronization processor 1042, precise frequency synchronization processor 1034H, phase synchronization processor 1035H, amplitude controller 1036H, and digital phase synchronization processor 1037H, which are for H polarization.

Note that in the present disclosure, if "H" or "V" is omitted from a reference sign, the reference sign denotes an element for one of or each of V polarization and H polarization, as described above. For example, rough frequency synchronization processor 1031 represents one of or each of rough frequency synchronization processor 1031V and rough frequency synchronization processors 1031H.

Synchronization processor 1030 performs synchronization processing on a tuned V signal and a tuned H signal converted into digital signals. Synchronization processor 1030 outputs the tuned V signal on which synchronization processing has been performed as a V signal or a signal subjected to synchronization processing, and outputs the tuned H signal on which synchronization processing has been performed as an H signal or a signal subjected to synchronization processing. Since the basic operation is in accordance with Annex C of NPL 5, the following describes only distinctive operation of the present embodiment.

In the present embodiment, handover information output from handover controller 1080 is input to each of rough frequency synchronization processor 1031, clock synchronization processor 1032, precise frequency synchronization processor 1034, phase synchronization processor 1035, amplitude controller 1036, and digital phase synchronization processor 1037 in synchronization processor 1030. Note that each of the above synchronization processors to which handover information is input is hereinafter referred to as a parameter synchronization processor. The handover information is information that indicates a handover candidate signal described above.

When handover controller 1080 designates a signal having a frequency different from that of a current signal as a handover candidate signal, the parameter synchronization processors of synchronization processor 1030 perform synchronization processing independently from each other. Thus, each parameter synchronization processor for V polarization performs synchronization processing on a currently received signal, and each parameter synchronization processor for H polarization performs synchronization processing on a reception signal having the designated frequency. Frame synchronization processor 1041 and frame synchronization processor 1042 cooperate with each other in outputting the detection result of the frame synchronization in frame synchronization processor 1042 to handover controller 1080 as the quality of a handover candidate. The quality of a handover candidate is information that indicates whether a correlation value indicating a correlation of an H-polarized reception signal (namely, a tuned digital signal) with the known bit pattern of the SOF has exceeded a threshold, for example.

Figure 45:
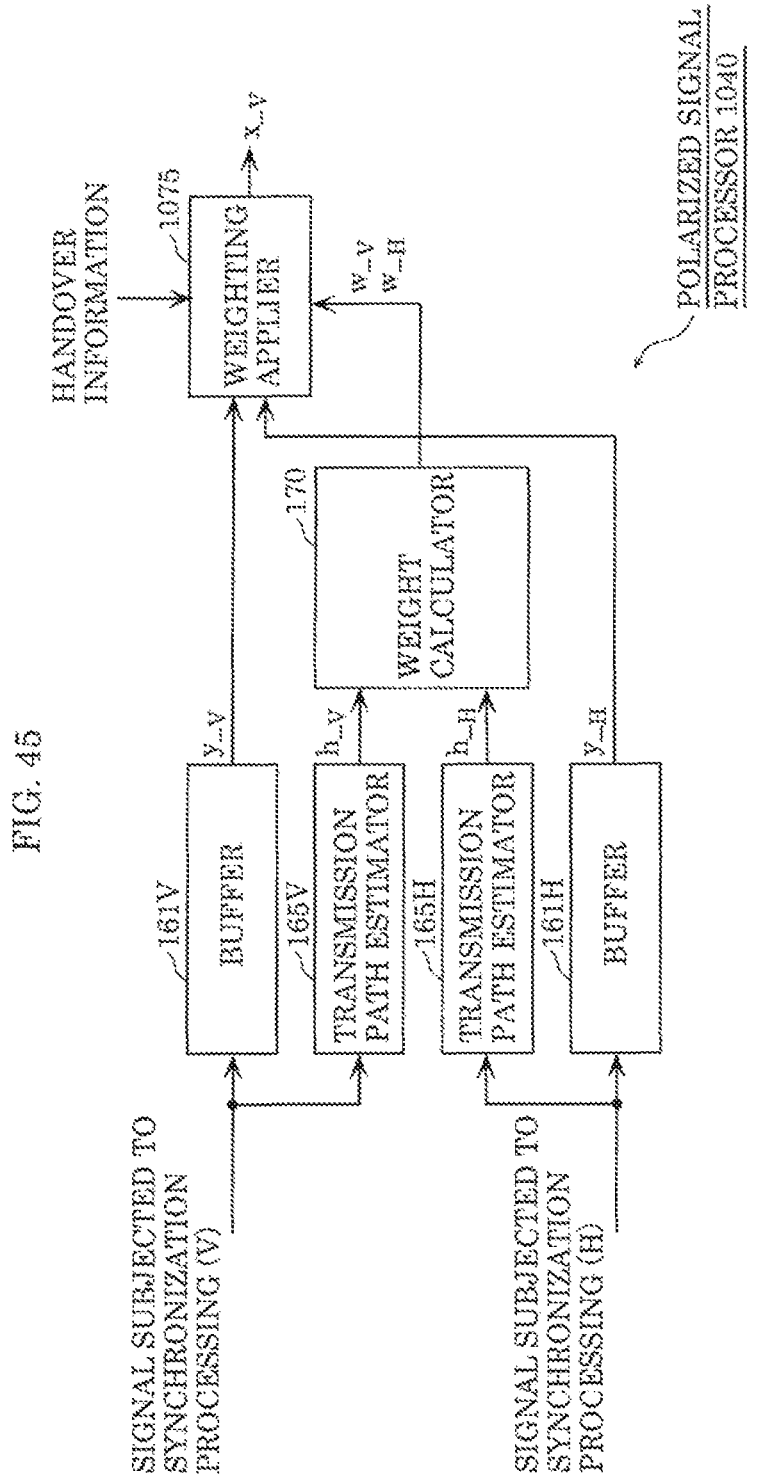
FIG. 45 illustrates an example of a configuration of a polarized signal processor in Embodiment 11.

FIG. 45 illustrates an example of a configuration of polarized signal processor 1040. In polarized signal processor 1040 in FIG. 45, weighting applier 175 is replaced with weighting applier 1075, as compared with polarized signal processor 140 in Embodiment 1 illustrated in FIG. 7. Handover information is input to weighting applier 1075. Weighting applier 1075 outputs a V-polarized signal subjected to synchronization processing and output from buffer 161V as it is, when the handover information is obtained. Thus, polarized signal processor 1040 does not perform MMSE weighting processing when handover is performed.

If the quality of a handover candidate output from synchronization processor 1030 is sufficient, handover controller 1080 outputs a handover execution signal to formally perform handover. Note that the case where the quality of a handover candidate is sufficient is when a correlation value indicating a correlation of an H-polarized reception signal (that is, a tuned digital signal) with the known bit pattern of the SOF exceeds the threshold. Tuner 1010 tunes to a frequency of a reception signal at the handover destination. Stated differently, tuner 1010 tunes to a frequency of a signal designated by handover controller 1080 for each of V polarization and H polarization. Thereafter, synchronization processor 1030 and polarized signal processor 1040 perform the same processing as in Embodiment 6.

As described above, when handover occurs, the timing at which handover occurs and information indicating a signal to be used after the handover are notified to tuner 1010, synchronization processor 1030, and polarized signal processor 1040, in the present embodiment. Accordingly, a desired signal can be continuously received also at the time of handover.

Here, communication device 1000 in the present embodiment includes a signal processing device for receiving signals transmitted from satellite 3000. The signal processing device includes synchronization processor 1030, polarized signal processor 1040, and handover controller 1080, for example. Handover controller 1080 designates a handover candidate signal having a frequency different from that of a transmission signal transmitted from a transmission device such as satellite 3000. When a handover candidate signal is designated, weighting applier 1075 in polarized signal processor 1040 does not perform weighted summation. Furthermore, synchronization processor 1030 determines whether a reception signal resulting from being received by an antenna for polarization different from the polarization of a transmission signal, out of a vertical polarization antenna and a horizontal polarization antenna, satisfies a predetermined condition. Handover controller 1080 outputs a handover execution signal, when synchronization processor 1030 determines that the reception signal satisfies the predetermined condition. Synchronization processor 1030 and polarized signal processor 1040 switch a signal to be processed from the transmission signal described above to a handover candidate signal, when the handover execution signal is obtained. Note that the predetermined condition may be a condition that the correlation value described above is a threshold or higher or a condition that the error rate indicating the result of error correction processing by FEC decoder 150 is a threshold or lower. Note that the determination as to whether the quality of a handover candidate described above is sufficient is made based on the determination as to whether a reception signal satisfies the predetermined condition.

Figure 46:
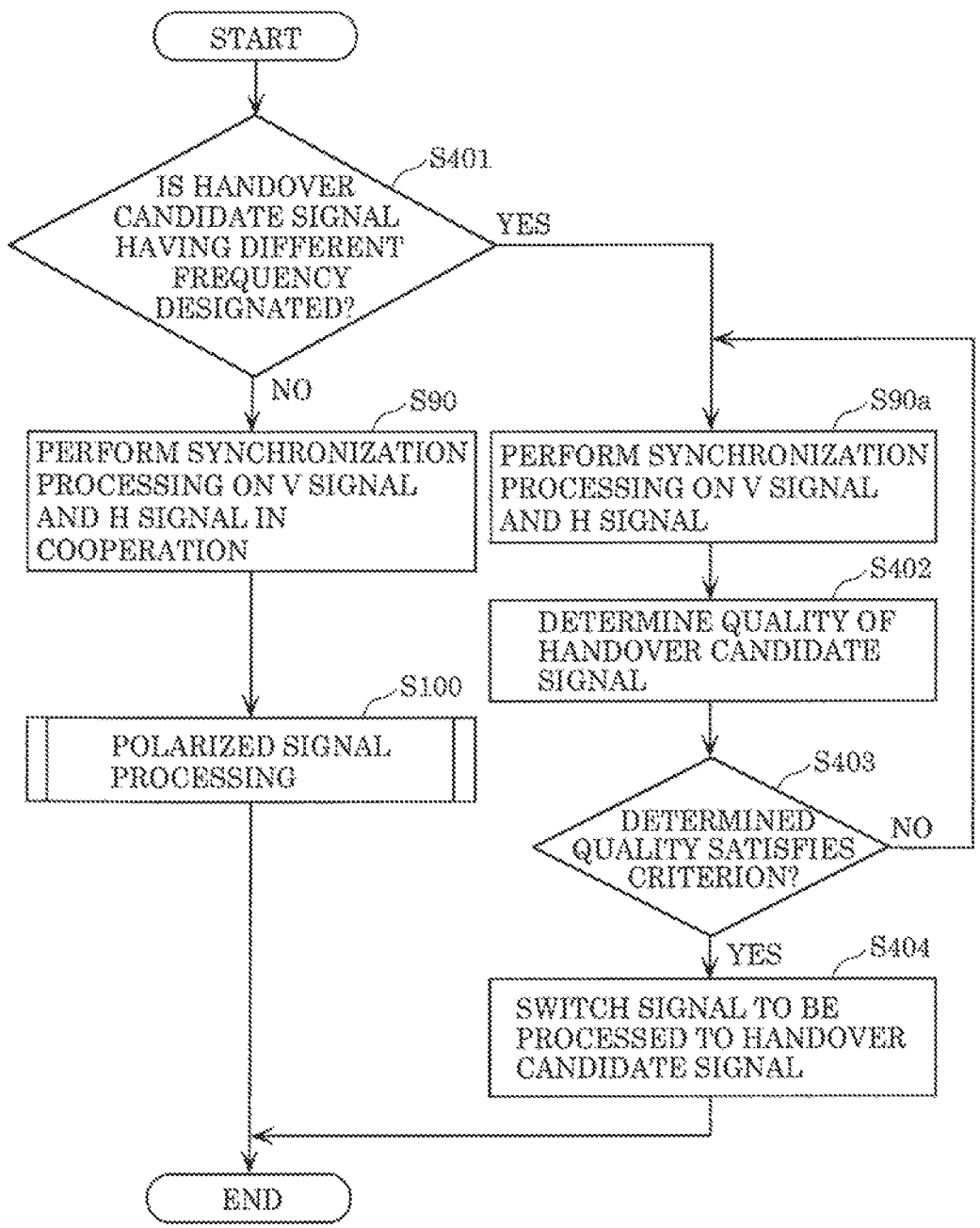
FIG. 46 is a flowchart illustrating an example of processing operation of a signal processing device in Embodiment 11.

FIG. 46 is a flowchart illustrating an example of processing operation of the signal processing device in Embodiment 11.

First, synchronization processor 1030 determines whether a handover candidate signal having a different frequency is designated (step S401). If such a signal is not designated (No in step 401), synchronization processor 1030 performs synchronization processing on each of a vertical signal and a horizontal signal in cooperation, similarly to the above (step S90). Furthermore, polarized signal processor 1040 performs polarized signal processing (step S100). On the other hand, if a handover candidate signal is designated (Yes in step S401), weighting applier 1075 of polarized signal processor 1040 does not perform weighted summation, and synchronization processor 1030 performs synchronization processing on each of the vertical signal and the horizontal signal (step S90a). At this time, synchronization processor 1030 determines, as the quality of a handover candidate signal, the quality of a signal resulting from being received by an antenna for polarization different from that of a transmission signal, out of a vertical polarization antenna and a horizontal polarization antenna (step S402). Handover controller 1080 determines whether the determined quality satisfies a criterion for handover (step S403). Here, if the quality satisfies the criterion (Yes in step S403), handover controller 1080 causes synchronization processor 1030 and polarized signal processor 1040 to switch a signal to be processed from a transmission signal described above to the handover candidate signal (step S404).

Accordingly, with the signal processing device and the signal processing method in the present embodiment, when handover is performed, for example, the application of MMSE weighted summation is stopped, but nevertheless handover can be appropriately performed.

Embodiment 12

Figure 47:
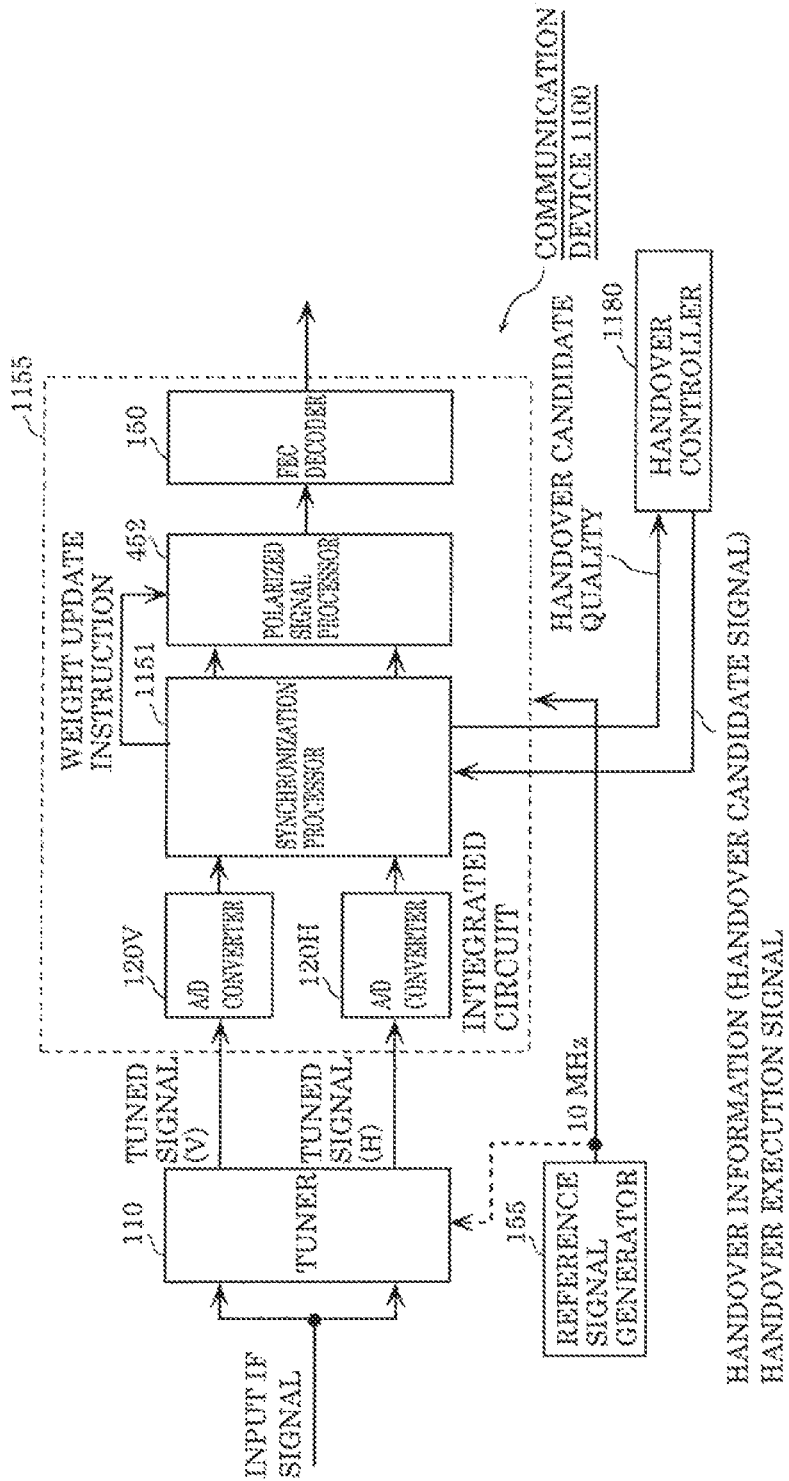
FIG. 47 illustrates an example of a configuration of a communication device in Embodiment 12.

FIG. 47 illustrates an example of a configuration of communication device 1100 in Embodiment 12. Note that out of the elements included in communication device 1100 in the present embodiment, the same element as that of the communication device in any of Embodiments 1 to 11 is given the same sign as that of the element in the embodiment, and a detailed description thereof is omitted.

Communication device 1100 in FIG. 47 has a configuration in which synchronization processor 451 is replaced with synchronization processor 1151, and handover controller 1180 is added, as compared with communication device 450 in Embodiment 5 illustrated in FIG. 22. Note that a unit that includes elements except tuner 110, reference signal generator 155, and handover controller 1180 in communication device 1100 may be configured into integrated circuit 1155. Synchronization processor 1151 and handover controller 1180 in the present embodiment may be applied to Embodiments 1 to 11.

In the present embodiment, handover controller 1180 designates a signal having the same frequency as and different polarization from those of the current signal, as a handover candidate signal.

Figure 48:
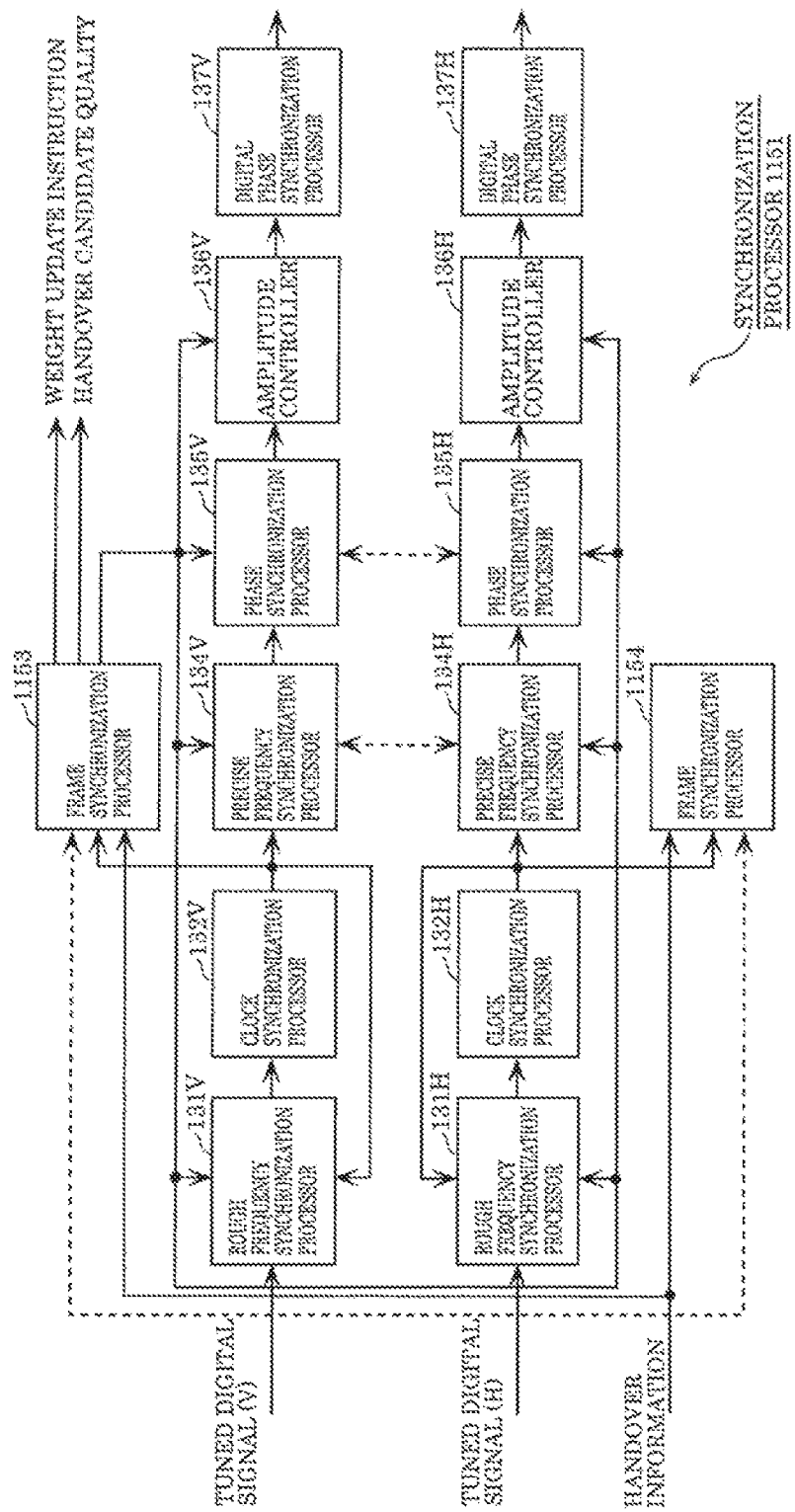
FIG. 48 illustrates an example of a configuration of a synchronization processor in Embodiment 12.

FIG. 48 illustrates an example of a configuration of synchronization processor 1151. Synchronization processor 1151 in FIG. 48 has a configuration in which frame synchronization processors 453 and 454 are replaced with frame synchronization processors 1153 and 1154, respectively, as compared with synchronization processor 451 in Embodiment 5 illustrated in FIG. 23. Handover information is input to frame synchronization processors 1153 and 1154. Frame synchronization processor 1153 for V polarization cooperates with frame synchronization processor 1154 for H polarization in outputting a weight update instruction to polarized signal processor 1152, based on the frame synchronization position of V-polarized and H-polarized signals. When handover is expected to be performed, frame synchronization processors 1153 and 1154 observe whether a correlation value indicating a correlation regarding the SOF detected at the timing different from the frame synchronization timing detected at that time exceeds a threshold, based on input handover information (namely, a handover candidate signal). Frame synchronization processor 1153 for V polarization outputs the result of this observation to handover controller 1180, as the quality of a handover candidate. The quality of a handover candidate indicates whether the correlation value described above exceeds the threshold, and is sufficient if the quality indicates that the value exceeds the threshold.

If the quality of the handover candidate output from synchronization processor 1151 shows sufficient quality, handover controller 1180 outputs a handover execution signal to formally perform handover. If the handover execution signal is obtained, synchronization processor 1151 can immediately perform frame synchronization on a desired signal after handover, by assuming that the different timing mentioned above is a new frame synchronization timing. At this time, based on the frame synchronization timing newly generated, synchronization processor 1151 generates a weight update instruction, and notifies polarized signal processor 452 of the instruction.

As described above, in the present embodiment, when a handover is performed for signals having the same frequency and different polarization, the frame synchronization timing is updated to another detected timing at which a correlation value regarding the SOF exceeds the threshold. Accordingly, the frame synchronization timing can be continuously detected for a desired signal without being interrupted. As a result, when a handover is performed, MMSE processing can be continuously performed on a desired signal, and the SINR especially near a cell edge can be improved.

Here, communication device 1100 in the present embodiment includes a signal processing device for receiving signals transmitted from satellite 3000. This signal processing device includes synchronization processor 1151, polarized signal processor 452, and handover controller 1180, for example. Handover controller 1180 designates a handover candidate signal having the same frequency as and different polarization from those of a transmission signal transmitted from a transmission device such as satellite 3000. When a handover candidate signal is designated, synchronization processor 1151 determines whether the handover candidate signal satisfies a predetermined condition, based on correlation values indicating correlations of known information with information items included in signals received by the vertical polarization antenna and the horizontal polarization antenna. Note that the known information is for identifying polarization of a signal, and is a known bit pattern ($18D2E82_{HEX}$), for example. The predetermined condition is a condition that the correlation value is the threshold or higher, for example. Note that the determination as to whether the quality of a handover candidate described above is sufficient is made based on the determination as to whether the handover candidate signal satisfies the predetermined condition. Handover controller 1180 outputs a handover execution signal if the handover candidate signal is determined to satisfy the predetermined condition. When the handover execution signal is obtained, synchronization processor 1151 and polarized signal processor 452 switch a signal to be processed from the above transmission signal to the handover candidate signal.

Figure 49:
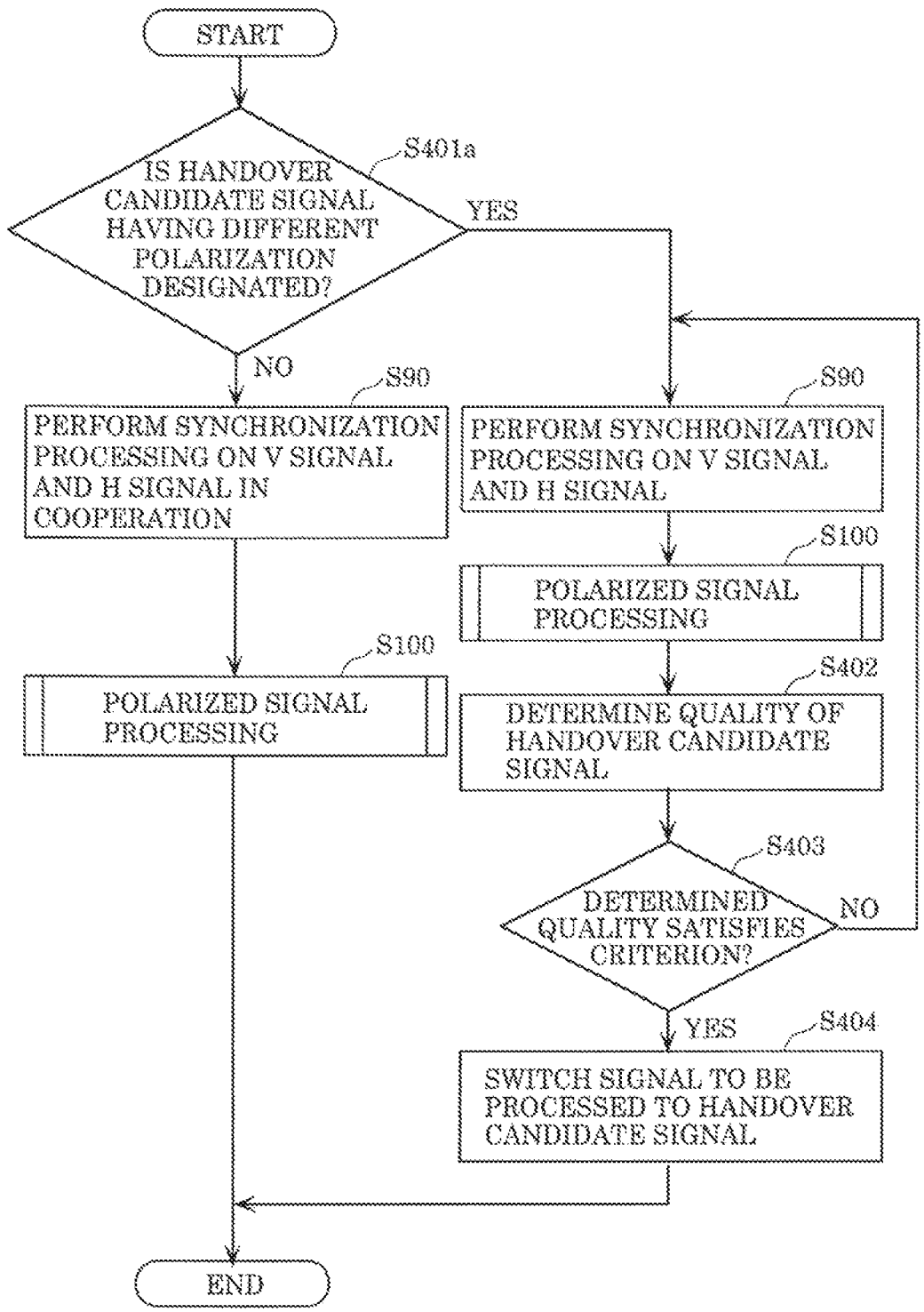
FIG. 49 is a flowchart illustrating an example of processing operation of a signal processing device in Embodiment 12.

FIG. 49 is a flowchart illustrating an example of processing operation of the signal processing device in Embodiment 12.

First, synchronization processor 1151 determines whether a handover candidate signal having different polarization is designated (step S401a). If such a signal is not designated (No in step 401a), synchronization processor 1151 performs synchronization processing on each of a vertical signal and a horizontal signal in cooperation, similarly to the above (step S90). Polarized signal processor 452 further performs polarized signal processing (step S100). On the other hand, also when a handover candidate signal is designated (Yes in step S401a), synchronization processor 1151 performs synchronization processing on each of a vertical signal and a horizontal signal in cooperation (step S90). Then, polarized signal processor 452 performs polarized signal processing (step S100). However, when a handover candidate signal is designated, synchronization processor 1151 further determines the quality of the handover candidate signal, based on correlation values indicating correlations of known information with information items included in signals received by the vertical polarization antenna and the horizontal polarization antenna (step S402). Then, handover controller 1180 determines whether the determined quality satisfies a criterion for handover (step S403). Here, if the quality satisfies the criterion (Yes in step S403), handover controller 1180 causes synchronization processor 1151 and polarized signal processor 452 to switch a signal to be processed from the above transmission signal to the handover candidate signal (step S404).

Accordingly, the signal processing device and the signal processing method in the present embodiment can continuously detect the frame synchronization timing for a desired signal without interruption even when handover is performed. As a result, also when a handover is performed, MMSE processing can be continuously performed on a desired signal, and the SINR especially near a cell edge can be improved.

Embodiment 13

Figure 50:
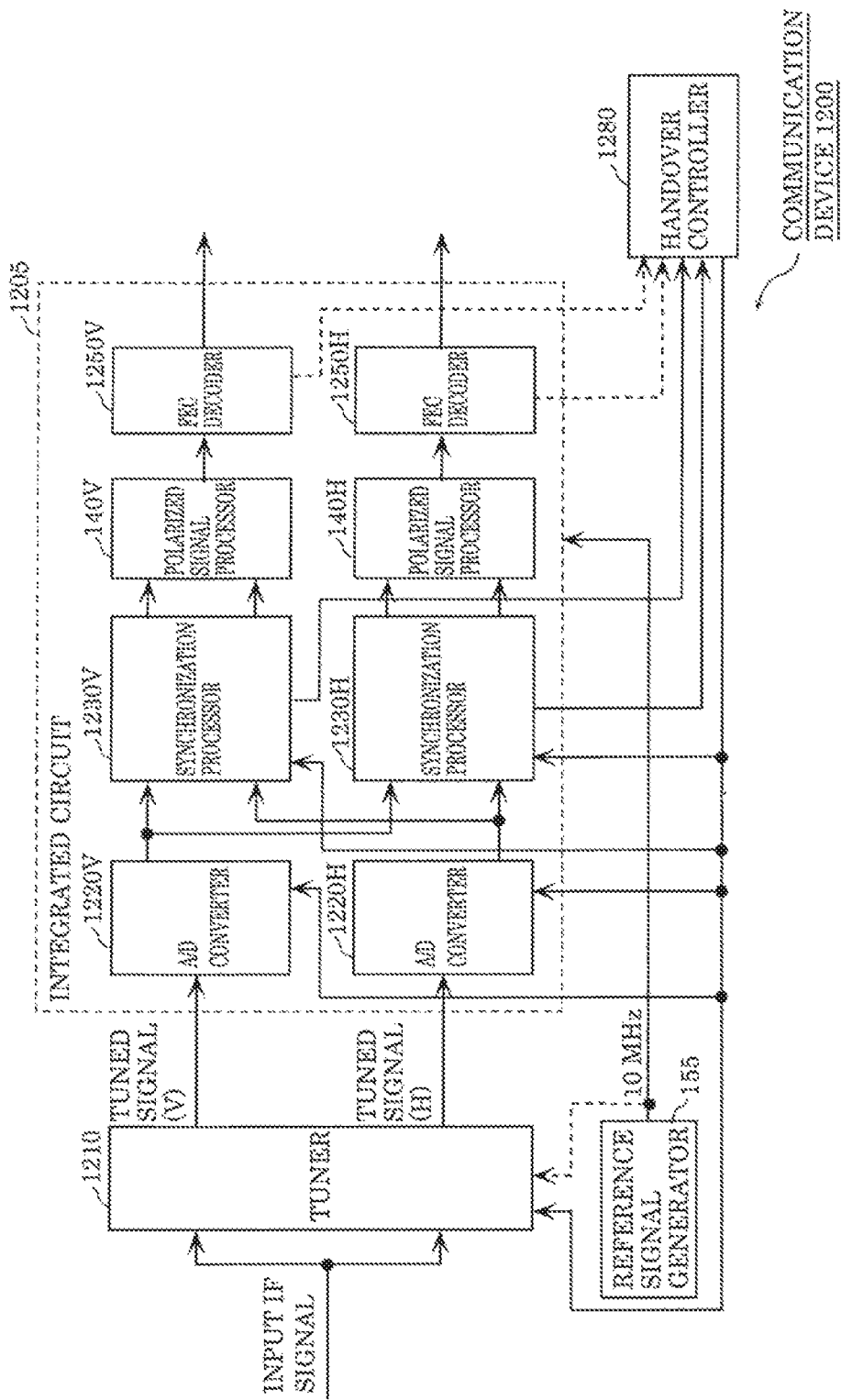
FIG. 50 illustrates an example of a configuration of a communication device in Embodiment 13.

FIG. 50 illustrates an example of a configuration of communication device 1200 in Embodiment 13. Note that out of the elements included in communication device 1200 in the present embodiment, the same element as that of the communication device in any of Embodiments 1 to 12 is given the same sign as that of the element in the embodiment, and a detailed description thereof is omitted.

Communication device 1200 in FIG. 50 includes tuner 1210, reference signal generator 155, A/D converters 1220V and 1220H, synchronization processors 1230V and 1230H, polarized signal processors 140V and 140H, FEC decoders 1250V and 1250H, and handover controller 1280. Note that in the reference signs given to elements, "V" indicates that an element is for V polarization, and "H" indicates that an element is for H polarization in the present disclosure, as described above. Furthermore, in the present disclosure, if "H" or "V" is omitted from a reference sign, the reference sign denotes an element for one of or each of V polarization and H polarization. For example, A/D converter 1220 represents one of or each of A/D converter 1220V and A/D converter 1220H.

Stated differently, in communication device 1200 in FIG. 50, tuner 110, A/D converter 120, synchronization processor 530, and FEC decoder 150 are replaced with tuner 1210, A/D converter 1220, synchronization processor 1230, and FEC decoder 1250, respectively, as compared with communication device 500 in Embodiment 6 illustrated in FIG. 25. Communication device 1200 includes two synchronization processors 1230, two polarized signal processors 140, two FEC decoders 1250, and handover controller 1280. Note that a unit that includes elements except tuner 1210, reference signal generator 155, and handover controller 1280 in communication device 1200 may be configured into integrated circuit 1205. Tuner 1210, A/D converter 1220, synchronization processor 1230, polarized signal processor 140, FEC decoder 1250, and handover controller 1280 in the present embodiment may be applied to Embodiments 1 to 12.

In the present embodiment, handover controller 1280 designates a signal having a frequency different from that of a current signal, or a signal having the same frequency as and different polarization from those of the current signal, as a handover candidate signal.

Figure 51:
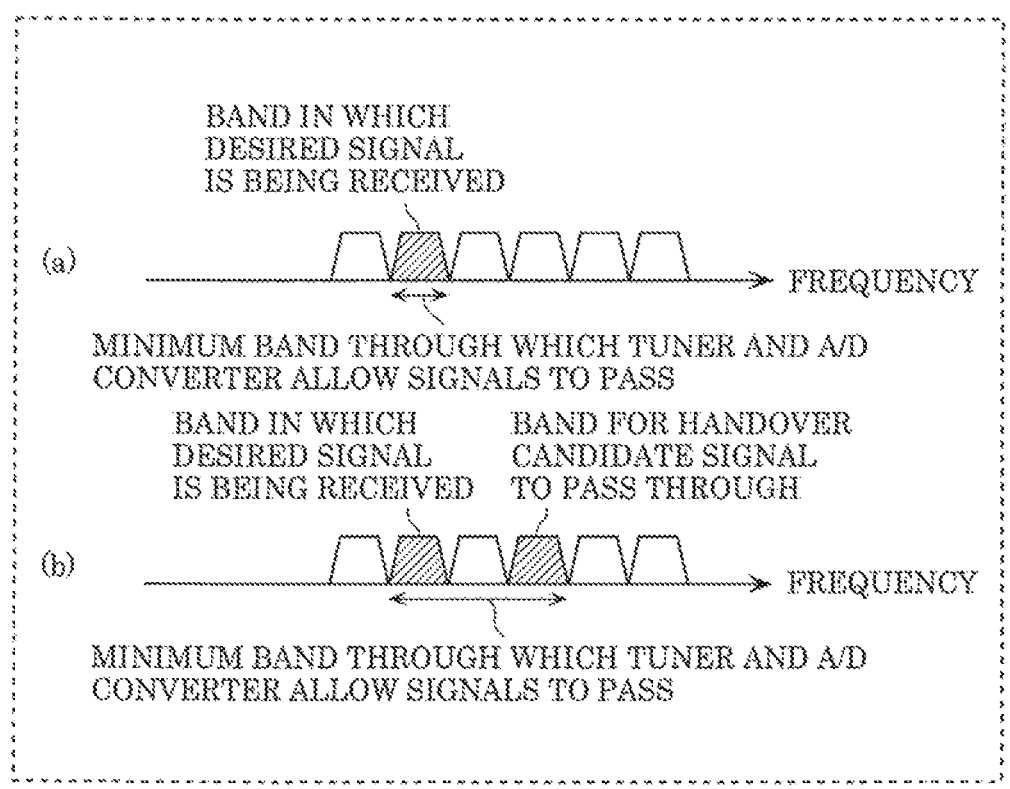
FIG. 51 illustrates an example of a minimum band through which a tuner and an analog-to-digital (A/D) converter in Embodiment 13 allow signals to pass.

FIG. 51 illustrates an example of a minimum band through which tuner 1210 and A/D converter 1220 allow signals to pass. Part (a) of FIG. 51 illustrates the minimum band in Embodiments 1 to 12, and the minimum band is equal to the band of a desired signal being received. Part (b) of FIG. 51 illustrates the minimum band in the present embodiment, and the minimum band includes all the band of the desired signal being received and the band of a handover candidate signal.

In line with the designation from handover controller 1280, tuner 1210 and A/D converter 1220 operate to allow at least signals having the minimum band illustrated in (b) of FIG. 51 to pass through.

Figure 52:
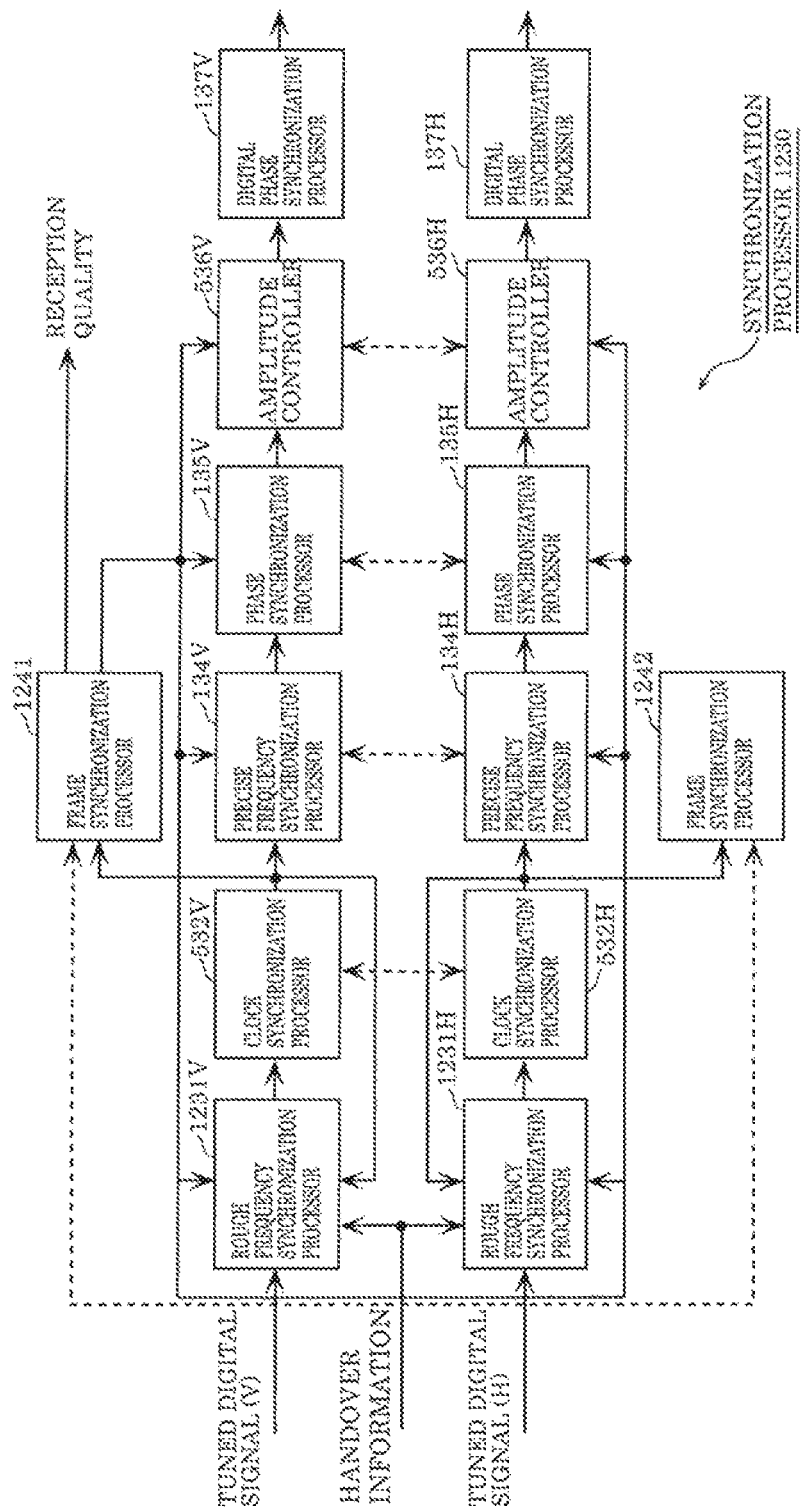
FIG. 52 illustrates an example of a configuration of a synchronization processor in Embodiment 13.

FIG. 52 illustrates an example of a configuration of synchronization processor 1230. Synchronization processor 1230 in FIG. 52 has a configuration in which rough frequency synchronization processors 131 for V polarization and H polarization and frame synchronization processor 541 are replaced with rough frequency synchronization processors 1231 and frame synchronization processor 1241, respectively, as compared with synchronization processor 530 in Embodiment 6 illustrated in FIG. 26. Then, rough frequency synchronization processor 1231 obtains handover information. Thus, handover controller 1280 outputs information indicating the band of a signal being received and the band of a handover candidate signal, as handover information. When the handover information is obtained, rough frequency synchronization processor 1231 performs processing to adjust the frequency of a tuned digital signal to the center frequency of a reception signal to be processed (namely, one of a desired signal being received and the handover candidate signal). Frame synchronization processor 1241 outputs, to handover controller 1280, the result of detecting frame synchronization as reception quality. The reception quality is information that indicates whether a correlation value regarding the SOF has exceeded a threshold, or is the correlation value, for example. Alternatively, FEC decoder 1250 illustrated in FIG. 50 may output, to handover controller 1280, the result of error correction processing (for example, the error rate), as the reception quality.

Handover controller 1280 outputs a handover execution signal, if the reception quality of a handover candidate signal is the threshold or higher, similarly to the above. Alternatively, handover controller 1280 outputs a handover execution signal if the reception quality of a handover candidate signal is the reception quality of a desired signal being received or higher.

In the present embodiment, when handover occurs, tuner 1210, A/D converter 1220, and synchronization processor 1230 are notified of timing at which handover occurs and information on a signal used after the handover as described above. Tuner 1210 and A/D converter 1220 operate to allow at least a signal having a frequency in the minimum band that includes all the band of a desired signal being received and the band of a handover candidate signal to pass through. Accordingly, the influence of interference components in both a desired signal and a handover candidate signal can be continuously reduced by MMSE processing also at the time of handover, and the received SINR can be improved.

Note that when the minimum band illustrated in (b) of FIG. 51 is too broad, so that tuner 1210 and A/D converter 1220 cannot allow a signal having a frequency in the minimum band to pass through, at least a desired signal being received only may be allowed to pass through. In this case, handover controller 1280 may determine whether to perform handover, based on the reception quality of a desired signal being received after MMSE processing. For example, handover controller 1280 outputs a handover execution signal, when the reception quality falls below the threshold.

Here, communication device 1200 in the present embodiment includes a signal processing device for receiving signals transmitted from satellite 3000. The signal processing device includes tuner 1210, synchronization processor 1230, polarized signal processor 140, and handover controller 1280, for example. Tuner 1210 allows signals each having a frequency in the frequency band currently set to pass through, out of signals received by the vertical polarization antenna and the horizontal polarization antenna. Synchronization processor 1230 performs synchronization processing on each of the signals that have passed through tuner 1210, out of a vertical signal and a horizontal signal. Handover controller 1280 designates a handover candidate signal having a frequency and polarization at least one of which is different from those of a transmission signal. Here, when a handover candidate signal is designated, tuner 1210 increases the above frequency band to allow the handover candidate signal to pass through. Furthermore, synchronization processor 1230 determines whether the handover candidate signal satisfies the predetermined condition, based on a correlation value indicating a correlation of information included in the handover candidate signal that has passed through tuner 1210 with known information. Note that the known information is for identifying the polarization of a signal, and is a known bit pattern (18D2E82$_{HEX}$), for example. The predetermined condition is a condition that the correlation value is the threshold or higher, for example. Note that the above determination as to whether the reception quality of the handover candidate signal is sufficient is made by determining whether the handover candidate signal satisfies the predetermined condition. Next, handover controller 1280 outputs a handover execution signal, when the handover candidate signal satisfies the predetermined condition. Synchronization processor 1230 and polarized signal processor 140 switch a signal to be processed from the above transmission signal to a handover candidate signal, when the handover execution signal is obtained.

Figure 53:
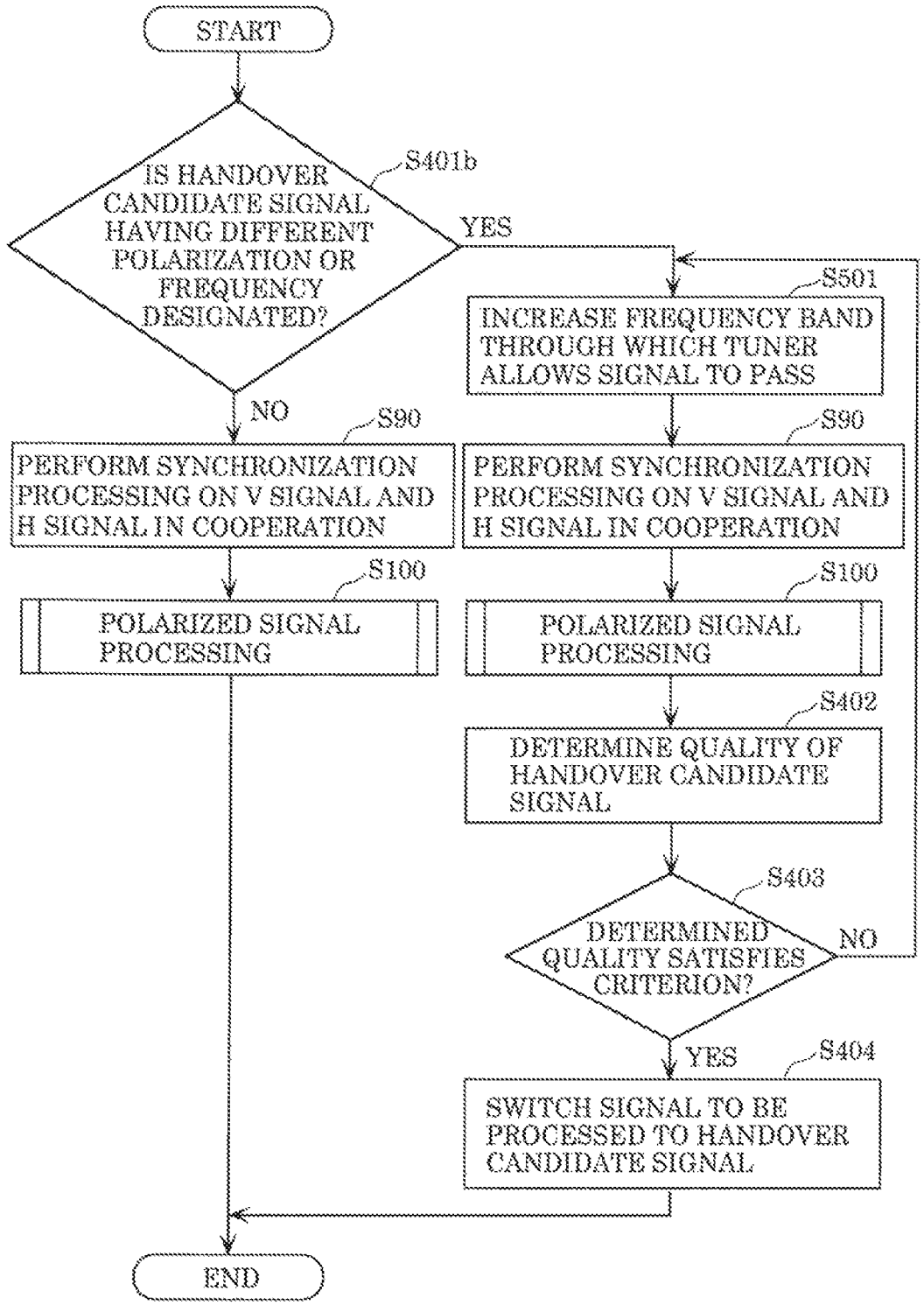
FIG. 53 is a flowchart illustrating an example of processing operation of a signal processing device in Embodiment 13.

FIG. 53 is a flowchart illustrating an example of processing operation of the signal processing device in Embodiment 13.

First, synchronization processor 1230 determines whether a handover candidate signal having a frequency and polarization at least one of which is different from those of a transmission signal is designated (step S401b). If such a signal is not designated (No in step S401b), synchronization processor 1230 performs synchronization processing on each of a vertical signal and a horizontal signal in cooperation, similarly to the above (step S90). Furthermore, polarized signal processor 140 performs polarized signal processing (step S100). On the other hand, if the handover candidate signal is designated (Yes in step S401b), tuner 1210 increases a frequency band to allow the handover candidate signal to pass through (step S501). Synchronization processor 1230 performs synchronization processing on each of a vertical signal and a horizontal signal in cooperation (step S90), and polarized signal processor 140 performs polarized signal processing (step S100). When the handover candidate signal is designated, synchronization processor 1230 determines the quality of a handover candidate signal, based on a correlation value indicating a correlation of information included in the handover candidate signal that has passed through tuner 1210 with known information (step S402).

Then, handover controller 1280 determines whether the determined quality satisfies a criterion for handover (step S403). Here, if the quality satisfies the criterion (Yes in step S403), handover controller 1280 causes synchronization processor 1230 and polarized signal processor 140 to switch a signal to be processed from the above transmission signal to the handover candidate signal (step S404).

Accordingly, no matter what signal a handover candidate signal is, the signal processing device and the signal processing method in the present embodiment can continuously reduce the influence of interference components in both a desired signal and a handover candidate signal when handover is performed. As a result, the received SINR can be improved.

Embodiment 14

Figure 54:
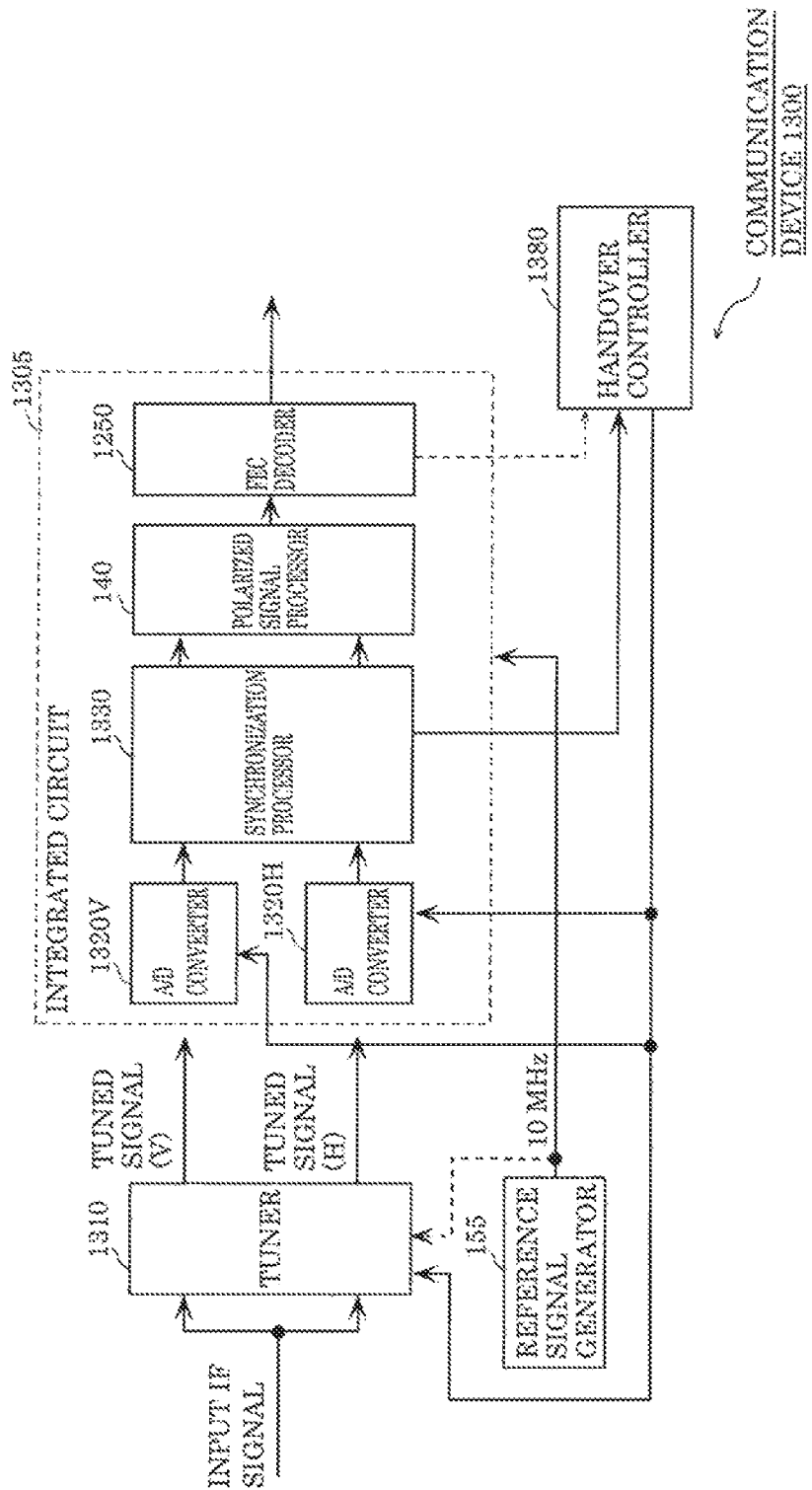
FIG. 54 illustrates an example of a configuration of a communication device in Embodiment 14.

FIG. 54 illustrates an example of a configuration of communication device 1300 in Embodiment 14. Note that out of the elements included in communication device 1300 in the present embodiment, the same element as that of the communication device in any of Embodiments 1 to 13 is given the same sign as that of the element in the embodiment, and a detailed description thereof is omitted.

Communication device 1300 in FIG. 54 includes tuner 1310, reference signal generator 155, A/D converters 1320V and 1320H, synchronization processor 1330, polarized signal processor 140, FEC decoder 1250, and handover controller 1380. Note that in the present disclosure, in the reference signs given to elements, "V" indicates that an element is for V polarization, and "H" indicates that an element is for H polarization, as described above. Furthermore, in the present disclosure, if "H" or "V" is omitted from a reference sign, the reference sign denotes an element for one of or each of V polarization and H polarization. For example, A/D converter 1320 represents one of or each of AD converter 1320V and A/D converters 1320H.

Stated differently, in communication device 1300 in FIG. 54, tuner 110, A/D converter 120, synchronization processor 530, and FEC decoder 150 are replaced with tuner 1310, A/D converter 1320, synchronization processor 1330, and FEC decoder 1250, respectively, as compared with communication device 500 in Embodiment 6 illustrated in FIG. 25. Communication device 1300 includes handover controller 1380. Note that a unit that includes elements except tuner 1310, reference signal generator 155, and handover controller 1380 in communication device 1300 may be configured into integrated circuit 1305. Note that tuner 1310, A/D converter 1320, synchronization processor 1330, polarized signal processor 140, FEC decoder 1250, and handover controller 1380 in the present embodiment may be applied to Embodiments 1 to 13.

In the present embodiment, similarly to Embodiment 13, handover controller 1380 designates a signal having a frequency different from that of a current signal or a signal having the same frequency as and different polarization from those of the current signal, as a handover candidate signal.

Figure 55:
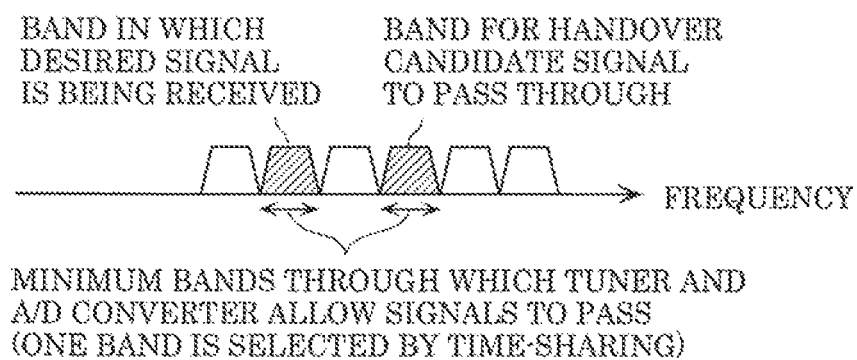
FIG. 55 illustrates examples of minimum bands through which a tuner and an A/D converter in Embodiment 14 allow signals to pass.

FIG. 55 illustrates examples of minimum bands through which tuner 1310 and A/D converter 1320 in the present embodiment allow signals to pass. The minimum band is equal to the band of a desired signal being received or the band of a handover candidate signal, and only one of the bands is selected by time-sharing.

That is, in line with the designation from handover controller 1380, tuner 1310 and A/D converter 1320 switch between the minimum bands illustrated in FIG. 55 by time-sharing, and operate to allow a signal having a frequency in the switched minimum band to pass through.

Figure 56:
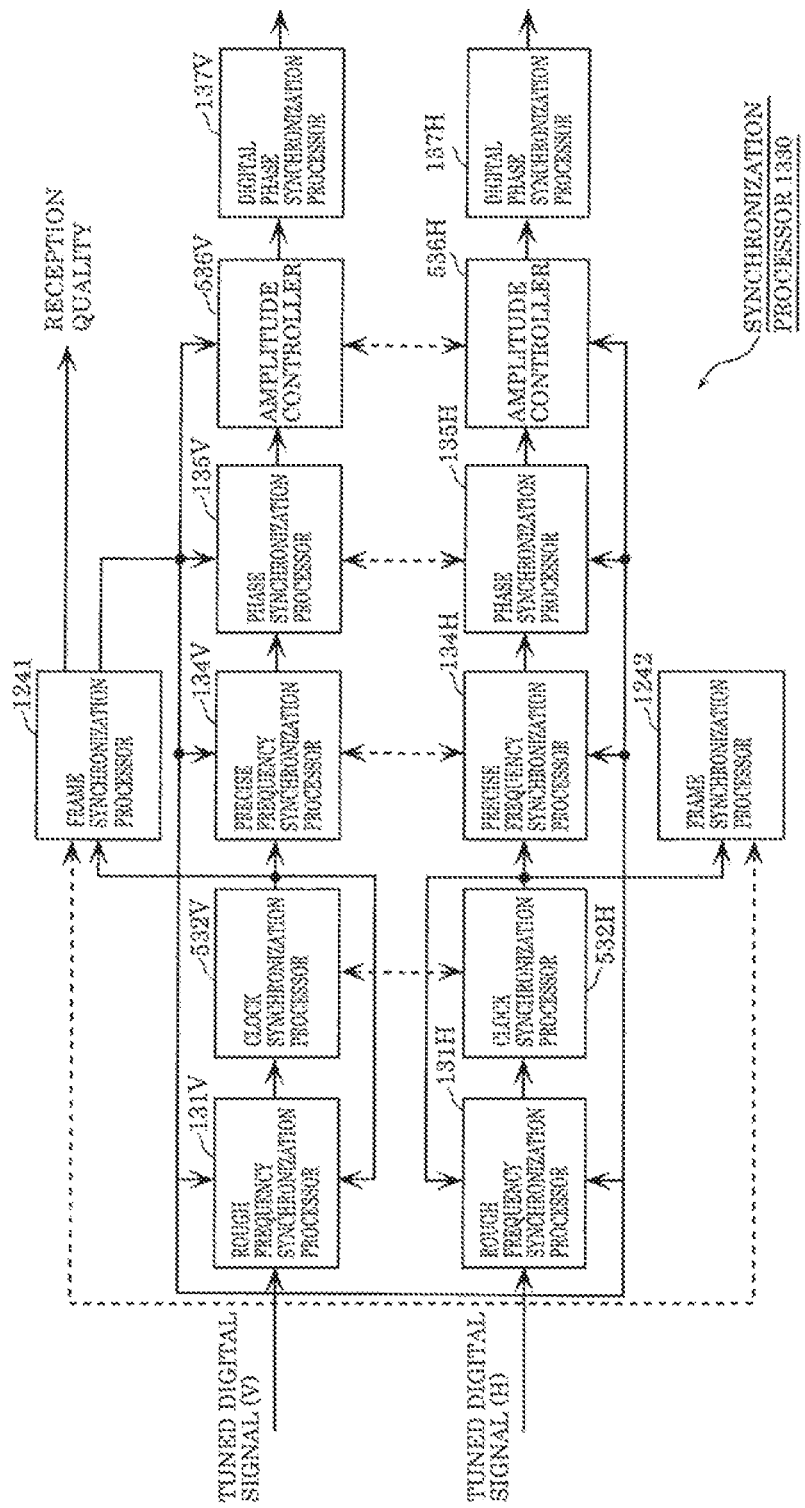
FIG. 56 illustrates an example of a configuration of a synchronization processor in Embodiment 14.

FIG. 56 illustrates an example of a configuration of synchronization processor 1330. Synchronization processor 1330 in FIG. 56 has a configuration in which frame synchronization processor 541 for V polarization and frame synchronization processor 542 for H polarization are replaced with frame synchronization processors 1241 and 1242, respectively, as compared with synchronization processor 530 in Embodiment 6 illustrated in FIG. 26. Frame synchronization processor 1241 outputs, to handover controller 1380, the result of detecting frame synchronization for a reception signal having a frequency in the minimum band selected by time-sharing (namely, one of a desired signal being received and a handover candidate signal), as reception quality. The reception quality is information that indicates whether a correlation value regarding the SOP has exceeded a threshold or is the correlation value, for example. Alternatively, FEC decoder 1250 illustrated in FIG. 54 may output, to handover controller 1380, the result of error correction processing (for example, the rate of an error), as the reception quality.

Handover controller 1380 outputs a handover execution signal, if the reception quality of a handover candidate signal is a threshold or higher, similarly to the above. Alternatively, handover controller 1380 outputs a handover execution signal if the reception quality of the handover candidate signal is the reception quality of the desired signal being received or higher.

As described above, in the present embodiment, when handover occurs, tuner 1310 and A/D converter 1320 are notified of timing at which handover occurs and information on a signal used after the handover. Then, each of the elements disposed downstream of tuner 1310 processes one of the desired signal being received and the handover candidate signal by time-sharing. Accordingly, the influence of interference components in one of the desired signal and the handover candidate signal is reduced by MMSE processing by using time-sharing also at the time of handover, so that the received SINR can be improved.

Here, communication device 1300 in the present embodiment includes a signal processing device for receiving signals transmitted from satellite 3000. This signal processing device includes tuner 1310, synchronization processor 1330, polarized signal processor 140, and handover controller 1380, for example. Tuner 1310 allows signals each having a frequency in a first frequency band currently set to pass through, out of signals received by the vertical polarization antenna and the horizontal polarization antenna. Synchronization processor 1330 performs synchronization processing on each of the signals that have passed through tuner 1310, out of the vertical signal and the horizontal signal. Handover controller 1380 designates a handover candidate signal having a frequency and polarization at least one of which is different from those of a transmission signal. Here, when a handover candidate signal is designated, tuner 1310 switches a frequency band for signals to pass through between the first frequency band and a second frequency band for a handover candidate signal to pass through, by time-sharing. Furthermore, synchronization processor 1330 determines whether the handover candidate signal satisfies a predetermined condition, based on a correlation value indicating a correlation of information included in the handover candidate signal that has passed through tuner 1310 with known information. Note that the known information is for identifying the polarization of a signal, and is a known bit pattern ($18D2E82_{HEX}$), for example. The predetermined condition is a condition that the correlation value is equal to or greater than the threshold, for example, Note that the above determination as to whether the reception quality of the handover candidate signal is sufficient is made by determining whether the handover candidate signal satisfies the predetermined condition. Next, handover controller 1380 outputs a handover execution signal when the handover candidate signal satisfies the predetermined condition. Synchronization processor 1330 and polarized signal processor 140 switch a signal to be processed from the above transmission signal to the handover candidate signal, when the handover execution signal is obtained.

Figure 57:
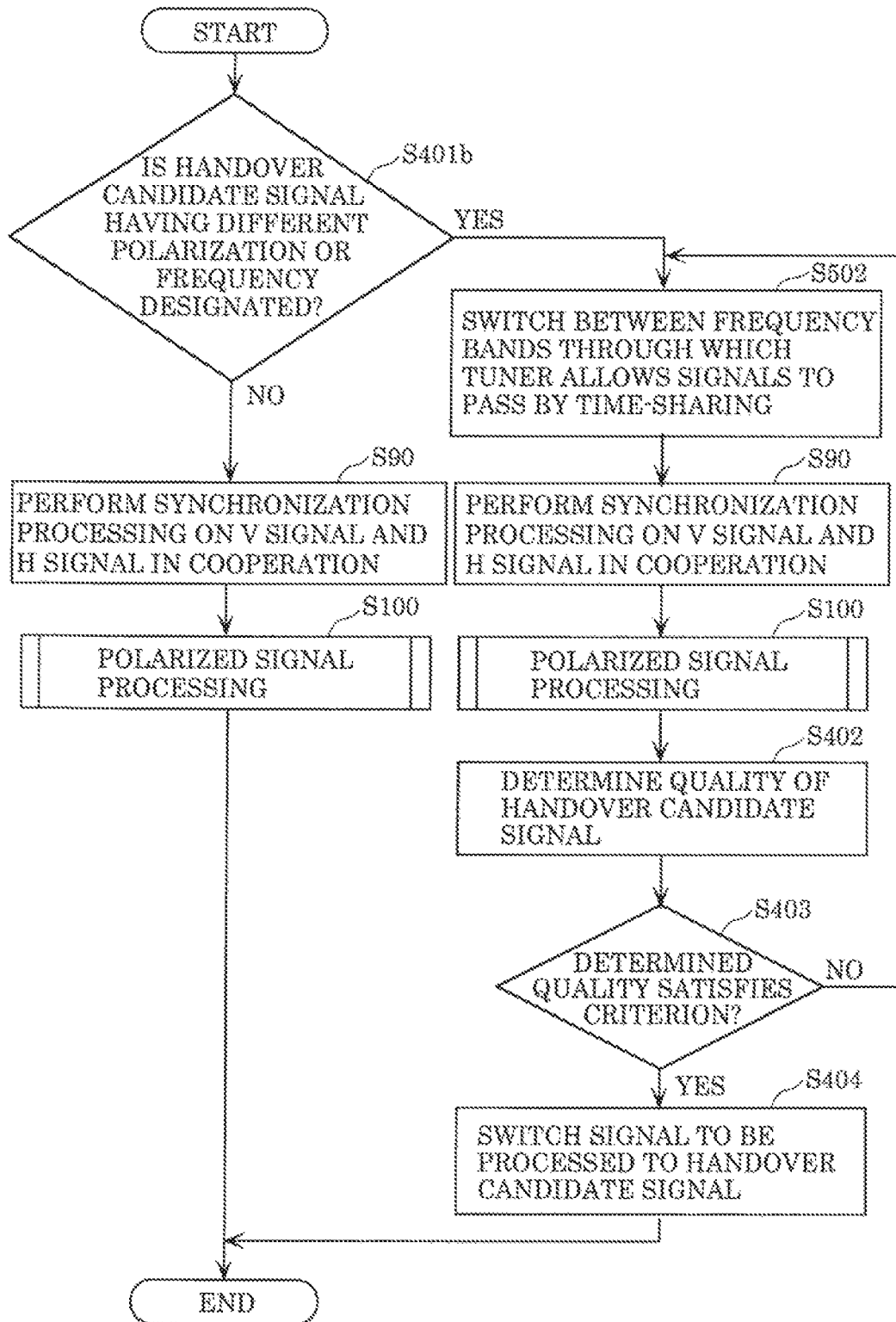
FIG. 57 is a flowchart illustrating an example of processing operation of a signal processing device in Embodiment 14.

FIG. 57 is a flowchart illustrating an example of processing operation of the signal processing device in Embodiment 14.

First, synchronization processor 1330 determines whether a handover candidate signal having a frequency and polarization at least one of which is different from those of a transmission signal is designated (step S401b). If such a signal is not designated (No in step S401b), synchronization processor 1330 performs synchronization processing on each of a vertical signal and a horizontal signal in cooperation, similarly to the above (step S90). Furthermore, polarized signal processor 140 performs polarized signal processing (step S100). On the other hand, if the handover candidate signal is designated (Yes in step S401b), tuner 1310 switches a frequency band for a signal to pass through between the above-described first frequency band and the above-described second frequency band for the handover candidate signal to pass through by time-sharing (step S502). Then, synchronization processor 1330 performs synchronization processing on each of a vertical signal and a horizontal signal in cooperation (step S90), and polarized signal processor 140 performs polarized signal processing (step S100). When a handover candidate signal is designated, synchronization processor 1330 determines the quality of the handover candidate signal, based on a correlation value indicating a correlation of information included in the handover candidate signal that has passed through tuner 1310 with known information (step S402).

Then, handover controller 1380 determines whether the determined quality satisfies a criterion for handover (step S403). Here, if the quality satisfies the criterion (Yes in step S403), handover controller 1380 causes synchronization processor 1330 and polarized signal processor 140 to switch a signal to be processed from the above transmission signal to a handover candidate signal (step S404).

Accordingly, no matter what signal the handover candidate signal is, the signal processing device and the signal processing method in the present embodiment can reduce the influence of an interference component in one of a desired signal and a handover candidate signal by time-sharing at the time of handover. As a result, the received SINR can be improved.

Embodiment 15

Figure 58:
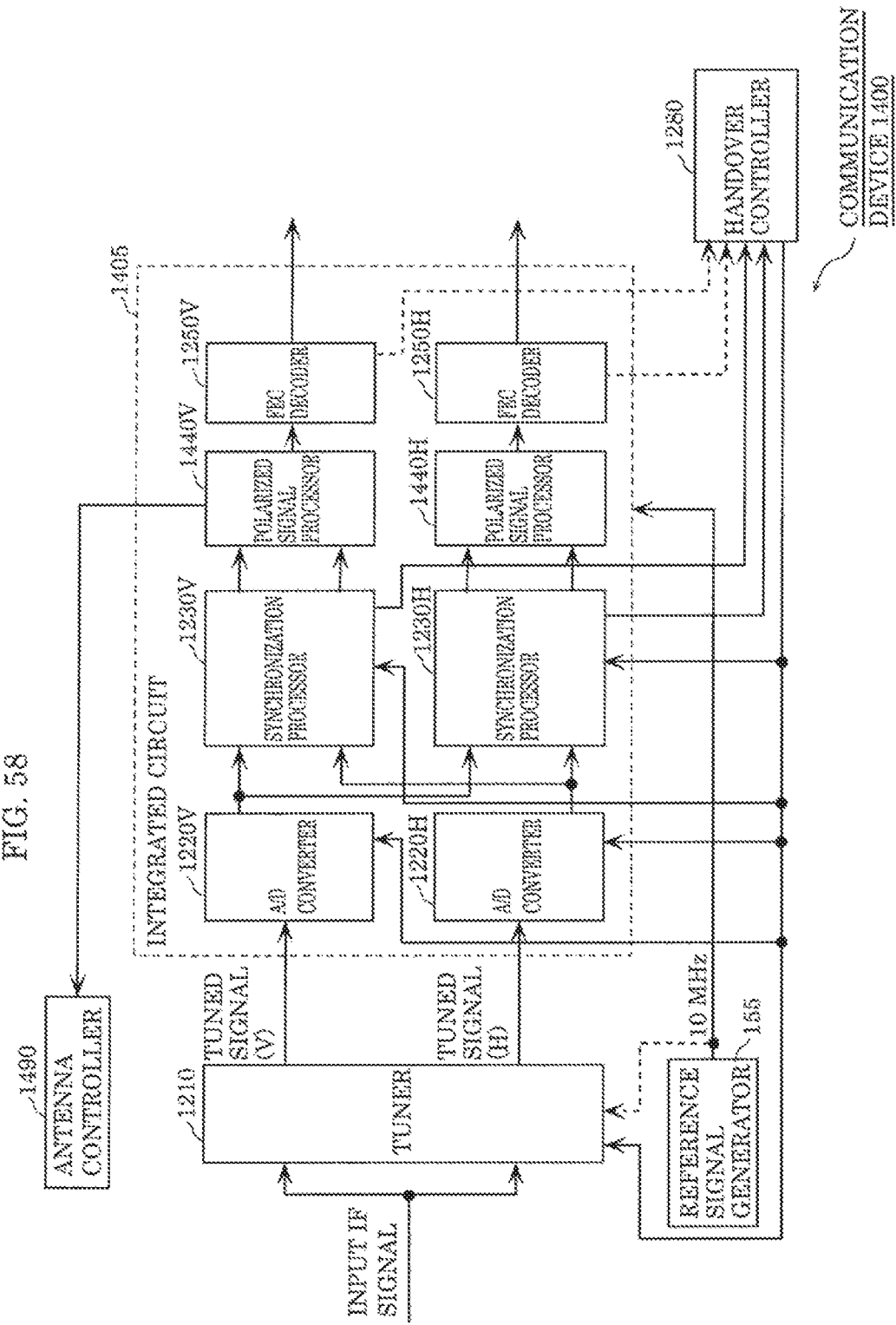
FIG. 58 illustrates an example of a configuration of a communication device in Embodiment 15.

FIG. 58 illustrates an example of a configuration of communication device 1400 in Embodiment 15. Note that out of the elements included in communication device 1400 in the present embodiment, the same element as that of the communication device in any of Embodiments 1 to 14 is given the same sign as that of the element in the embodiment, and a detailed description thereof is omitted.

Communication device 1400 in FIG. 58 has a configuration in which polarized signal processors 140V and 140H are replaced with polarized signal processors 1440V and 1440H, and antenna controller 1490 is added, as compared with communication device 1200 in Embodiment 13 illustrated in FIG. 50. Note that polarized signal processor 1440 may represent one of or each of polarized signal processors 1440V and 1440H. A unit that includes elements except tuner 1210, reference signal generator 155, handover controller 1280, and antenna controller 1490 in communication device 1400 may be configured into integrated circuit 1405. Polarized signal processor 1440 and antenna controller 1490 in the present embodiment may be applied to Embodiments 1 to 14.

Figure 59:
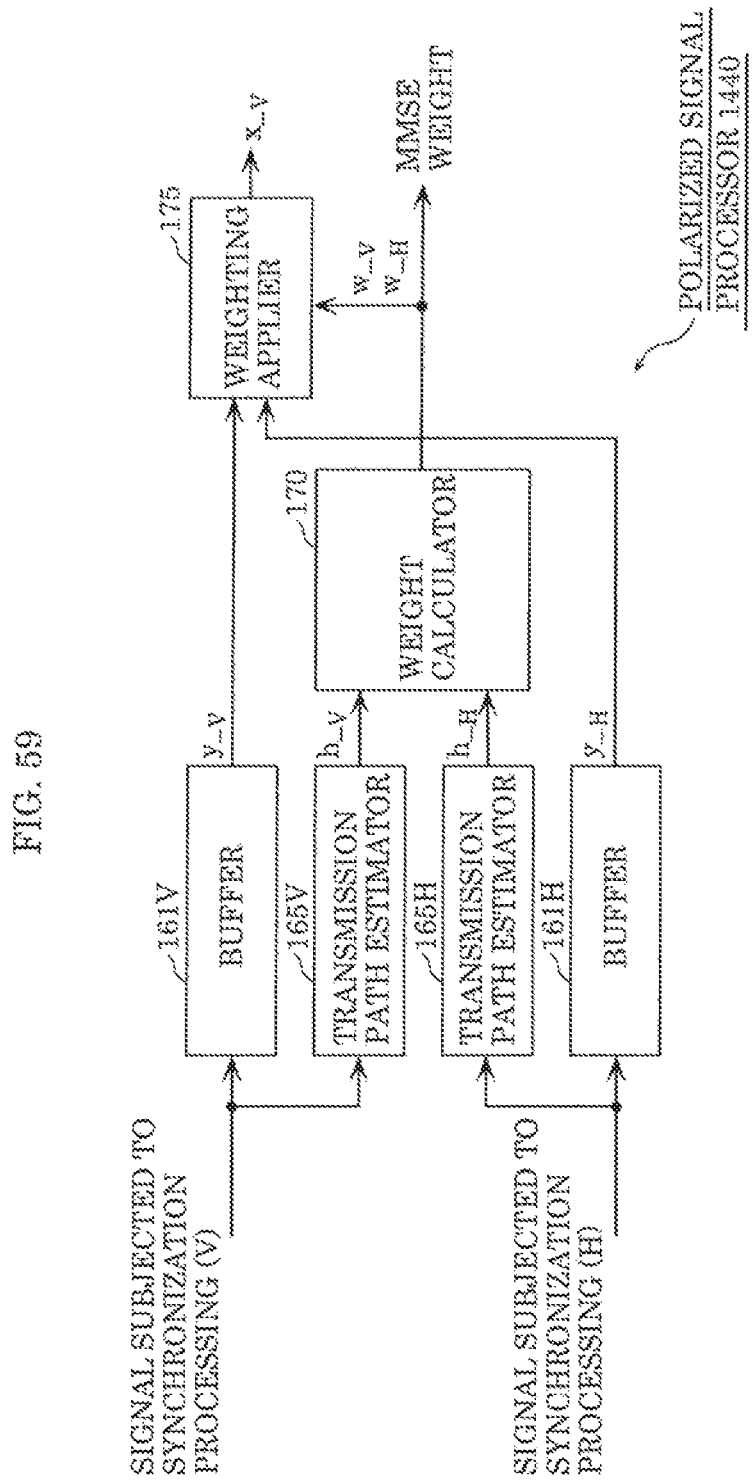
FIG. 59 illustrates an example of a configuration of a polarized signal processor in Embodiment 15.

FIG. 59 illustrates an example of a configuration of polarized signal processor 1440. Unlike polarized signal processor 140 in Embodiment 1 illustrated in FIG. 7, polarized signal processor 1440 outputs an MMSE weight to antenna controller 1490. Thus, weight calculator 170 calculates an MMSE weight and outputs the calculated weight to weighting applier 175 and antenna controller 1490.

Antenna controller 1490 illustrated in FIG. 58 changes the orientation of the polarization plane to another orientation, while observing the MMSE weight output from polarized signal processor 1440. For example, antenna controller 1490 starts processing of changing the orientation of the polarization plane to the predetermined orientation, after the amount of change in the MMSE weight falls down to or below a constant value. Here, antenna controller 1490 continues changing the orientation of the polarization plane when the amount of polarization rotation calculated from the MMSE weight decreases. On the other hand, antenna controller 1490 changes the orientation of the polarization plane to an orientation different from the above predetermined orientation when the amount of polarization rotation calculated from the MMSE weight increases.

In the present embodiment, through continuing such processing, the influence of interference components can be reduced by both antenna controller 1490 and polarized signal processor 1440, and the received SINR can be improved.

Here, communication device 1400 in the present embodiment includes a signal processing device for receiving signals transmitted from satellite 3000. The signal processing device includes tuner 1210, synchronization processor 1230, polarized signal processor 1440, handover controller 1280, and antenna controller 1490, for example. Antenna controller 1490 changes the orientations of the polarization planes of signals received by the vertical polarization antenna and the horizontal polarization antenna. Thus, antenna controller 1490 changes the orientations of the above polarization planes, based on a first weight and a second weight that are calculated by weight calculator 170 of polarized signal processor 1440.

FIG. 60 is a flowchart illustrating an example of processing operation of the signal processing device in Embodiment 15.

The flowchart illustrated in FIG. 60 includes the steps included in the flowchart illustrated in FIG. 53, and further includes step S601. In step S601, antenna controller 1490 changes the orientations of the above polarization planes, based on the first weight and the second weight calculated by weight calculator 170 of polarized signal processor 1440.

Accordingly, the signal processing device and the signal processing method in the present embodiment can further reduce the influence of interference components, and the received SINR can be further improved.

Supplement

The present disclosure is not limited to the disclosure explained in Embodiments 1 to 15 above, and can be implemented in any embodiment for achieving an object of the present disclosure and objects related thereto and accompanied therewith. Examples are as follows.

(1) In Embodiments 1 to 15, when it is not possible to determine a satellite signal in accordance with the DVB-S2X standard is received by which of the reception polarization antennas, it may be determined from the positional relationship between the satellite and that body of the airplane.

(2) In Embodiments 1 to 15, transmission power of signals may be decreased by expected improvement in the received SNR or the received SNR, and the signals may be transmitted. Examples of the power decreasing method include controlling the amount of power amplification in transmission RF processing.

(3) In Embodiments 1 to 15, the communication device mounted in an airplane has been described, yet the present disclosure is not limited thereto, and the present disclosure may be applied to communication devices mounted in mobile bodies such as a vessel and a car that travel widely on the earth.

(4) In Embodiments 1 to 15, the polarization plane of an antenna of an airplane may be changed mechanically or electronically, based on the calculated transmission path estimated values or the calculated MMSE weight.

(5) In Embodiments 1 to 15, downlink satellite signals are in accordance with the DVB-S2X standard, yet the present disclosure is not limited thereto, and signals may be in accordance with a standard that supports, for example, Non-Terrestrial Networks that the 3rd Generation Partnership Project (3GPP) is currently studying.

(6) In Embodiment 3, uplink satellite signals are in accordance with the DVB-RCS2 standard, but the present disclosure is not limited thereto, and signals may be in accordance with a standard that supports, for example, Non-Terrestrial Networks that the 3rd Generation Partnership Project (3GPP) is currently studying.

(7) In Embodiments 1 to 15, orthogonal polarizations are V polarization and H polarization, but the present disclosure is not limited thereto, and right-hand polarization and left-hand polarization may be used. Also in such a case, the polarization plane needs to be considered in an environment with a reflective wave or an environment in which there is a difference in received power between polarizations, so that Embodiments 1 to 15 are effective.

(8) In Embodiments 1 to 15, communication between a satellite and a single aircraft has been described as an example, yet the present disclosure is not limited thereto, and when a satellite and a plurality of aircrafts communicate, communication devices in the aircrafts can utilize Embodiments 1 to 15.

(9) In Embodiments 1 to 15, weighting applied by the polarized signal processor is not always allowed, and may be prevented depending on a situation. Examples of the situation in which the application of weighting is prevented include the case where the absolute value of a transmission path estimated value is smaller than a threshold.

(10) In Embodiments 1 to 15, a configuration in which the polarized signal processor is disposed downstream of the synchronization processor is adopted, but the present disclosure is not limited thereto, and the polarized signal processor may be disposed downstream of the precise frequency synchronization processor in the synchronization processor. In this case, the polarized signal processor may be provided with the function of the phase synchronization processor.

(11) In Embodiments 1 to 15, MMSE weighting processing is performed, but the present disclosure is not limited thereto, and for example, zero forcing (ZF) may be used.

(12) In Embodiments 1 to 15, a transmission path estimated value is calculated only within one frame but the present disclosure is not limited thereto, and a transmission path estimated value may be calculated over a plurality of frames using an infinite impulse response (IIR) filter, for example. In this case, time delay occurs, but there is an advantageous effect that the accuracy of the transmission path estimated value increases.

(13) Some of Embodiments 1 to 15 and the variations thereof may be combined with one another.

(14) In the communication devices in Embodiments 1 to 15 above, a unit that supports downlink may be defined as a receiving device, and a unit that supports uplink may be defined as a transmission device.

(15) Embodiments 1 to 15 above may relate to implementation using hardware and software. The above embodiments may be implemented or performed using a computing device (processor). A computing device/a processor may be, for example, a main processor or a general purpose processor, a digital signal processor (DSP), an application specific integrated circuit (ASIC), a field programmable gate array (FPA), or another programmable logic device, for instance. The above embodiments may be performed or implemented by a combination of such devices.

(16) Embodiments 1 to 15 may be implemented by the structure of a software module caused to run by a processor or directly by hardware. A software module and hardware implementation may also be combined. A software module may be stored in various kinds of computer-readable storage media such as, for example, random access memory (RAM), erasable programmable read only memory (EPROM), electrically erasable programmable read-only memory (EEPROM), flash memory a register, a hard disk, compact disc read-only memory (CD-ROM), and a digital versatile disc (DVD).

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The signal processing device according to the present disclosure is applicable to a communication device, a receiving device, and a transmission device.

What is claimed is:
1. A signal processing device comprising:
a first transmission path estimator that estimates a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from a vertical polarization antenna and a horizontal polarization antenna receiving the transmission signal;
a second transmission path estimator that estimates a second transmission path characteristic of the transmission signal using the horizontal signal;
a weight calculator that calculates a first weight for the vertical signal and a second weight for the horizontal signal, using the first transmission path characteristic and the second transmission path characteristic;
a weighting applier that applies weighted summation to the vertical signal and the horizontal signal using the first weight and the second weight; and
a synchronization processor that performs synchronization processing on each of the vertical signal and the horizontal signal,
wherein the first transmission path characteristic is a characteristic of a transmission path through which the transmission signal is transmitted from the transmission device to the vertical polarization antenna,
the second transmission path characteristic is a characteristic of a transmission path through which the transmission signal is transmitted from the transmission device to the horizontal polarization antenna,
the first transmission path characteristic indicates a proportion of a signal included in the vertical signal within the transmission signal,
the second transmission path characteristic indicates a proportion of a signal included in the horizontal signal within the transmission signal,
the first transmission path estimator and the second transmission path estimator estimate the first transmission path characteristic and the second transmission path characteristic, using the vertical signal and the horizontal signal on each of which the synchronization processing has been performed,
the weighting applier applies the weighted summation to the vertical signal and the horizontal signal on each of which the synchronization processing has been performed,
the synchronization processor establishes frame synchronization by detecting that a correlation value of a predefined bit pattern with at least one of the vertical signal or the horizontal signal exceeds a threshold,
the synchronization processor includes:
a first synchronization processor that performs the synchronization processing on the vertical signal; and a second synchronization processor that performs the synchronization processing on the horizontal signal, and the first synchronization processor and the second synchronization processor cooperate with each other in bringing each of a difference in frequency and a difference in phase between the vertical signal and the horizontal signal close to 0.

2. The signal processing device according to claim 1, wherein the first synchronization processor and the second synchronization processor further cooperate with each other in decreasing an error in clock timing between the vertical signal and the horizontal signal, and making a sum of power of the vertical signal and power of the horizontal signal constant.

3. The signal processing device according to claim 1, further comprising:

a polarization offsetter that provides a polarization offset to the vertical signal and a polarization offset to the horizontal signal, wherein the synchronization processor performs the synchronization processing on each of the vertical signal provided with the polarization offset and the horizontal signal provided with the polarization offset, and the polarization offsetter provides a polarization offset to a vertical signal and a polarization offset to a horizontal signal on each of which the synchronization processing is to be performed next, based on at least one of (i) results of the synchronization processing by the synchronization processor or (ii) information included in a signal resulting from the weighted summation.

4. The signal processing device according to claim 1, further comprising:

a handover controller that designates a handover candidate signal having a frequency different from a frequency of the transmission signal, wherein when the handover candidate signal is designated,
(i) the weighting applier does not apply the weighted summation, and
(ii) the synchronization processor determines whether a reception signal satisfies a predetermined condition, the reception signal resulting from being received by an antenna for polarization different from polarization of the transmission signal, out of the vertical polarization antenna and the horizontal polarization antenna, when the synchronization processor determines that the reception signal satisfies the predetermined condition, the handover controller outputs a handover execution signal, and when the handover execution signal is obtained, the synchronization processor, the first transmission path estimator, the second transmission path estimator, the weight calculator, and the weighting applier switch a signal to be processed from the transmission signal to the handover candidate signal.

5. The signal processing device according to claim 1, further comprising:

a handover controller that designates a handover candidate signal having a frequency same as a frequency of the transmission signal and polarization different from polarization of the transmission signal, wherein when the handover candidate signal is designated, the synchronization processor determines whether the handover candidate signal satisfies a predetermined condition, based on correlation values indicating correlations of predefined information with information items included in signals received by the vertical polarization antenna and the horizontal polarization antenna, when the synchronization processor determines that the handover candidate signal satisfies the predetermined condition, the handover controller outputs a handover execution signal, and when the handover execution signal is obtained, the synchronization processor, the first transmission path estimator, the second transmission path estimator, the weight calculator, and the weighting applier switch a signal to be processed from the transmission signal to the handover candidate signal.

6. The signal processing device according to claim 1, further comprising:

a tuner that allows signals each having a frequency in a frequency band currently set to pass through, out of signals received by the vertical polarization antenna and the horizontal polarization antenna; and a handover controller that designates a handover candidate signal having a frequency and polarization at least one of which is different from a frequency and polarization of the transmission signal, wherein the synchronization processor performs the synchronization processing on each of the signals that have passed through the tuner, out of the vertical signal and the horizontal signal, when the handover candidate signal is designated,
(i) the tuner increases the frequency band to allow the handover candidate signal to pass through, and
(ii) the synchronization processor determines whether the handover candidate signal satisfies a predetermined condition, based on a correlation value indicating a correlation of predefined information with information included in the handover candidate signal that has passed through the tuner, when the synchronization processor determines that the handover candidate signal satisfies the predetermined condition, the handover controller outputs a handover execution signal, and when the handover execution signal is obtained, the synchronization processor, the first transmission path estimator, the second transmission path estimator, the weight calculator, and the weighting applier switch a signal to be processed from the transmission signal to the handover candidate signal.

7. The signal processing device according to claim 1, further comprising:

a tuner that allows signals each having a frequency in a first frequency band currently set to pass through, out of signals received by the vertical polarization antenna and the horizontal polarization antenna; and a handover controller that designates a handover candidate signal having a frequency and polarization at least one of which is different from a frequency and polarization of the transmission signal, wherein the synchronization processor performs the synchronization processing on each of the signals that have passed through the tuner, out of the vertical signal and the horizontal signal, when the handover candidate signal is designated,
(i) the tuner switches, by time-sharing, a frequency band for a signal to pass through between the first frequency band and a second frequency band for the handover candidate signal to pass through, and (ii) the synchronization processor determines whether the handover candidate signal satisfies a predetermined condition, based on a correlation value indicating a correlation of predefined information with information included in the handover candidate signal that has passed through the tuner, when the synchronization processor determines that the handover candidate signal satisfies the predetermined condition, the handover controller outputs a handover execution signal, and when the handover execution signal is obtained, the synchronization processor, the first transmission path estimator, the second transmission path estimator, the weight calculator, and the weighting applier switch a signal to be processed from the transmission signal to the handover candidate signal.

8. The signal processing device according to claim 1, further comprising:

an antenna controller that changes orientations of polarization planes of signals received by the vertical polarization antenna and the horizontal polarization antenna, wherein the antenna controller changes the orientations of the polarization planes, based on the first weight and the second weight calculated by the weight calculator.

9. A signal processing method comprising:

estimating a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from a vertical polarization antenna and a horizontal polarization antenna receiving the transmission signal;

estimating a second transmission path characteristic of the transmission signal using the horizontal signal;

calculating a first weight for the vertical signal and a second weight for the horizontal signal, using the first transmission path characteristic and the second transmission path characteristic;

applying weighted summation to the vertical signal and the horizontal signal using the first weight and the second weight; and performing synchronization processing on each of the vertical signal and the horizontal signal, wherein the first transmission path characteristic is a characteristic of a transmission path through which the transmission signal is transmitted from the transmission device to the vertical polarization antenna, the second transmission path characteristic is a characteristic of a transmission path through which the transmission signal is transmitted from the transmission device to the horizontal polarization antenna, the first transmission path characteristic indicates a proportion of a signal included in the vertical signal within the transmission signal, the second transmission path characteristic indicates a proportion of a signal included in the horizontal signal within the transmission signal, the first transmission path characteristic and the second transmission path characteristic are estimated by using the vertical signal and the horizontal signal on each of which the synchronization processing has been performed, the weighted summation is applied to the vertical signal and the horizontal signal on each of which the synchronization processing has been performed, the synchronization processing establishes frame synchronization by detecting that a correlation value of a predefined bit pattern with at least one of the vertical signal or the horizontal signal exceeds a threshold, the synchronization processing includes:

first synchronization processing on the vertical signal; and second synchronization processing on the horizontal signal, and the first synchronization processing and the second synchronization processing are performed in a coordinated manner such that each of a difference in frequency and a difference in phase between the vertical signal and the horizontal signal is close to 0.

10. A non-transitory computer-readable recording medium having a program recorded thereon, the program causing a computer to execute:

estimating a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from a vertical polarization antenna and a horizontal polarization antenna receiving the transmission signal;

estimating a second transmission path characteristic of the transmission signal using the horizontal signal;

calculating a first weight for the vertical signal and a second weight for the horizontal signal, using the first transmission path characteristic and the second transmission path characteristic;

applying weighted summation to the vertical signal and the horizontal signal using the first weight and the second weight; and performing synchronization processing on each of the vertical signal and the horizontal signal, wherein the first transmission path characteristic is a characteristic of a transmission path through which the transmission signal is transmitted from the transmission device to the vertical polarization antenna, the second transmission path characteristic is a characteristic of a transmission path through which the transmission signal is transmitted from the transmission device to the horizontal polarization antenna, the first transmission path characteristic indicates a proportion of a signal included in the vertical signal within the transmission signal, the second transmission path characteristic indicates a proportion of a signal included in the horizontal signal within the transmission signal, the first transmission path characteristic and the second transmission path characteristic are estimated by using the vertical signal and the horizontal signal on each of which the synchronization processing has been performed, the weighted summation is applied to the vertical signal and the horizontal signal on each of which the synchronization processing has been performed, the synchronization processing establishes frame synchronization by detecting that a correlation value of a predefined bit pattern with at least one of the vertical signal or the horizontal signal exceeds a threshold, the synchronization processing includes:
  first synchronization processing on the vertical signal; and
  second synchronization processing on the horizontal signal, and
the first synchronization processing and the second synchronization processing are performed in a coordinated manner such that each of a difference in frequency and a difference in phase between the vertical signal and the horizontal signal is close to 0.

11. A mobile body comprising:
a signal processing device;
a vertical polarization antenna; and
a horizontal polarization antenna,
wherein the signal processing device includes:
  a first transmission path estimator that estimates a first transmission path characteristic of a transmission signal using, out of a vertical signal and a horizontal signal, the vertical signal, the transmission signal being transmitted from a transmission device in form of one of vertical polarization and horizontal polarization, the vertical signal and the horizontal signal resulting from the vertical polarization antenna and the horizontal polarization antenna receiving the transmission signal;
  a second transmission path estimator that estimates a second transmission path characteristic of the transmission signal using the horizontal signal;
  a weight calculator that calculates a first weight for the vertical signal and a second weight for the horizontal signal, using the first transmission path characteristic and the second transmission path characteristic;
  a weighting applier that applies weighted summation to the vertical signal and the horizontal signal using the first weight and the second weight; and
  a synchronization processor that performs synchronization processing on each of the vertical signal and the horizontal signal,
the first transmission path characteristic is a characteristic of a transmission path through which the transmission signal is transmitted from the transmission device to the vertical polarization antenna,
the second transmission path characteristic is a characteristic of a transmission path through which the transmission signal is transmitted from the transmission device to the horizontal polarization antenna,
the first transmission path characteristic indicates a proportion of a signal included in the vertical signal within the transmission signal,
the second transmission path characteristic indicates a proportion of a signal included in the horizontal signal within the transmission signal,
the first transmission path estimator and the second transmission path estimator estimate the first transmission path characteristic and the second transmission path characteristic, using the vertical signal and the horizontal signal on each of which the synchronization processing has been performed,
the weighting applier applies the weighted summation to the vertical signal and the horizontal signal on each of which the synchronization processing has been performed,
the synchronization processor establishes frame synchronization by detecting that a correlation value of a predefined bit pattern with at least one of the vertical signal or the horizontal signal exceeds a threshold,
the synchronization processor includes:
  a first synchronization processor that performs the synchronization processing on the vertical signal; and
  a second synchronization processor that performs the synchronization processing on the horizontal signal, and
the first synchronization processor and the second synchronization processor cooperate with each other in bringing each of a difference in frequency and a difference in phase between the vertical signal and the horizontal signal close to 0.

* * * * *